US006955251B2

(12) United States Patent
Kurita et al.

(10) Patent No.: US 6,955,251 B2
(45) Date of Patent: Oct. 18, 2005

(54) CLUTCH UNIT

(75) Inventors: Masahiro Kurita, Kuwana (JP);
Masahiro Kawai, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/312,590

(22) PCT Filed: Aug. 8, 2001

(86) PCT No.: PCT/JP01/06834
§ 371 (c)(1),
(2), (4) Date: Jul. 31, 2003

(87) PCT Pub. No.: WO02/12746
PCT Pub. Date: Feb. 14, 2002

(65) Prior Publication Data
US 2004/0099498 A1 May 27, 2004

(30) Foreign Application Priority Data

| Aug. 8, 2000 | (JP) | 2000-240213 |
|---|---|---|
| Oct. 13, 2000 | (JP) | 2000-314252 |
| Oct. 13, 2000 | (JP) | 2000-314505 |
| Oct. 13, 2000 | (JP) | 2000-314513 |
| Oct. 13, 2000 | (JP) | 2000-314514 |
| Oct. 13, 2000 | (JP) | 2000-314515 |
| Feb. 20, 2001 | (JP) | 2001-043871 |

(51) Int. Cl.$^7$ .................. F16D 41/06; F16D 41/10; A47C 7/02
(52) U.S. Cl. .................. 192/19; 192/223.2; 297/344.12
(58) Field of Search .................. 192/12 R, 12 B, 192/14, 19, 223.2; 297/344.12, 374

(56) References Cited

U.S. PATENT DOCUMENTS 3,823,440 A * 7/1974 Klingelhofer ............... 297/374

| 4,852,707 A | 8/1989 | Ito et al. |
|---|---|---|
| 5,896,973 A | 4/1999 | Hochmuth et al. |
| 6,273,233 B1 * | 8/2001 | Denis ................. 192/223.2 |
| 6,508,347 B1 * | 1/2003 | Hochmuth ............... 192/223.2 |
| 6,575,277 B1 * | 6/2003 | Torii et al. ............... 192/12 B |

FOREIGN PATENT DOCUMENTS

| JP | 60-241532 A | 11/1985 |
|---|---|---|
| JP | 61-74922 A | 4/1986 |
| JP | 2-206713 A | 8/1990 |
| JP | 4-219528 A | 8/1992 |
| JP | 6-280900 A | 10/1994 |
| JP | 8-145078 A | 6/1996 |
| JP | 10-184734 A | 7/1998 |
| JP | 11-101273 A | 4/1999 |
| JP | 11-182589 A | 7/1999 |
| JP | 11-264426 | 9/1999 |
| JP | 11-336799 A | 12/1999 |
| JP | 2000-60670 A | 2/2000 |
| JP | 10-238561 A | 9/2001 |
| WO | WO 00/8349 A1 | 2/2000 |

* cited by examiner

Primary Examiner—Rodney H. Bonck
(74) Attorney, Agent, or Firm—Arent Fox PLLC

(57) ABSTRACT

A clutch unit comprises an outer ring 1 as an input-side member, an output shaft 2 as an output-side member, an inner ring 3 as a control member, an outer ring 4 as a stationary-side member, a first clutch part 5 interposed between the outer ring 1 and the inner ring 3*m*, and a second clutch part 6 interposed between the outer ring 4 and the output shaft 2. Input torque input from an operation lever 13 is transmitted in the path of the outer ring 1→the first clutch part 5→the inner ring 3→the output shaft 2. Reverse input torque input from the output shaft 2 is locked with the outer ring 4 through the second clutch part 6.

68 Claims, 63 Drawing Sheets

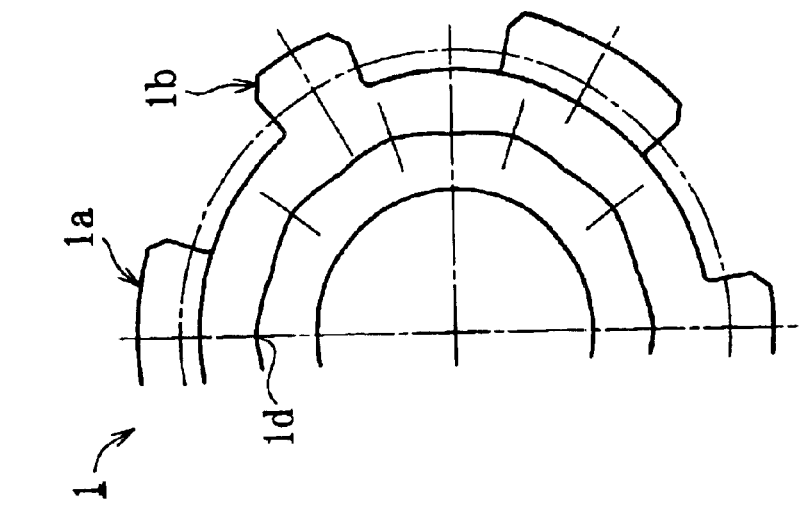
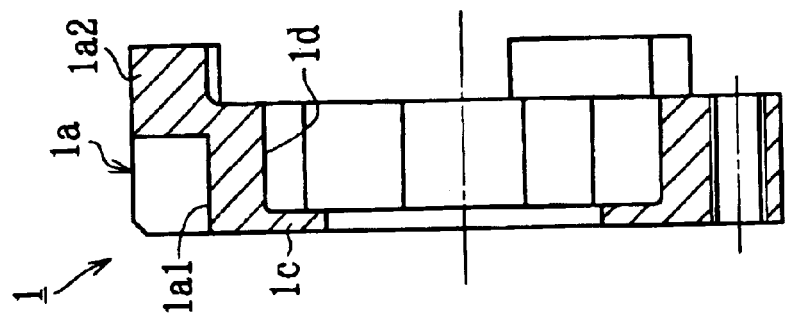
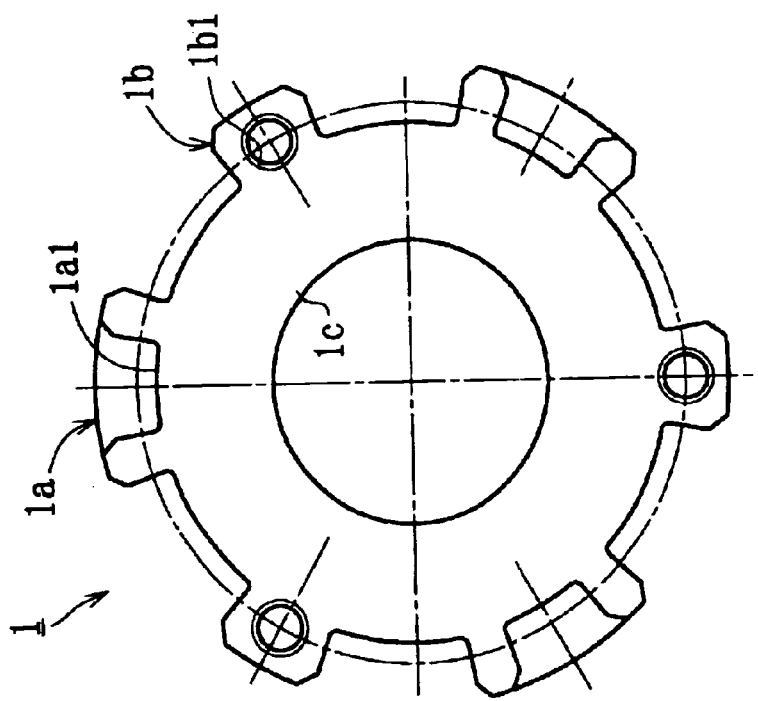
FIG. 2 (a), FIG. 2 (b), FIG. 2 (c)

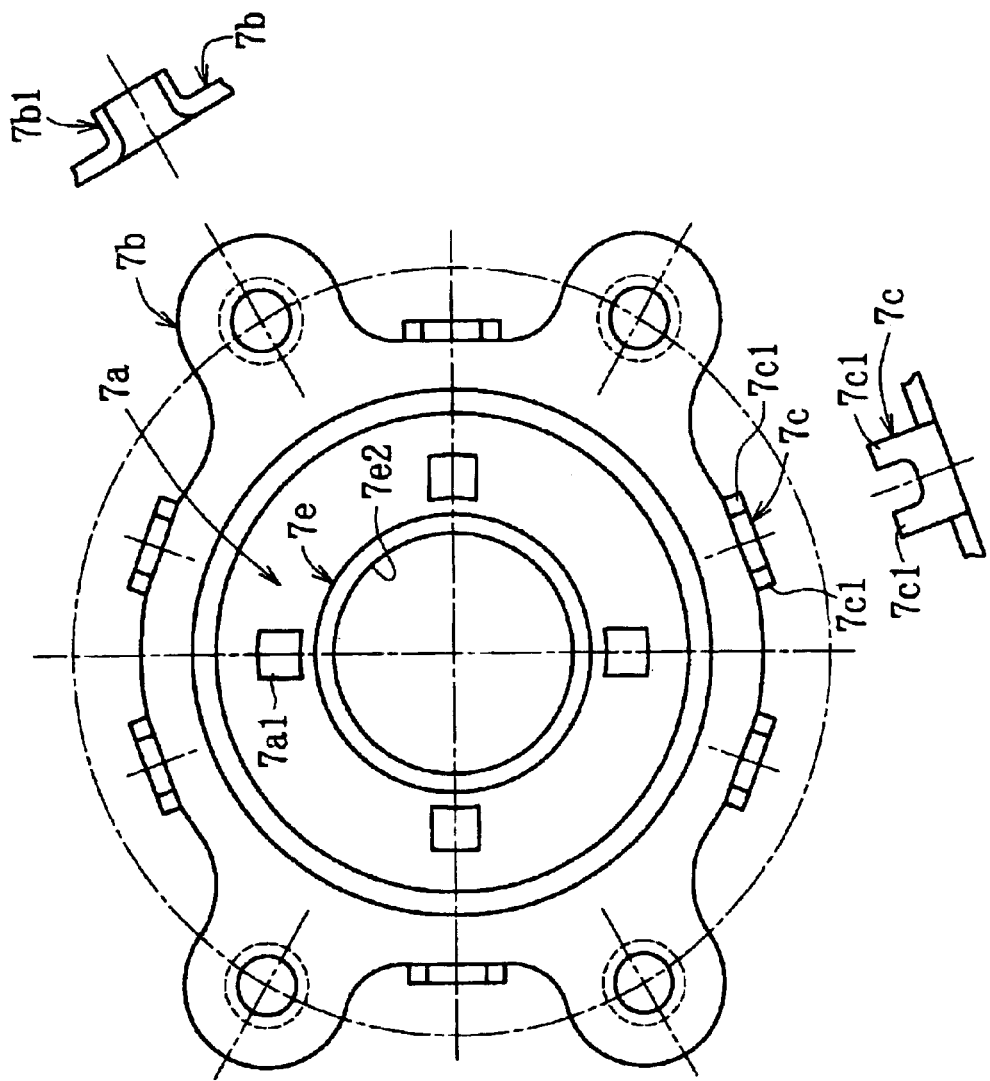
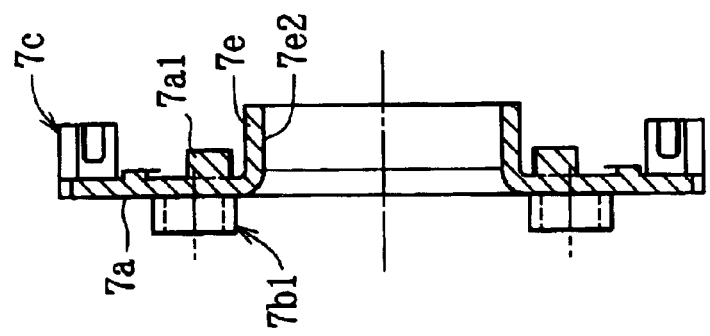
FIG. 27 (b)
FIG. 27 (a)

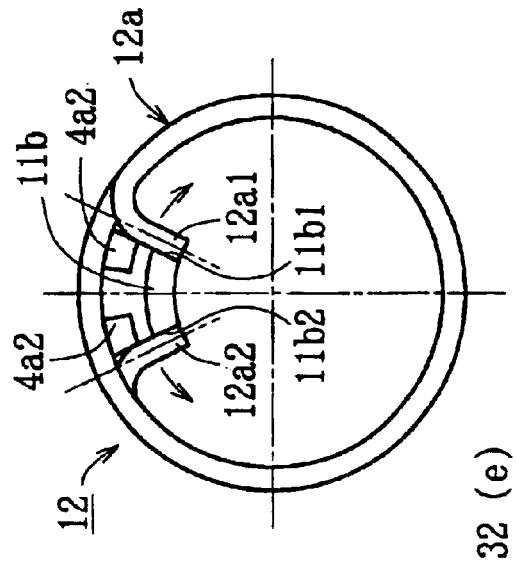
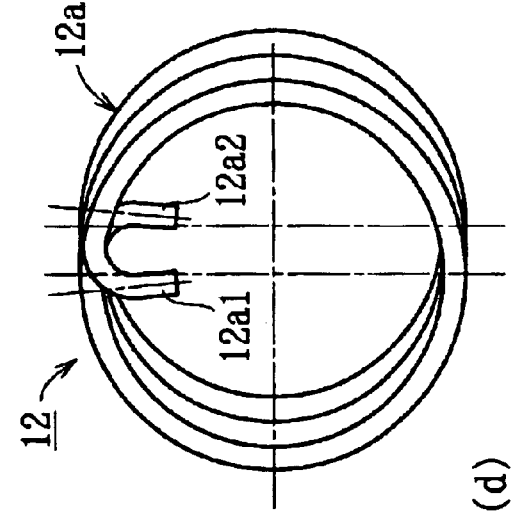
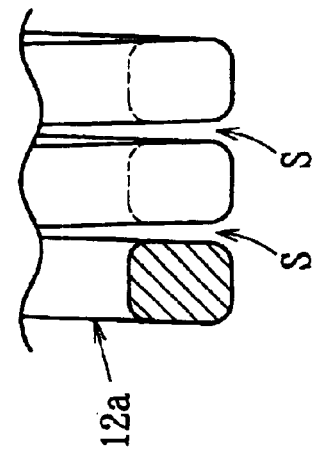
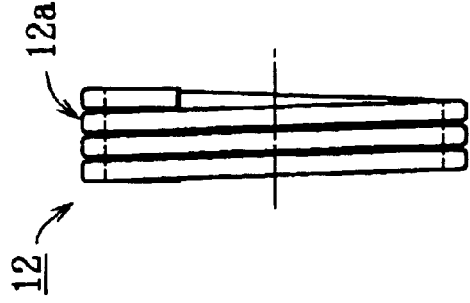
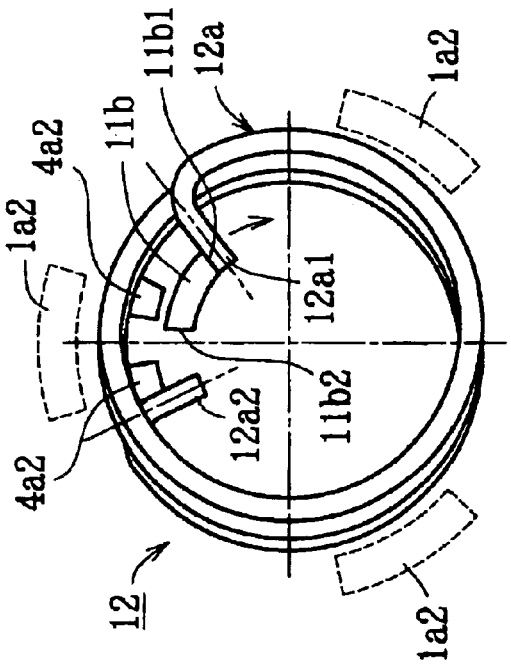

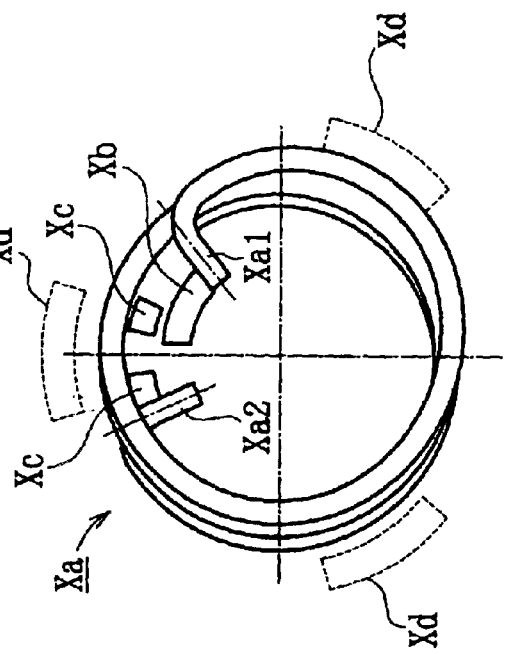
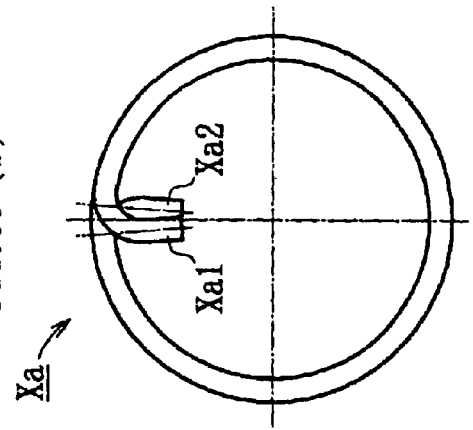
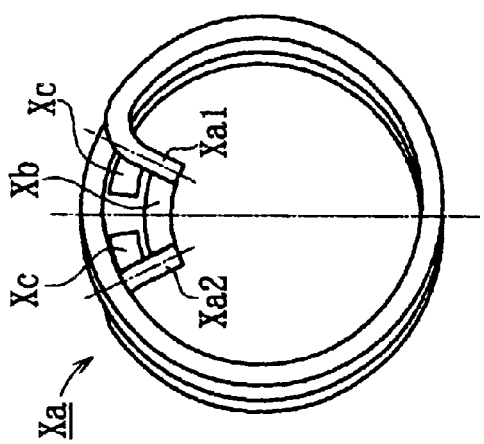
FIG. 38 (a)
FIG. 38 (b)
FIG. 38 (c)
FIG. 38 (d)

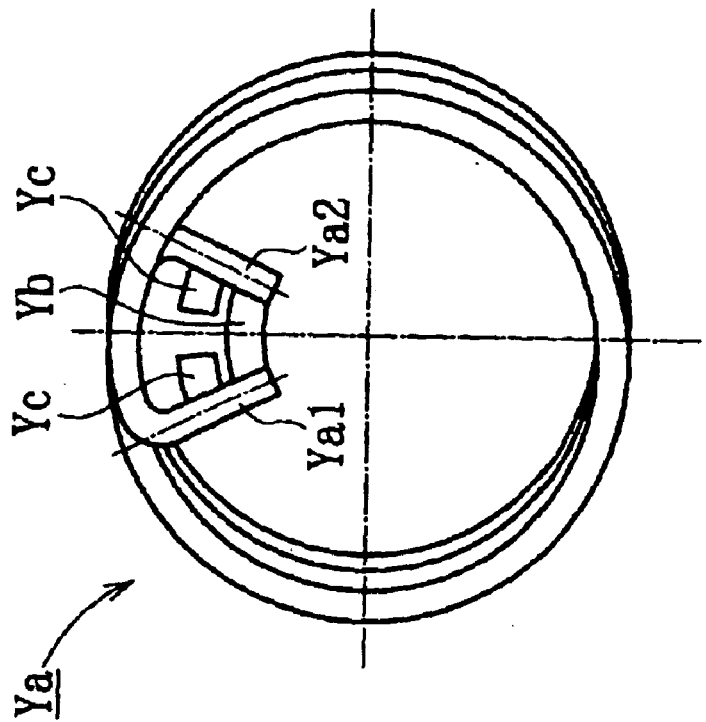
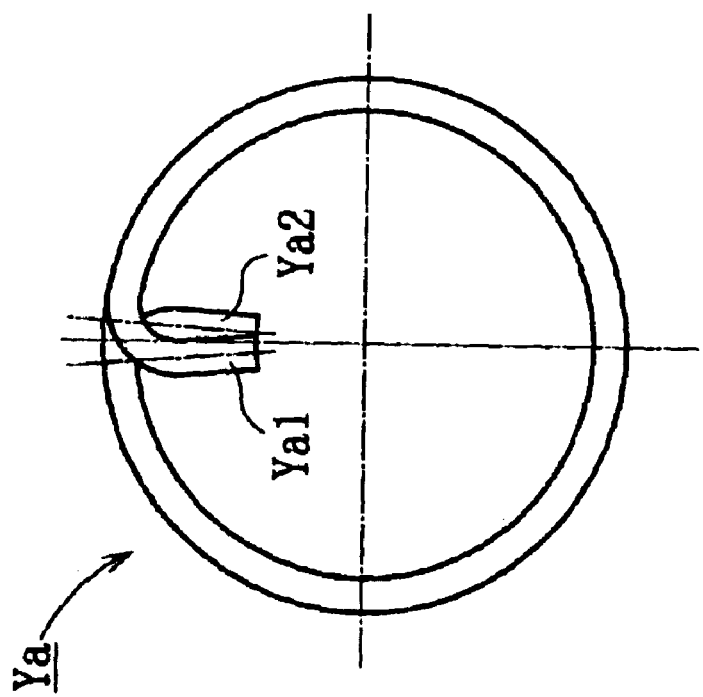
FIG. 39 (a)
FIG. 39 (b)

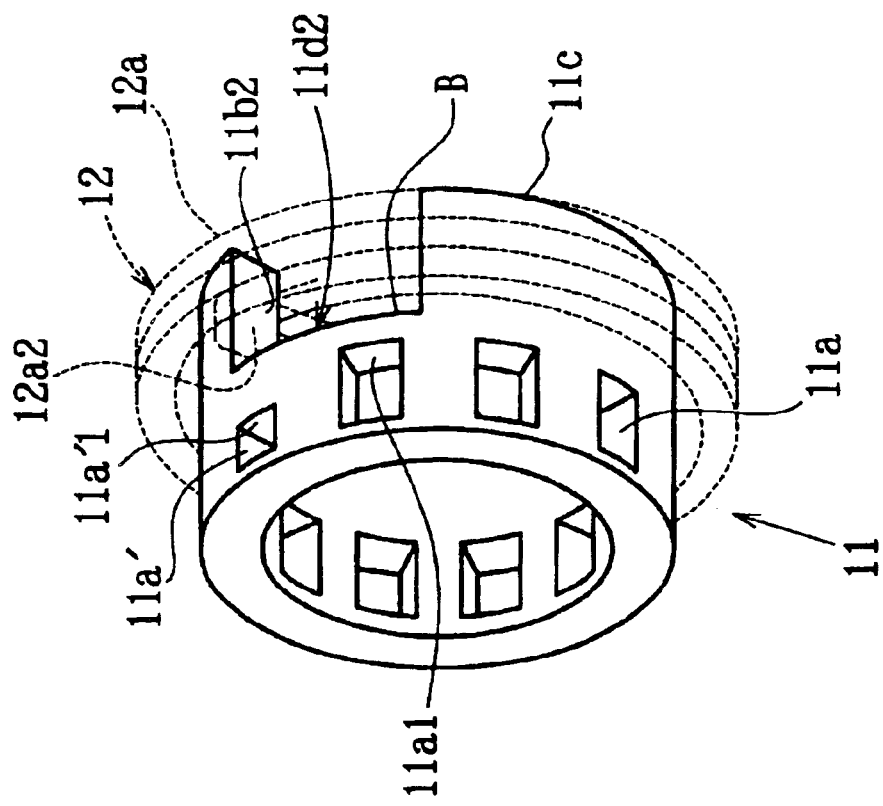
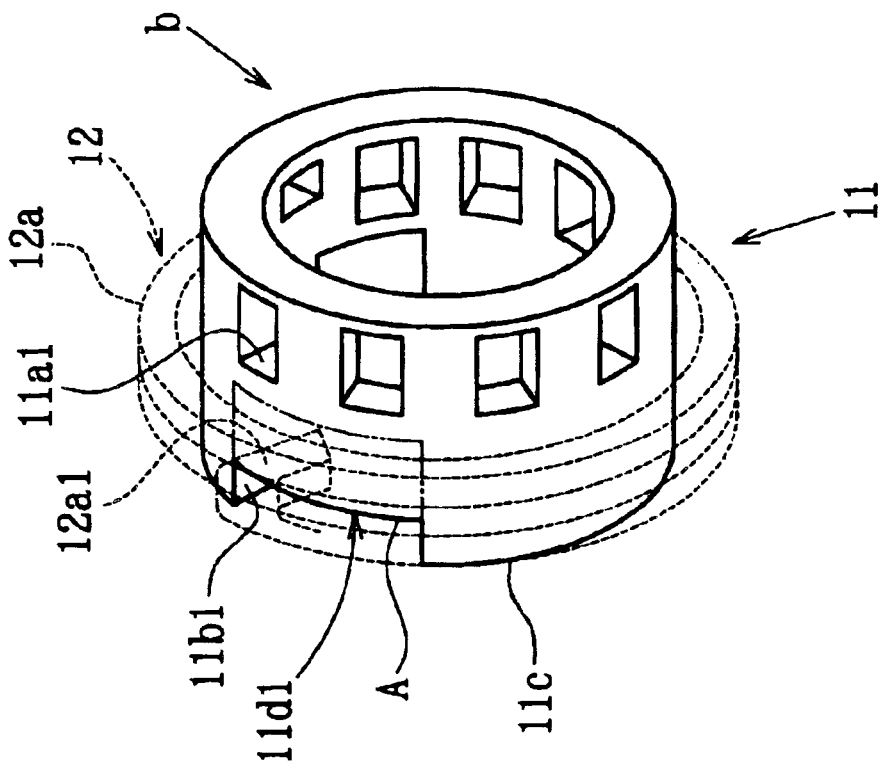
FIG. 43 (a)
FIG. 43 (b)

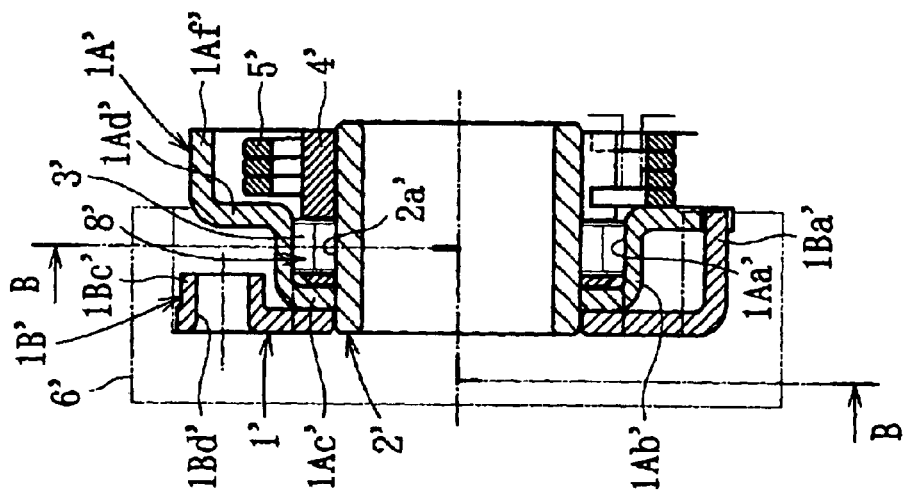
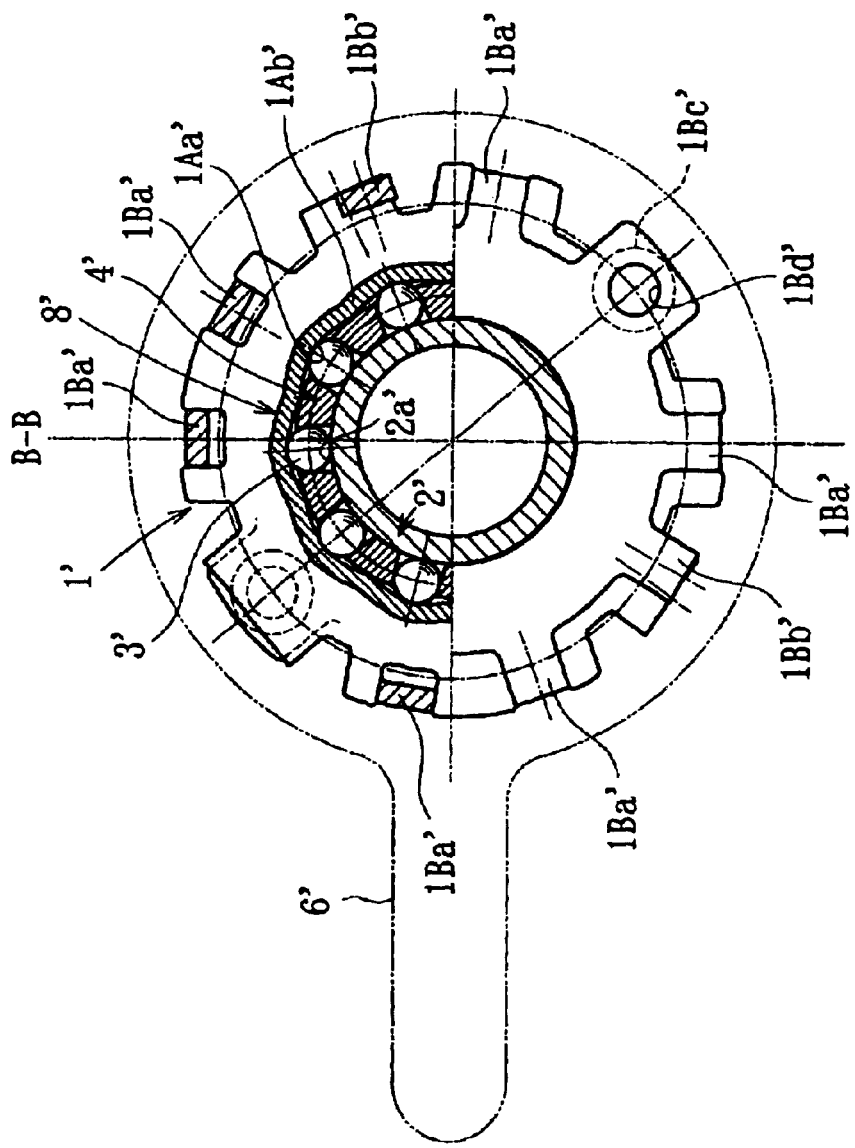
FIG. 49 (a)
FIG. 49 (b)

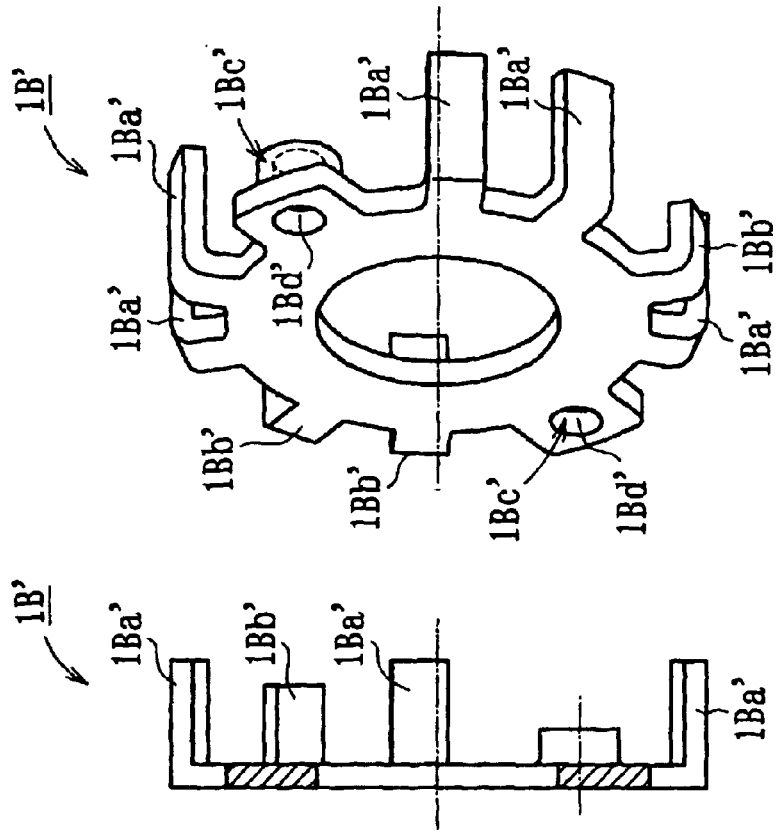
FIG51 (a)
FIG51 (b)
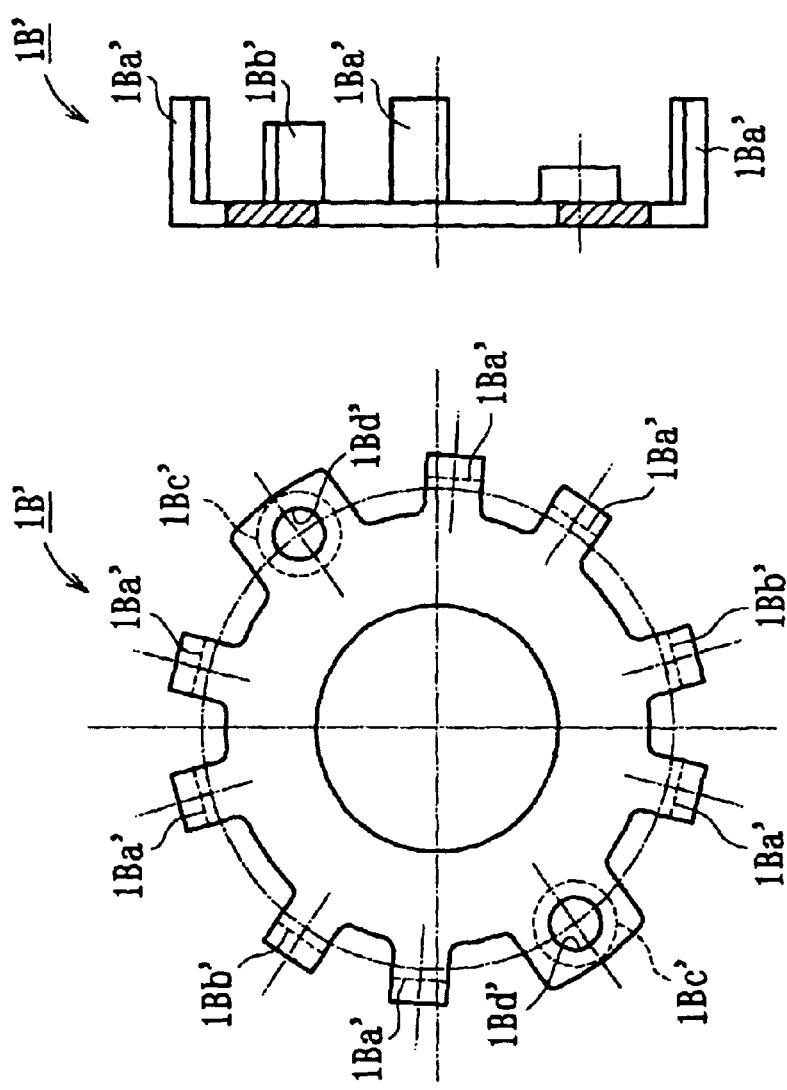
FIG51 (c)

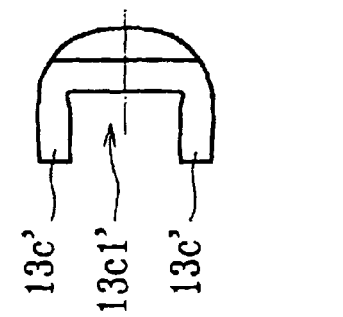
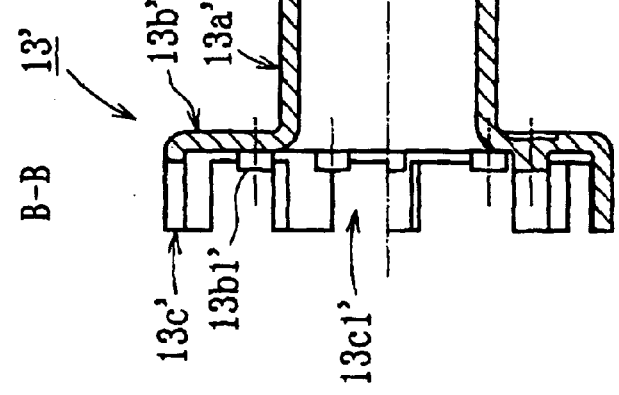
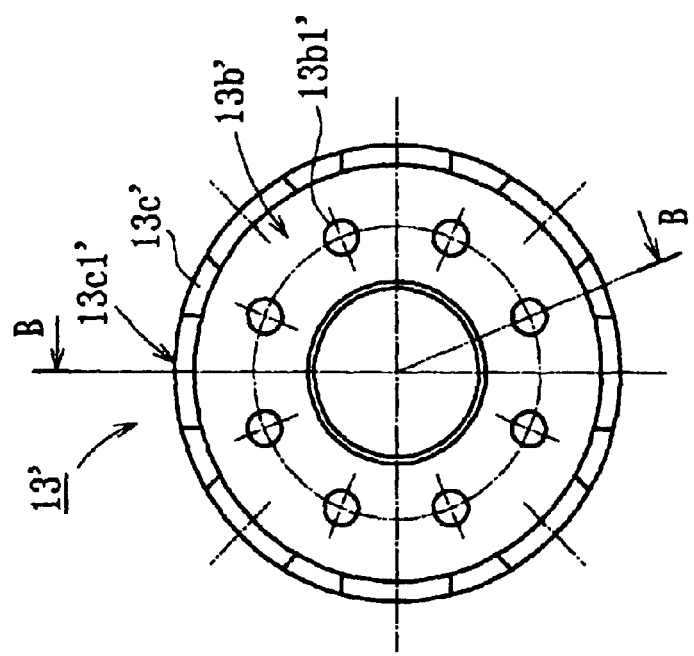
FIG. 56 (a)  FIG. 56 (b)  FIG. 56 (c)

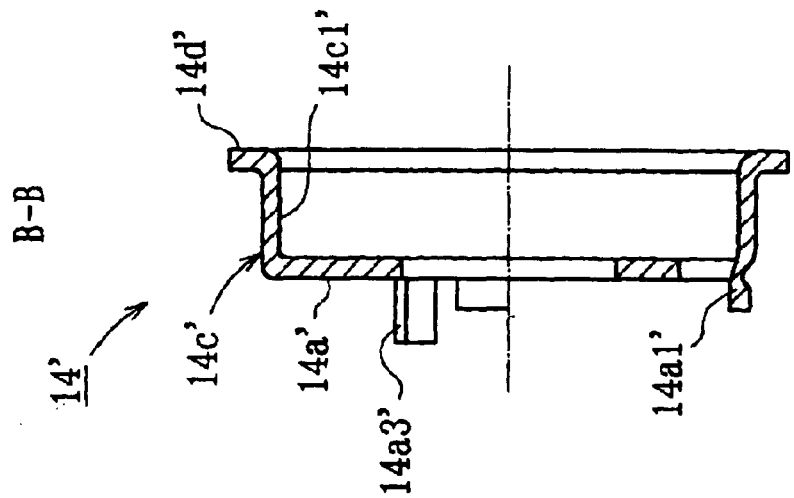
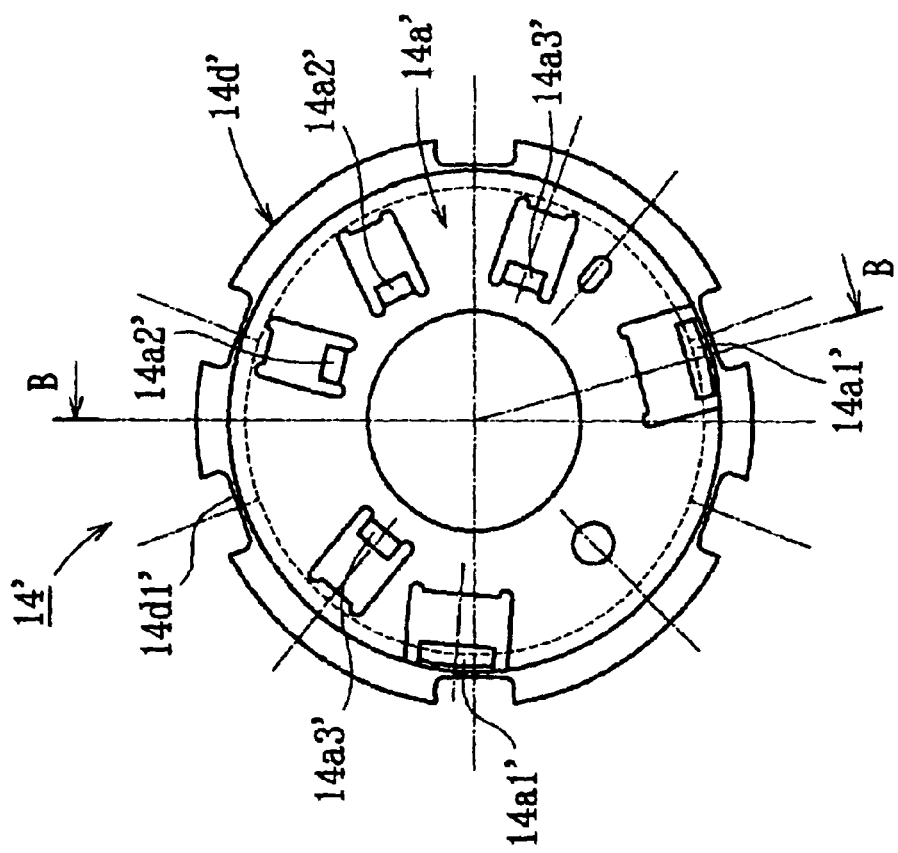

CLUTCH UNIT

CROSS-REFERENCE TO RELATED APPLICATION

This application is a National Stage entry of International Application No. PCT/JP01/06834, filed Aug. 8, 2001, the entire specification claims and drawings of which are incorporated herewith by reference.

BACKGROUND OF THE INVENTION

The present invention relates to a clutch unit which has the function of transmitting input torque from an input side to an output side and locking reverse input torque from the output side so as not to flow back to the input side, and is applicable to a seat-adjusting device of a vehicle, for example.

For example, for a device in which an input torque given by a rotating operation of an operation member is transmitted to an output-side mechanism to adjust a position of a predetermined part, a function for holding the position of the output-side mechanism is often required when the operation member is not operated. Taking a seat-height-adjusting device for a sitting seat of a vehicle, for example, the device comprises a brake part for supporting the weight from the sitting seat including the weight of the seat itself and the weight of the driver and the like, provided at an output-side mechanism, wherein a normal or a reverse input torque is input from an operation member to an input shaft of the brake part to adjust the height position of the sitting seat. The height position of the sitting seat is held by the brake part even when the operation member is released. Thus, the above function is performed. In this case, since the position of the operation member is held by the brake part after the operation, a knob (or a circular grip) is commonly used as the operation member, and the input torque is input to the brake unit by the rotating operation of the knob.

The seat-height-adjusting device of the prior art requires inconvenient operation of rotating the knob while the driver inserts his hand in a narrow space between the sitting seat and the vehicle body. Also, the necessity to secure such space imposes limits to the design of the vehicle body and the seat, which can be a burden particularly for small vehicles. Another known seat-height-adjusting device employs a lever as the operation member, with a ratchet mechanism between the lever and the brake part so as to enable to input a torque by a pivoting operation of the lever and to automatically return the lever after operation. However, this device requires a complex structure, and also has the problem of noise generated by toothed ratchet gears when the lever returns.

SUMMARY OF THE INVENTION

It is an object of the present invention to provide a clutch unit which can achieve the position adjustment and the position hold of an output-side mechanism and the position return of an input member (operating member), and also has a simple structure, and is smooth in operation.

Another object of the present invention is to provide a clutch unit that is compact, low-cost, and capable of improvement in design flexibility.

Still another object of the present invention is to provide a clutch unit that can prevent clutch function thereof from being impaired by thermal deformation of components during processing and the used grease from deteriorating due to heat, can facilitate the process and manufacturing, and can be mounted on a mating member without trouble.

Still another object of the present invention is to provide a clutch unit that is high in durability and excellent in assemblability.

Still another object of the present invention is to smoothen the shift performance of the locking means from a locked state to a lock released state, thereby reducing the operating force and suppressing the production of vibrations and vibrating noise.

To achieve the foregoing objects, the present invention provides a structure comprising an input-side member to which a torque is input, an output-side member from which a torque is output, a control member intervening in a torque transmission path between the input-side member and the output-side member, a stationary-side member constrained from rotation, a first clutch part arranged between the input-side member and the control member, and a second clutch part arranged between the stationary-side member and the output-side member, wherein an input torque from the input-side member is transmitted to the output-side member through the first clutch part and the control member, and a reverse input torque from the output-side member is locked with the stationary-side member through the second clutch part. According to this structure, it is possible to adjust the position of the output-side member in the direction of rotation by the input torque from the input-side member. In addition, since the reverse input torque from the output-side member is locked by the second clutch part, the adjusted position of the output-side member can be held. Moreover, since the first clutch part is arranged between the input-side member and the control member, the input-side member can be returned to its neutral position (the position at which the input torque being not input) after the position adjustment of the output-side member. Even in that case, the smooth returning operation causes no problem of noise generation as with a ratchet mechanism.

In the above structure, the first clutch may include locking means for locking the input-side member and the control member with respect to the input torque from the input-side member, and returning means for returning the input-side member to a neutral position at which the input torque is not input when the input-side member is released. According to this structure, when the input-side member is released after the position adjustment of the output-side member, the input-side member returns automatically to the neutral position by the returning means. Thus the operationality is improved.

The locking means includes any of those which gives constrain force of rotation by utilizing wedging engagement, projection-recess engagement, friction, magnetic force, electromagnetic force, fluid pressure, fluid viscous resistance, or fine particle medium. Among them, the locking means giving constrain force of rotation by wedging engagement is preferable because the advantages of simplicity of structure and control mechanism, smoothness of motion, and low cost and the like. More specifically, in a preferred embodiment, wedge gaps are defined between the input-side member and the control member, and engaging members are made come into and out from wedging engagements with the wedge gaps, thereby switching a locked state and a freewheeling state. This structure includes the arrangements in which cam surfaces for defining the wedge gaps may be formed to the input-side member or to the control member, with each of the engaging members having a circular cross-section such as rollers or balls, and cam surfaces for defining the wedge gaps are formed to the engaging members, with each of the engaging members being a sprag or the like having a non-circular cross-section.

More preferably, the locking means may comprise cam surfaces provided to the input-side member, a circumferential surface provided to the control member, engaging members interposed between the cam surfaces and the circumferential surface. The returning means may comprise a retainer for retaining the engaging members, and an elastic member for coupling the retainer with a non-rotary member in the direction of direction.

With the structure described above, when an input torque is input to the input-side member, the cam surfaces of the input-side member relatively moves in the direction of rotation with respect to the engaging members accompany with the rotation of the input-side member, thereby, the engaging members come into engagements with the wedge gaps. Thus, the input torque from the input-side member is transmitted to the control member through the engaging members, so that the input-side member, the engaging members, the retainer, and the control member all rotate together. The rotation of the retainer causes the elastic member, which couples the retainer with the non-rotary member in the direction of rotational, to deform, generating an elastic force in accordance with the amount of deformation. Therefore, when the input-side member is released after rotating a certain amount, this elastic force accumulated in the elastic member acts as a rotational driving force on the retainer, whereupon the retainer pushes the engaging members against the cam surface. Thereby, the engaging members, the retainer, and the input-side member freewheel with respect to the control member to return to the neutral position.

In the structure described above, the non-rotary member with which the retainer is coupled through the elastic member may be the stationary-side member, so as to simplify the structure. Further, a stopper may be provided to the stationary-side member for restricting the rotation range of the input-side member, so that the elastic member will not receive too much stress because of excessive rotation of the input-side member and also the structure can be simplified. Furthermore, the engaging members, the retainer, and the elastic member may all be accommodated inside of the input-side member, so as to make an input side portion compact without any protruding parts. This eliminates the disadvantage that any protrusions on the input side portion may bite into the cloth on the surface of the seat when operating the operation member, and improves the freedom of design of the seat, in such case that the clutch unit is uses to a seat-adjusting device of a vehicle. In addition, the cum surfaces of the input-side member may be formed in such a shape that defines the wedge gaps together with the circumferential surface of the output-side member in both normal and reverse directions of rotation. Thereby, the above function can be obtained with respect to the input torque in both normal and reverse directions. Incidentally, the cam surfaces may be formed to the input-side member directly, or a member having the cam surfaces may be attached to the input-side member. Moreover, the engaging member is preferably a roller.

The second clutch part may comprise locking means for locking the output-side member and the stationary-side member with respect to the reverse input torque from the output-side member, lock releasing means for releasing a locked state due to the locking means with respect to the input torque from the input-side member, and torque transmitting means for transmitting the input torque between the control member and the output-side member when the locked state due to the locking means is released. According to this structure, the position adjustment of the output-side member in the direction of rotational can be performed by an input operation of the input torque from the input-side member, and also the position of the output-side member after adjusting can be automatically held. Thus the operationality is improved.

The locking means includes any of those which gives constrain force of rotation by utilizing wedging engagement, projection-recess engagement, friction, magnetic force, electromagnetic force, fluid pressure, fluid viscous resistance, or fine particle medium. Among them, the locking means giving constrain force of rotation by wedging engagement is preferable because the advantages of simplicity of structure and control mechanism, smoothness of motion, and low cost and the like. More specifically, in a preferred embodiment, wedge gaps are defined between the output-side member and the stationary-side member, and engaging members are made come into and out from wedging engagements with the wedge gaps, thereby switching a locked state and a freewheeling state. This structure includes the arrangements in which cam surfaces for defining the wedge gaps may be formed to the output-side member or to the stationary-side member, with each of the engaging members having a circular cross-section such as rollers or balls, and cam surfaces for defining the wedge gaps are formed to the engaging members, with each of the engaging members being a sprag or the like having a non-circular cross-section.

More preferably, the locking means may comprise a circumferential surface provided to the stationary-side member, cam surfaces provided to the output-side member for defining wedge gaps together with the circumferential surface in both normal and reverse directions of rotational, a pair of engaging members interposed between each of the cam surfaces and the circumferential surface, and elastic members each of which presses the pair of engaging members toward the respective wedge gaps. The lock releasing means may comprise engaging elements for selectively engaging with either one of the pair of engaging members to press the engaging member toward the opposite direction to the wedge gap. The torque transmitting means may comprise engaging elements in the direction of rotation provided to the control member and the output-side member.

In the structure described above, when a reverse input torque in one direction of rotation is input to the output-side member, one of the paired engaging members comes into wedging engagement with the wedge gap in that direction, thereby locking the output-side member in the one direction of rotational with respect to the stationary-side member. When a reverse input torque in the other direction of rotation is input to the output-side member, the other of the paired engaging members comes into wedging engagement with the wedge gap in that direction, thereby locking the output-side member in the other direction of rotational with respect to the stationary-side member. Thus, the output-side member is locked with respect to the stationary-side member through the pair of engaging members in both normal and reverse directions of rotational. On the other hand, when an input torque is input to the input-side member, the engaging element of the lock releasing means initially pushes one of the paired engaging members engaging with the wedge gap in the direction of rotation of the input torque towards the opposite direction of the wedge gap, so as to make the engaging member come out from the wedge gap. The locked state of the output-side member is thus released in the direction of rotation of the input torque. Then, under the locked state of the output-side member being released, the engaging elements provided to the control member and the output-side member engage with each other in the direction of rotation. Thereby, the input torque input to the input-side member is transmitted along a path from the input-side member through the first clutch part, the control member, the torque transmitting means (engaging elements), to the output-side member, so that the output-side member rotates.

In order to perform the lock release due to the lock releasing means and the torque transmission due to the torque transmitting means surely and sequentially, the lock releasing means and the torque transmitting means in the neutral position may have a positional relationship of $\delta 1 < \delta 2$, where $\delta 1$ is a rotational direction clearance between the engaging element of the lock releasing means and the engaging member, and $\delta 2$ is a rotational direction clearance between the engaging elements of the torque transmitting means. The lock releasing means may be provided to the control member because the advantages of simplicity of structure and control mechanism. Further, the torque transmitting means may be constituted by projections provided to either one of the control member and the output-side member, and matching recesses provided to the other one. More specifically, the projections may be pins provided to the control member, and correspondingly, the recesses may be pin holes provided to the output-side member. In this case, the pins and the pin holes may be formed along the clutch axis. The cam surfaces may be directly formed to the output-side member, or a separate member having cam surfaces may be attached to the output-side member. For the engaging members, rollers are preferable.

In the structure described above, a radial bearing may be provided for radially supporting the output-side member, so as to make the rotary motion of output-side member smooth and stable, and to prevent or restrict eccentric load from being applied to the first clutch part or the second clutch part. The radial bearing may be constructed by a separate rolling bearing or slide bearing, but preferably, a radial bearing portion may be provided to the control member, or to a fixing side plate fixed to the stationary-side member, in order to simplify the structure and reduce the number of components. More preferably, the radial bearings may be provided to both of the control member and the fixing side plate so that the output-side member is supported in a state of straddle by the radial bearing portions, whereby the above-mentioned effects are achieved with a better result.

As described above, the output-side member is locked with respect to the reverse input torque by the second clutch part. However, at the moment when the locked state due to the second clutch is released with respect to the input torque, the reverse input torque could possibly flow back to the input side through the torque transmitting means. Such flow back phenomenon of the reverse input torque may take the form of resistance against the operation of the operation member, or a sudden drop of the seat. Accordingly, the clutch unit may further comprise brake means for applying a braking force on the output-side member in the direction of rotational, so as to prevent or restrict such flow back phenomenon of the reverse input torque. The braking force mentioned here includes friction, magnetic force, electromagnetic force, fluid pressure, fluid viscous resistance, or the like.

The brake means may be interposed between the output-side member and the stationary-side member or the fixing side plate fixed to the stationary-side member. The brake means may be constituted by a friction member for applying frictional force as the braking force on the output-side member.

According to the present invention, it is possible to provide a clutch unit that can achieve the position adjustment and the position hold of the output-side mechanism and the position return of the input-side member (operation member), has a simple structure, and is smooth in operation.

In the foregoing structure, the elastic member for coupling the retainer with a non-rotating member in the direction of rotation, as shown in FIG. 38, for example, may be a centering spring Xa made of an unwinding type torsion coil spring having a plurality of turns. Then, engaging portions Xa1 and Xa2 are formed at both ends of the centering spring Xa. In a natural state shown in the figure, the centers of the plurality of turns fall on the same axis.

When the centering spring Xa is installed in the first clutch part, as shown in FIG. 38(c), the pair of engaging portions Xa1 and Xa2 both are engaged with an engaged portion Xb of the retainer and an engaged portion Xc of the stationary-side member respectively as widened in the unwinding direction. Under this state, the individual winding centers of the centering spring Xa shift in succession due to the widening.

From such a state, when the retainer (the engaged portion Xb) is relatively rotated with respect to the stationary-side member (the engaged portion Xc), as shown in FIG. 38(d), the individual winding centers of the centering spring Xa increase in the amount of shift. Accordingly, the centering spring Xa might expand outward at near the engaging portion Xa1, for example, to make contact with the input-side member Xd (the outer ring at the operating member side).

In order to avoid this problem, the space for accommodating the centering spring Xa must be expanded. Thus, the first clutch part could increase in size, with the fear of hindrance to achieving a compact clutch unit. This also results in the fear of narrowing the design range of the clutch unit which is the first clutch part and the second clutch part unitized.

Incidentally, the use of a winding type centering spring Ya as shown in FIG. 39 has been attempted on this account. When this centering spring Ya is installed in the first clutch part, however, a pair of engaging portions Ya1 and Ya2 are engaged with an engaged portion Yb of the retainer and an engaged portion Yc of the stationary-side member as widened in the winding direction as shown in FIG. 39(b). Thus, the centering spring Ya decreases in diameter while the individual winding centers shift in succession due to the foregoing widening.

When the retainer is relatively rotated from such a state, the centering spring Ya further decreases in diameter while the individual winding centers increase in the amount of shift. Consequently, the centering spring Ya might constrict the retainer, sometimes failing to provide the expected clutch function. In order to avoid this problem, the first clutch part must be expanded as in the case mentioned above, with the fears of hindrance to achieving a compact clutch unit and of a narrower design range.

The foregoing problem can be solved by making the centering spring as the elastic member to be arranged in the first clutch part, out of a torsion coil spring having a plurality of turns, and offset the individual winding centers of the torsion coil spring in a natural state to an opposite direction from a direction in which the individual winding centers shift accompany with increase in the amount of operation of the retainer in an assembled state.

According to such structure, when the retainer is operated (relatively rotated) with the centering spring made of the torsion coil spring having a plurality of turns installed in the clutch part, the individual winding centers of the centering spring shift to a predetermined direction accompany with the increasing amount of operation (relative rotational angle). In this case, the individual winding centers of the centering spring in the natural state are offset in the opposite direction from the foregoing predetermined direction. When the retainer is in operation, the individual winding centers therefore decrease in the amount of shift as much as corresponding to the offset. Consequently, the clutch part can be reduced in the diameter of the space for accommodating the centering spring, so that a compact clutch unit is achieved with enhanced design flexibility.

The individual winding centers of the centering spring described above preferably fall on the same axis when the retainer in the assembled state is not in operation. If so, the individual winding centers of the centering spring shift in both directions evenly with an efficient reduction in the amount of shift regardless of whether the direction of operation (the direction of relative rotation) of the retainer is normal or reverse.

The centering spring described above is preferably an unwinding type spring. This prevents the centering spring from decreasing in diameter. Consequently, even if a centering spring having a small diameter is arranged around the retainer, the centering spring will not constrict the retainer to hinder the clutch function. The centering spring is thus reduced in diameter.

Moreover, the centering spring described above is preferably shaped noncircular in section. That is, because of the noncircular shape which offers higher spring rigidity than circular one having the same inner and outer diameters, an operation lever attached to the input-side member can be maintained with a sufficient strength, for example. In particular, when the centering spring is shaped rectangular in section, the torsion torque can be changed by modifying the outer diameter alone, even with the same inner diameter and width. This allows flexible measures for setting modifications to the necessary torsion torque.

Furthermore, the centering spring described above is preferably a so-called pitched spring which is wound with spacing between turns. That is, if a so-called tight spring having no spacing between turns is used, the necessary torsion force or return force may not be attained due to friction loss occurring between the turns. The use of the pitched spring can avoid such a problem.

The fixing side plate may be fixed to the stationary-side member by welding or by screwing. In the case of welding, however, there are the problems that the manufacturing cost becomes higher, the stationary-side member causes thermal deformation to impair the clutch function, and the used grease deteriorates. Moreover, in the case of screwing, there are the problems that: the stationary-side member, which involves in the clutch function, has a higher hardness, being difficult to form holes such as screw holes and taking a lot of trouble and time for machining and fabrication; and screw heads, nuts, or the like protruding on the back of the fixing side plate can cause trouble in mounting on a seat-side member.

The problems mentioned above can be solved by the adoption of the structure that the fixing side plate is fixed to the stationary-side member by caulking. The adoption of such structure lowers the processing and manufacturing costs, and precludes such problems as the impaired clutch function resulting from thermal deformation and the deterioration of the used grease as might occur in welding. Besides, the caulking can be conducted without unnecessary protrusions on the back of the fixing side plate. The clutch unit can thus be mounted on a mating member (a seat-side member, for example) via the fixing side plate without obstructive portions, thereby allowing sure and appropriate mounting.

As for the method of caulking, a caulking portion formed on the fixing side plate is preferably bent for the caulking to the stationary-side member. This structure can facilitate the caulking work, and ensure a fixed state to eliminate such problems as slip-off or coming-off.

The caulking portion of the fixing side plate is preferably bent in the circumferential direction of the stationary-side member. That is, if the caulking portion is bent in the radial direction of the stationary-side member, the stationary-side member might suffer deformation under radial stress and the deformation could hinder the normal operation of the second clutch part. In contrast, when the caulking portion is bent in the circumferential direction of the stationary-side member, the absence of radial stress makes the stationary-side member less prone to deformation so that the clutch function of the second clutch part can be maintained normal.

Moreover, the caulking portion of the fixing side plate is preferably bent to the stationary-side member so as to be restrained from circumferential movement. According to such structure, simply bending the caulking portion achieves restraint on both the axial movement and circumferential movement of the fixing side plate with respect to the stationary-side member. This not only ensures the fixed state, but also simplifies the work and improves the working efficiency.

In this case, the stationary-side member preferably has a notch in an outer periphery thereof so that the caulking portion is engaged with the notch. According to such structure, bending the caulking portion in engagement with the notch of the stationary-side member restrains the fixing side plate from axial movement and circumferential movement with respect to the stationary-side member.

Furthermore, the caulking portion of the fixing side plate preferably has a pair of tabs, the pair of tabs being bent in opposite directions. According to such structure, both the axial movement and circumferential movement of the fixing side plate with respect to the fixing side plate can be restrained with efficiency and reliability.

The notch and caulking portion described above are preferably provided to the stationary-side member and the fixing side plate at a plurality of circumferential locations, respectively. In this case, a fixed state uniform all around can be obtained by arranging the notches and the caulking portions at circumferential regular positions.

Then, the stationary-side member is preferably made of hardened steel, and the fixing side plate unhardened steel. That is, the stationary-side member is made of material having a higher hardness since it is involved in the clutch function. The fixed-side member is made of material that allows the bending of the caulking portion(s).

When the clutch unit of the present invention is used in a seat-adjusting device of a vehicle, the fixing side plate preferably has a second caulking portion intended for caulking to a seat-side member. According to such structure, the clutch unit can be mounted on a seat at low cost without a complicated work.

In the structure described above, the elastic member of the first clutch part may have a pair of engaging portions differing from each other in axial position. The retainer may have a pair of engaged portions with which the engaging portions of the elastic member engaged, and pockets for retaining the engaging members. At least either one of the pair of portions may be axially thickened at a base part thereof.

With normal and reverse rotations of the retainer, the engaged portions of the retainer undergo a circumferential pressing force due to elastic deformation of the elastic member through the engaging portions of the elastic member. Thus, excessive stress can act on the base parts of the engaged portions, possibly causing a crack or the like. Thickening the base part(s) of the engaged portion(s) can ensure strength to avoid such a problem.

This thickening can be achieved, for example, by arranging the bottom of a notch making one of the engaged portions closer to an end face of the retainer than the bottom of a notch making the other engaged portion. In particular, the engaged portion of the retainer in engagement with one of the pair of engaging portions of the elastic member lying closer to the end face of the retainer has a greater arm length to the position of engagement. Since its base part undergoes a large moment load, the foregoing measures are effective.

Moreover, the other engaged portion may be thickened at the base part thereof by omitting the pocket near the base part, or reducing the axial dimension of the pocket near the base part. The engaged portion of the retainer in engagement with one of the pair of engaging portions of the elastic member lying closer to the center (axial center) of the retainer must have a deeper notch since the position of engagement with this engaging part lies closer to the center of the retainer. This makes the thickening with the depth adjustment of the notch difficult. Even in that case, the base part of the engaged portion can be thickened according to the present structure.

Moreover, in the foregoing structure, the elastic member of the second clutch part may be made of a plate spring having two bending portions. This disperses the bends at the respective bending portions, as compared with the elastic member having a single bending portion alone. It is therefore possible to avoid plastic deformation of the plate spring in releasing the locked state of the second clutch part, thereby allowing the miniaturization of the plate spring and by extension the miniaturization of the clutch unit. Besides, the plate spring will not be entangled mutually as coil springs are.

Specifically, the plate spring has a coupling portion for coupling the two bending portions at one end each, and side plate portions extending from the other ends of both the bending portions. In this case, the plate spring has a generally N-shaped section, allowing arrangement even in a narrow space between the engaging members.

When this plate spring is used, the cam surface of the output-side member for defining the wedge gaps may be a flat surface over a portion for the plate spring to be mounted on. In the case of a plate spring having a single bending portion alone, mounting the same on the cam surface would require that a mounting groove be formed in the cam surface. The plate spring having two bending portions is freestanding, and thus the cam surface may be a flat surface having no groove. Since the groove is omitted from the cam surface, it becomes possible to simplify the machining process of the output-side member through the omission of the groove formation. The problem of stress concentration near the groove can also be avoided.

Now, in the foregoing structure, the cam surface of the output-side member may be formed convex with two tapered surfaces. Consequently, an appropriate strut angle can be maintained while the space for accommodating the elastic member arranged between the engaging members (spring space) is expanded circumferentially. The elastic member thus improves in design flexibility. This facilitates the miniaturization of the clutch unit.

The tapered surfaces constituting the cam surface desirably have an inclined angle in the range of 1° and 5°. Besides, the strut angle of the second clutch part desirably falls within the range of 3° and 4.5°. At strut angles above 4.5°, it becomes difficult for the engaging members to engage into the wedge gaps, whereby the clutch function is impaired. On the other hand, at strut angles below 3°, the engaging members undergo higher surface pressure with a drop in torque capacity.

Now, in the foregoing structure, the input-side member may be formed by connecting a first thin member and a second thin member with each other so as to be incapable of relative rotation, the first thin member having the cam surfaces for the first clutch part, the second thin member to which an operating member for inputting a torque is connected. Here, a "thin member" refers to a member having a thickness smaller than when the input-side member is integrally formed by cold forging or the like.

According to such structure, the input-side member is separated into two members as the first thin member and the second thin member to be processed. This facilitates the processing and lowers the manufacturing cost as compared to the case of integral forming by cold forging or the like. Besides, the first thin member and the second thin member have only to secure minimum thicknesses according to their respective roles. The absence of unnecessary portions such as ones in the case of integral forming by cold forging or the like allows a reduction in the weight of the input-side member and by extension the clutch unit. In addition, the first thin member has the cam surfaces for a component of the clutch part, while the second thin member has a connecting portion for an operating member. The two members thus differ in characteristic requirements such as rigidity or strength. Consequently, the first thin member and the second thin member may be made different from each other in material, machining condition, or processing condition so that the characteristic requirements of both the members can be met efficiently during processing, heat treatment, and the like.

At least either one of the first thin member and the second thin member is preferably of a press-formed product. That is, since the first thin member is provided with the cam surfaces for constituting the clutch part, it must be high in rigidity or strength in order to provide appropriate clutch function. In contrast, the second thin member does not require so high rigidity or strength comparatively. Consequently, for example, the first thin member may be a press-formed product of a steel plate or the like while the second thin member is a press-formed product of other metal material or a resin-formed product or the like. With consideration given to the standardization of the materials and processing methods, the second member may also be a press-formed product of a steel plate or the like. Then, such structure provides significant advantages including facilitated machining, lower fabrication cost, and lighter weight.

Moreover, the first thin member and the second thin member are preferably connected by a depression-projection fitting structure. That is, either one of the first thin member and the second thin member is provided with a projection and the other is provided with a depression. The projection is fitted into the depression to connect the two thin members with each other so as to be incapable of relative rotation. This secures favorable assemblability of the two thin members, allowing easy fabrication of the input-side member and easy disassembly as well.

Furthermore, it is preferable that either one of the first thin member and the second thin member has a fitting tab, and the other has a groove portion for the fitting tab to be fit with. Such structure not only improves the assemblability and disassemblability of the two thin members but also ensures favorable workability of the two thin members.

At least the cam surface of the first thin member is preferably applied with a surface hardening. In such structure, the cam surface, which requires high-hardness characteristic as compared to other portions of the second thin member and the first member, is given a required hardness through the surface hardening such as heat treatment. A favorable clutch function can thus be maintained for a long term.

In the case where a torsion coil spring is used as the elastic member of the first clutch part, when torsional forces in circumferential opposite directions are applied to both ends thereof, the elastic force acts on a member for supporting the elastic force (for example, the retainer for retaining the engaging members) in the form of a moment force since the torsion coil spring has a length in the axial direction. Consequently, the member such as the retainer can cause an eccentricity or tilt to produce a friction with a peripheral member, so that a lack of torsional torque may occur due to the frictional loss at that time. This problem can be solved by making the elastic member of the first clutch part out of a plate spring of cut ring shape. That is, when a plate spring of cut ring shape is used as the elastic member, even if a torsional torque is applied to the elastic member with the rotation of the input-side member, the point of application of the elastic force will not shift in axial position as with the torsion coil spring. Consequently, the member for supporting the elastic force, such as the retainer, is kept from a moment force. This can suppress the eccentricity, tilt, and the like of the member, thereby minimizing the torque loss resulting from the friction with other member.

In the foregoing structure, engaging portions capable of engagement with the retainer and the stationary-side member, respectively, are desirably formed on both ends of the elastic member. In this case, the engaging portions on one end and the engaging portions on the other end can be arranged in circumferential opposite positions to avoid a moment force resulting from the release of the elastic force. Besides, the retainer desirably has openings capable of engagement with the engaging portions of the elastic member and being closed all around. Since the openings for engagement with the elastic member are shaped closed all around (window-like shape), the retainer can be enhanced in rigidity as compared to the case where notches are formed in an end face of the retainer.

Moreover, when stress adjusting portions are arranged near both ends of the elastic member, it is possible to uniformize the stress distribution inside the elastic member after elastic deformation, and avoid a drop in fatigue life or the like due to unbalanced stress distribution.

In addition, when a lamination of two or more plate springs is used as the elastic member, an arbitrary elastic force can be obtained by changing the number of plate springs. This facilitates securing an elastic force conforming to the use condition, application, and the like. In this case, when inner one of the plate springs is bent acute at both ends to form engaged portions, and both ends of outer one of the plate springs are engaged with the engaged portions, the outer one of the plate springs can be surely prevented from shifting in phase or coming off due to the action of external forces.

In the foregoing structure, a lubricating grease whose base oil has a viscosity of 750 cSt or above may be applied to at least the interior of the second clutch part including the locking means.

Here, the viscosity of 750 cSt is a value at 25° C. (in this specification, base oil viscosities will all be shown in values for 25° C.). In general, a base oil of lubricating grease for use in this type of clutch has viscosity of 100 cSt or so. When the viscosity of the base oil is equal to or greater than 750 cSt, the lubricating grease enhances in the power for oil film formation so that lubricating oil films of greater oil film strength and oil film thickness are formed around the locking means. This lowers the frictional resistance to a slip when the locking means shifts from a locked state to a lock released state. In addition, the increased oil film strength and oil film thickness enhance the effect of relieving a vibration impact. As a result, the shift operation of the locking means is smoothened, which reduces the operating force and suppresses the occurrence of vibrations and vibrating noise on the shift motion.

A solid lubricant or an extreme pressure additive may be added to the lubricating grease. Consequently, the frictional resistance can be reduced further to enhance the foregoing effect. The solid lubricant may be PTFE or graphite, and the extreme pressure additive may be molybdenum disulfide or organic molybdenum, for example.

When rollers are used as the engaging members, their rolling contact surfaces may be given crowning. This suppresses edge load at the contact portions with the rolling contact surfaces of the rollers, promoting the formation of oil films by the lubricating grease. Here, "crowning" refers to providing a slight curvature to the rolling contact surface of a roller. It includes the structure that the rolling contact surface is given curvatures at the areas of both ends, as well as so-called full crowning in which the entire rolling contact surface traces a single curvature. So-called cut crowning in which the crowning areas are drawn in straight lines (oblique lines) is also included. When the rolling contact surface is given crowning at the areas of both ends, the amount of crowning (the axial length and the amount of radial drop of the crowning area) may differ between right and left. Moreover, when the rolling contact surface is given full crowning, the center of curvature of the crowning may be axially offset with respect to the axial center position of the roller. Aside from the foregoing effect, the rolling contact surface of the roller becomes uneven in contact surface pressure. It is therefore possible to generate a skew of the roller (a phenomenon in which the axis of the roller tilts with respect to the axis of the clutch) at the time of shift from the locked state to the lock released state. Consequently, the wedge-engaged part (line-contact part) of the roller gradually comes out from one of the axial ends to the other, with reduced frictional resistance during the shift motion. This smoothens the shift motion of the locking means, thereby reducing the operating force and suppressing the occurrence of vibrations and vibrating noise during the shift motion. Otherwise, the skew generating means may use the structure that the rolling contact surface of the roller and contact surface contact therewith are given surface properties that differ between right and left with respect to the axial center position of the roller. Specifically, it is possible to change the surface roughness of the contact surface partially {for example, apply dimpling (such as shot peening) partially}, or apply friction reducing treatment to the contact surface (for example, apply coating for reducing friction, such as phosphate coating).

The clutch unit of the present invention is suitable for a seat-adjusting device of a motor vehicle. In that case, the input-side member is connected to an operation lever and the output-side member is connected to a rotating member of the seat-adjusting device. The seat-adjusting device here includes a seat-height-adjusting device for adjusting the height of a sitting seat, a seat-inclination-adjusting device for adjusting the inclination of a back seat, and a seat-slide-adjusting device for adjusting the front-and-back position of a sitting seat. Of these, it is a seat-height-adjusting device of a sitting seat that the clutch unit of the present invention is particularly suitable for. According to this structure, the height of the sitting seat can be adjusted by operating the operation lever to swing. This can enhance operational convenience as compared to conventional device, and increase the design flexibility of the car body and the seat, being extremely useful to a seat-height-adjusting device of a compact car or a popular car in particular.

BRIEF DESCRIPTION OF THE DRAWINGS

In the accompanying drawings:

FIG. 2(a) is a back side view, FIG. 2(b) is a longitudinal cross-sectional view, and FIG. 2(c) is a partial front view of an outer ring serving as an input-side member;

FIG. 27(a) is a longitudinal sectional view of a fixing side plate, and FIG. 27(b) is a front view of the same;

FIG. 32(a) is a side view showing a natural state of a centering spring of the first clutch part, FIG. 32(b) is a front view showing the natural state of the same, FIG. 32(c) is a front view showing an assembled state of the same, FIG. 32(d) is a front view showing the operation of the same, and FIG. 32(e) is an enlarged side view of essential parts of the same;

FIG. 38(a) is a side view showing the natural state of a centering spring of the first clutch part, FIG. 38(b) is a front view showing the natural state of the same, FIG. 38(c) is a front view showing an assembled state of the same, and FIG. 38(d) is a front view showing the operation of the same;

FIG. 39(a) is a front view showing the natural state of a centering spring of the first clutch part, and FIG. 39(b) is a front view showing an assembled state of the same;

FIGS. 43(a) and 43(b) are perspective views of the retainer of the first clutch part;

FIG. 49 shows an example where the input-side part of a clutch unit according to a fifth embodiment is exclusively configured as an independent clutch unit, FIG. 49(a) being a longitudinal sectional view, FIG. 49(b) being a cross-sectional view (B—B section);

FIG. 51(a) is a perspective view of a second thin member, FIG. 51(b) is a longitudinal sectional side view of the same, and FIG. 51(c) is a front view of the same;

FIG. 56(a) is a front view of an inner ring (control member), FIG. 56(b) is a longitudinal sectional view of the same, and FIG. 56(c) is an enlarged view of essential parts of the same;

FIG. 57(a) is a front view of an outer ring (stationary-side member), and FIG. 57(b) is a longitudinal sectional view of the same;

DETAILED DESCRIPTION OF THE PREFERRED EMBODIMENTS

Preferred embodiments of the present invention will be hereinafter described with reference to the accompanying drawings.

Figure 1:
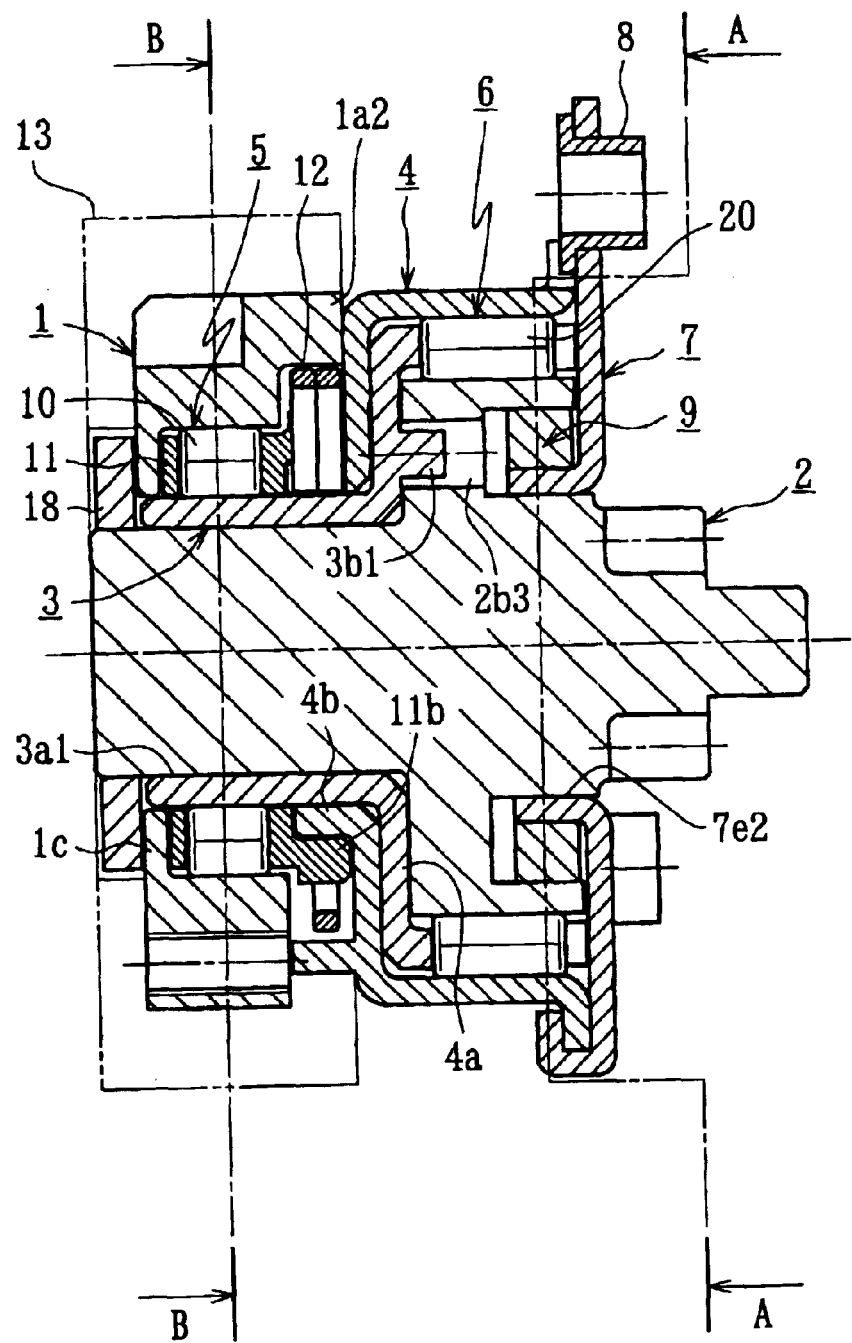
FIG. 1 is a longitudinal cross-sectional view showing a clutch unit X according to one embodiment of the present invention.

FIG. 1 shows the overall structure of a clutch unit according to the first embodiment of the present invention. The clutch unit comprises an outer ring 1 serving as an input-side member, an output shaft 2 serving as an output-side member, an inner ring 3 serving as a control member, an outer ring 4 serving as a stationary-side member, a first clutch part 5 interposed between the outer ring 1 and the inner ring 3, and a second clutch part 6 interposed between the outer ring 4 and the output shaft 2.

FIG. 2 shows the outer ring 1, which serves as an input-side member. The outer ring 1 has a plurality of protruding ribs 1a and 1b, for example three each, as in the illustrated example, at spaced intervals around the outer circumference thereof. One end portion of the rib 1a in its axial direction is divided into two by a recess 1a1, while the other end thereof extends from the end of the outer ring 1 along the axis for forming a protrusion 1a2. Each of the ribs 1b has a screw hole 1b1 formed therein in the axial direction. The ribs 1a and 1b engage circumferentially with an operation lever 13 (see FIG. 1 and FIG. 8) connected to the outer periphery of the outer ring 1, thereby preventing rotation of the operation lever 13 relative to the outer ring 1. The operation lever 13 is screw-held to the outer ring 1 using the screw holes 1b1 in the ribs 1b, so as not to move in the axial direction relative to the outer ring 1. A centering spring 12, to be described later with reference to FIG. 10, of the first clutch part 5, is accommodated in the inner periphery of the protrusions 1a2. The protrusions 1a2 engage circumferentially with stoppers 4a1 of the outer ring 4, to be described later in detail with reference to FIG. 5, thereby restricting the rotation angle of the outer ring 1.

An inner periphery of the outer ring 1 at one end thereof is formed with a collar portion 1c extending radially inwards. The collar portion 1c is provided for the purpose of restrain a retainer 11 (see FIG. 1 and FIG. 9) of the first clutch part 5, to be described later in detail, toward one side in the-axial direction, as well as maintaining the coaxial relationship between the outer ring 1 and the inner ring 3. The outer ring 1 further has a plurality of, for example ten, equally and circumferentially spaced cam surfaces 1d along the inner periphery thereof. Each of the cam surfaces 1d has a deepened center and two surfaces slanting up toward both sides of the circumferential direction.

The outer ring 1 is, for example, forged with a steel material such as steels for case hardening, carbon steels for machine structural use, or bearing steels, and then undergoes suitable heat treatment such as carburizing and tempering, carbonitriding and tempering, induction hardening and tempering, or dip quenching and tempering. In this embodiment, steel for case hardening such as chromium-molybdenum steel SCM415 is employed for the outer ring 1, which is subjected to carburizing and tempering as heat treatment, so that at least the surface layer of the cam surfaces 1d has a surface hardness of HRC57 to 62. In this specification, HRC represents C scale of Rockwell hardness, and HV represents Vickers hardness. The outer ring 1 may also be of a machined product of a steel material, or a press-formed product of a steel plate such as a cold rolled steel sheet.

Figure 3:
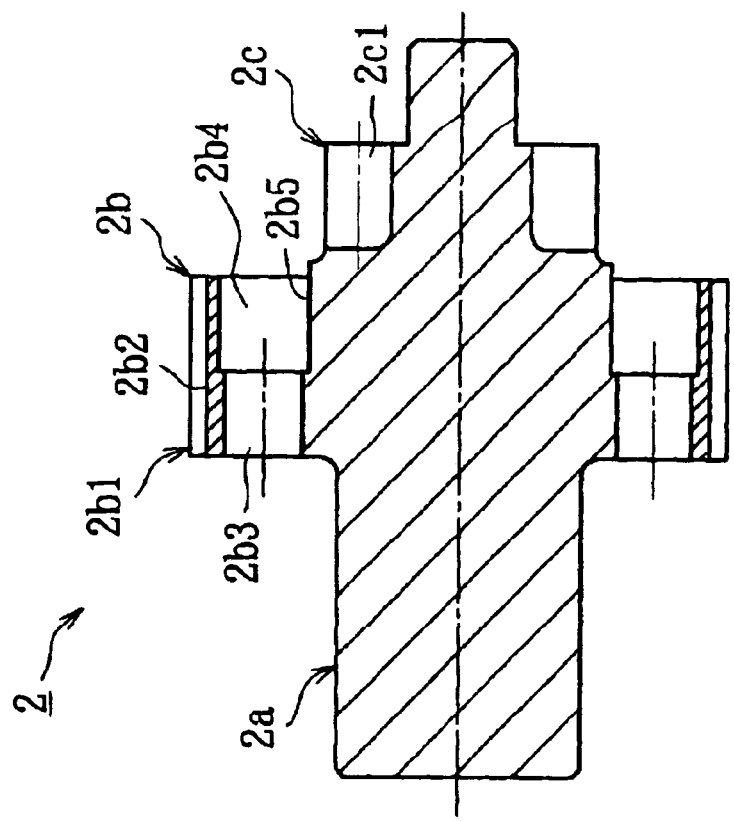
FIG. 3(a) is a front view.
FIG. 3(b) is a longitudinal cross-sectional view of an output shaft serving as an output-side member.
Figure 3:
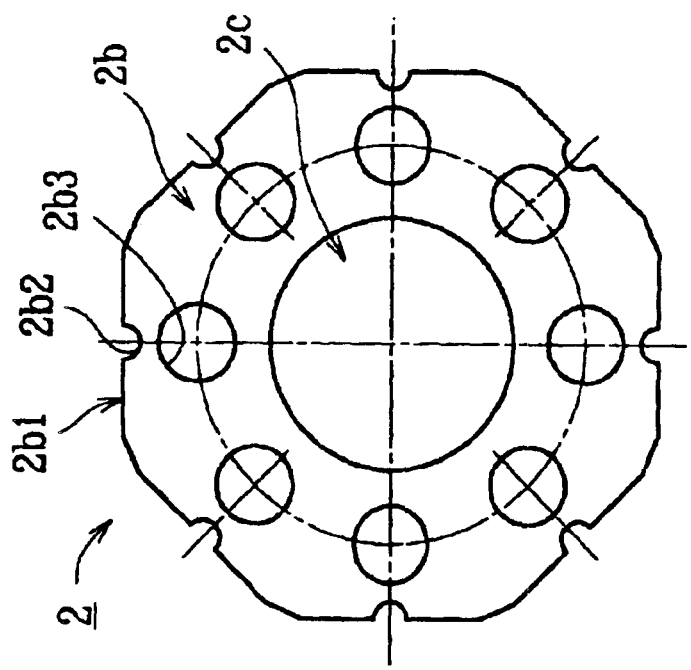
Figure 14:
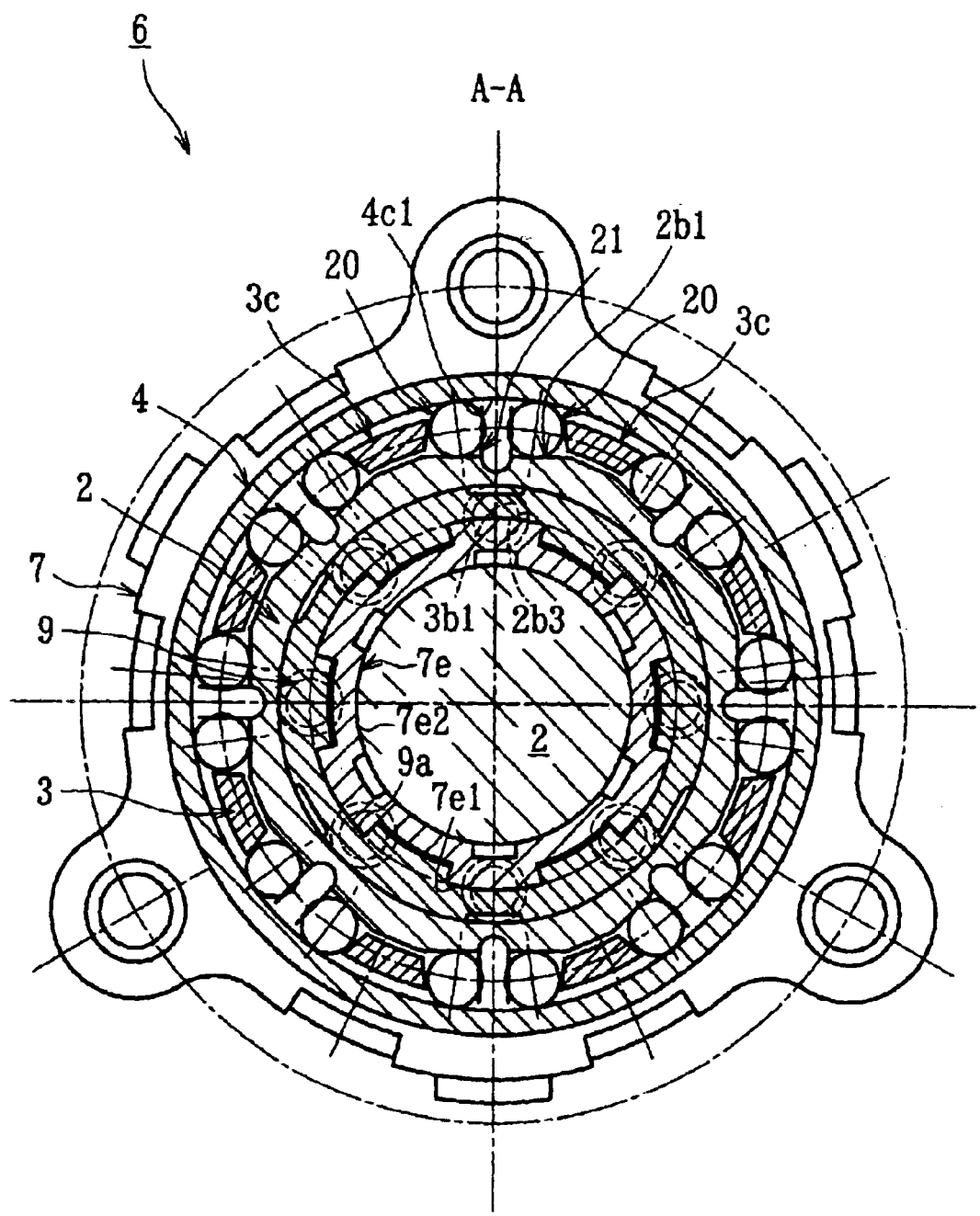
FIG. 14 is a cross-sectional view taken along the line A—A of FIG. 1, showing a second clutch part.

FIG. 3 shows the output shaft 2, which serves as an output-side member. The output shaft 2 comprises a journal portion 2a on one end, a large-diameter portion 2a at the center, and a connecting portion 2c on the other end. The journal portion 2a is inserted in a radial bearing surface 3a1 of the inner ring 3, to be described later in detail with reference to FIG. 4. The large-diameter portion 2a is formed with a plurality of, for example eight, circumferentially equally spaced cam surfaces 2b1 around the outer periphery thereof. Each of the cam surfaces 2b1 forms a flat surface, being a chord with respect to a circle of which center coincides with the axis of the output shaft 2, and has an axially extending groove 2b2 formed in the circumferential center thereof, in which a plate spring 21 of the second clutch part 6, to be described later in detail with reference to FIG. 14, is mounted. The large-diameter portion 2a is formed, in one end thereof, with a plurality of (eight in this embodiment) axially extending pin holes 2b3, at spaced intervals in the circumferential direction. These pin holes 2b3 are provided for receiving pins 3b1 of the inner ring 3, which will be described later with reference to FIG. 4. At the other end of the large-diameter portion 2a is formed with an annular recess 2b4, in which a friction member 9 (see FIG. 7), to be described later, is fitted. The annular recess 2b4 has an inner circumferential wall 2b5, which constitutes a journal surface inserted in a radial bearing surface 7e2 of a fixing side plate 7, which will be described later with reference to FIG. 6. The connecting portion 2c is formed with teeth 2c1 for connecting to other rotary member.

The output shaft 2 is, for example, forged with a steel material such as steels for case hardening, carbon steels for mechanical structural use, or bearing steels, and then undergoes suitable heat treatment such as carburizing and tempering, carbonitriding and tempering, induction hardening and tempering, or dip quenching and tempering. In this embodiment, steel for case hardening such as chromium-molybdenum steel SCM415 is employed for the output shaft 2, which is subjected to carburizing and tempering as heat treatment, so that the surface layer of the output shaft 2 has a surface hardness of HRC57 to 62. The output shaft 2 may also be of a machined product of a steel material.

Figure 4:
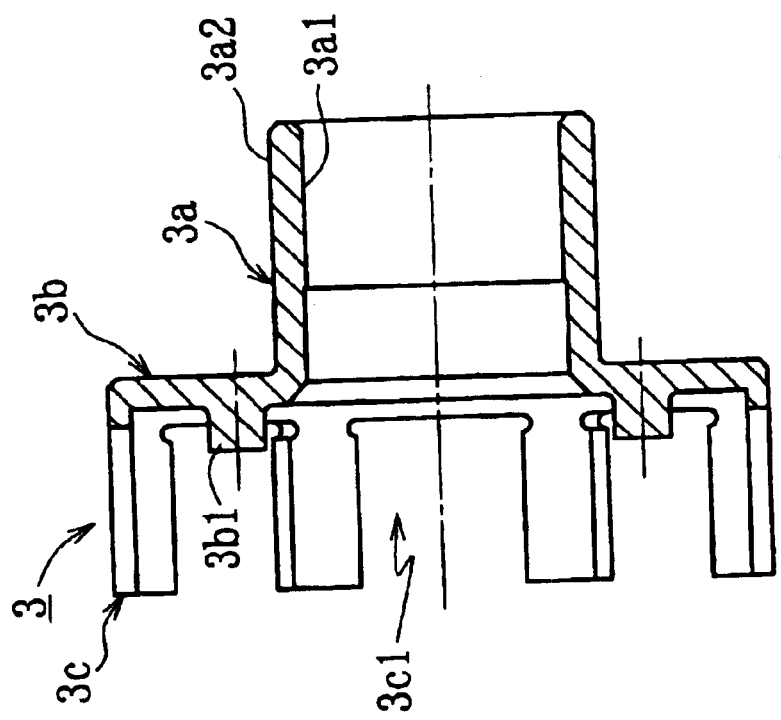
FIG. 4(a) is a front view.
FIG. 4(b) is a longitudinal cross-sectional view of an inner ring serving as a control member.
Figure 4:
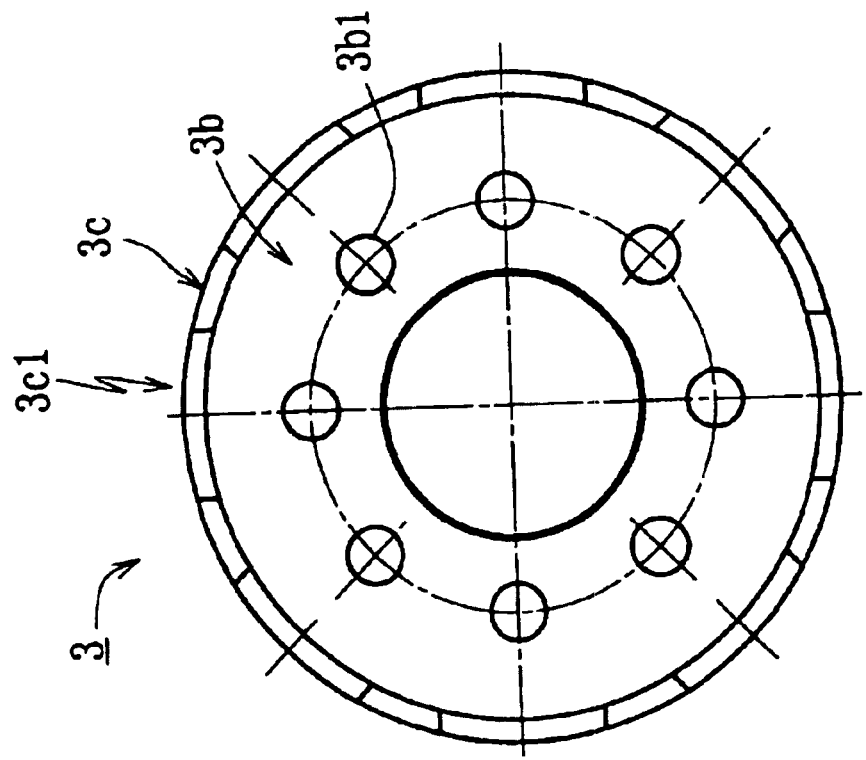

FIG. 4 shows the inner ring 3, which serves as a control member. The inner ring 3 comprises a cylindrical portion 3a, a flange portion 3b extending radially outwards from one end of the cylindrical portion 3a, and a plurality of (eight in this embodiment) column portions 3c extending from the peripheral edge of the flange portion 3b axially toward one side. The cylindrical portion 3a is mounted on the journal portion 2a of the output shaft 2, while being inserted inside of the outer ring 1. An inner periphery of the cylindrical portion 3a at the other end is formed with a radial bearing surface 3a1 for radially supporting the journal portion 2a of the output shaft 2, while at the one end is formed with circumferential surface 3a2, which defines wedge gaps in both normal and reverse directions of rotational together with the cam surfaces 1d of the outer ring 1. The flange portion 3b is formed with a plurality of (eight in this embodiment) pins 3b1 axially extending toward one side and circumferentially spaced at certain intervals. These pins 3b1 are respectively received in the pin holes 2b3 of the output shaft 2. Between the circumferentially arranged adjacent column portions 3c are formed pockets 3c1 opened toward one side of the axial direction, in which rollers 20 of the second clutch part 6, to be described later with reference to FIG. 14, are accommodated.

The inner ring 3 is, for example, is forged with a steel material such as steels for case hardening, carbon steels for machine structural use, or bearing steels, and then undergoes suitable heat treatment such as carburizing and tempering, carbonitriding and tempering with, induced hardening and tempering, or dip quenching and tempering. In this embodiment, steel for case hardening such as chromium-molybdenum steel SCM415 is employed for the inner ring 3, which is subjected to carburizing and tempering as heat treatment, so that the surface layer of the inner ring 3 has a surface hardness of HRC57 to 62. The inner ring 3 may also be of a machined product of a steel material, or a press-formed product of a steel plate such as a cold rolled steel sheet.

Figure 5:
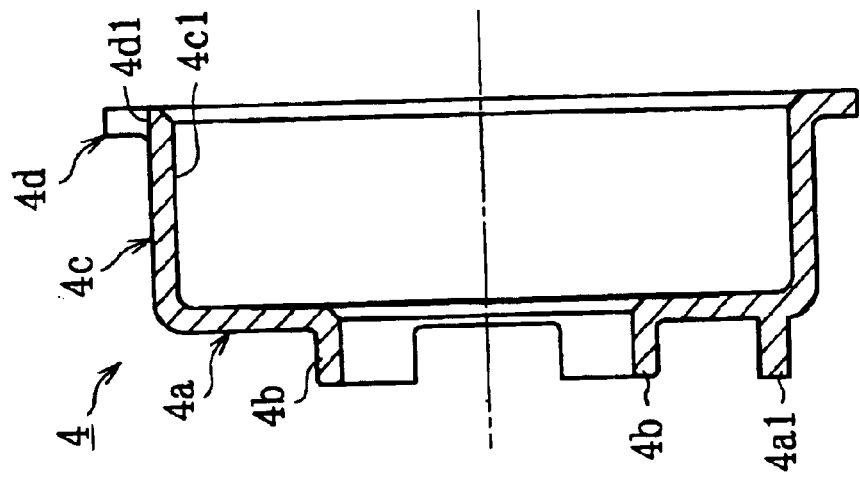
FIG. 5(a) is a front view.
FIG. 5(b) is a longitudinal cross-sectional view of an outer ring serving as a stationary-side member.
Figure 5:
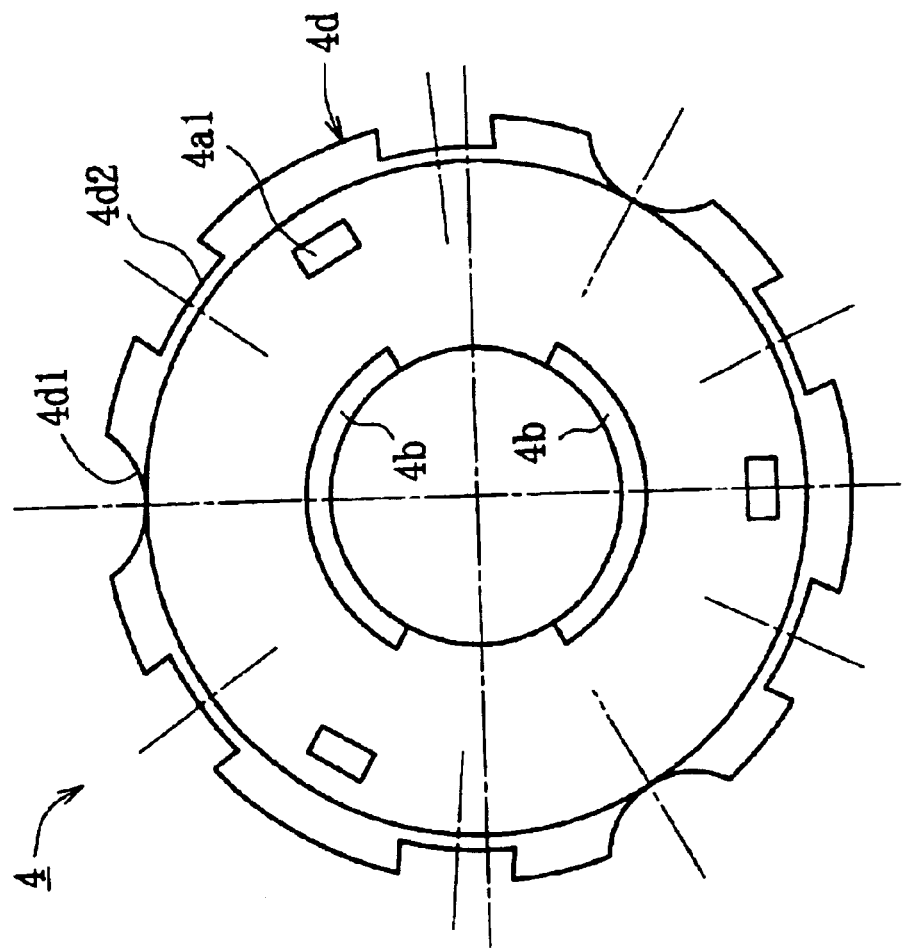

FIG. 5 shows the outer ring 4, which serves as a stationary-side member. The outer ring 4 comprises a radially extending flange portion 4a, engaged portions 4b extending from the inner peripheral edge of the flange portion 4a toward one side of the axial direction, a cylindrical portion 4c extending from the outer peripheral edge of the flange portion 4a toward the other side of the axial direction, and an collar portion 4d radially extending outwards from one end of the cylindrical portion 4c. The flange portion 4a is formed with a plurality of (three in this embodiment) stoppers 4a1 protruded toward one side of the axial direction and arranged circumferentially at predetermined intervals. The stoppers 4a1 make engagement with the protrusions 1a2 of the outer ring 1 in the direction of rotation, thereby restricting the rotation range of the outer ring 1. The engaged portions 4b are paired and formed in an arc shape, for example. The engaged portions 4b are mounted on the outer periphery of the cylindrical portion 3a of the inner ring 3, while being inserted in the inner periphery of engaged portions 11b of the retainer 11 (see FIG. 9) of the first clutch part 5, to be described later. With both ends of one of the engaged portions 4b, a centering spring 12 (see FIG. 10) of the first clutch part 5 engages.

An inner periphery of the cylindrical portion 4c is formed with an inner circumferential surface defining wedge gaps together with the cam surfaces 2b1 of the output shaft 2 in both normal and reverse directions of rotational. The collar portion 4d is formed with a plurality of (three in this embodiment) arc-shaped cutouts 4d1 and a plurality of (six in this embodiment) rectangular cutouts 4d2 at circumferentially spaced intervals. The cutouts 4d1 match the shape of caulking members 8 (see FIG. 1) of a fixing side plate 7, which will be described later. The cutouts 4d2 engage circumferentially with projections 7c of the fixings side plate 7 (see FIG. 6), thereby preventing rotation of the outer ring 4 relative to the fixing side plate 7. Claws 7d of the fixing side plate 7 are caulked to the collar portion 4d.

The outer ring 4 is, for example, forged with a steel material such as steels for case hardening, carbon steels for machine structural use, or bearing steels, and then undergoes suitable heat treatment such as carburizing and tempering, carbonitriding and tempering, induced hardening and tempering, or dip quenching and tempering. In this embodiment, steel for case hardening such as chromium-molybdenum steel SCM415 is employed for the outer ring 4, which is subjected to carburizing and tempering as heat treatment, so that the surface layer of the outer ring 4 has a surface hardness of HRC57 to 62. The outer ring 4 may also be of a machined product of a steel material, or a press-formed product of a steel plate such as a cold rolled steel sheet.

Figure 6:
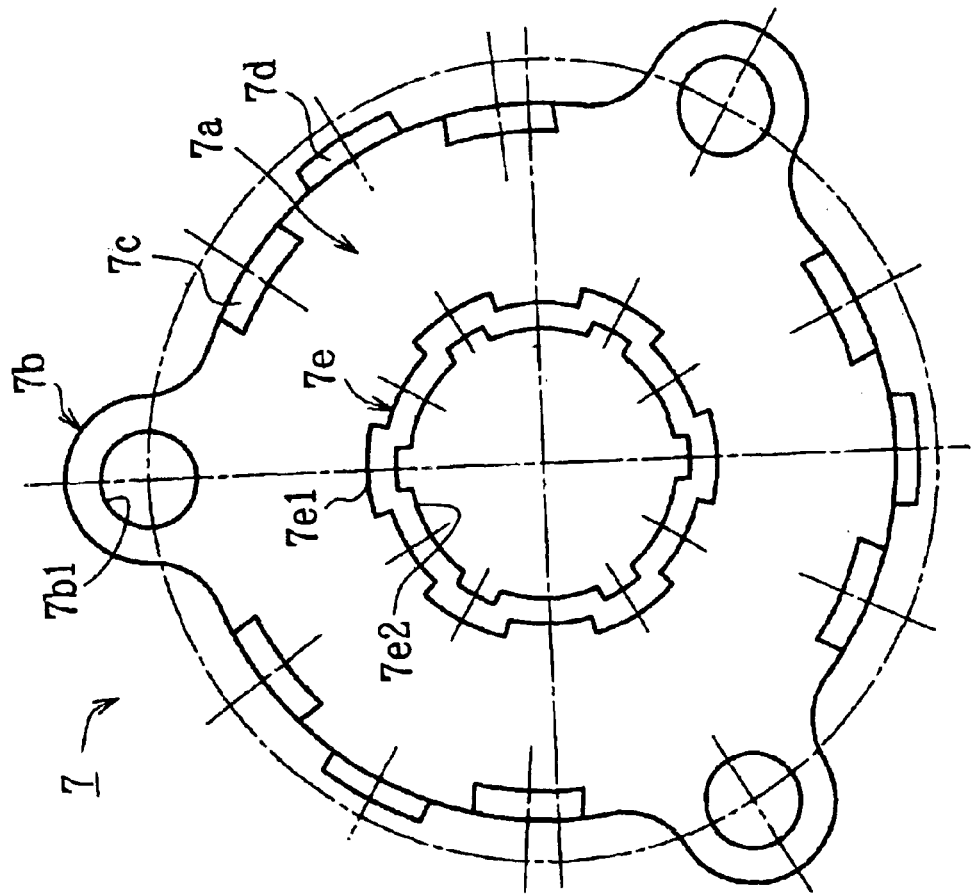
FIG. 6(a) is a longitudinal cross-sectional view.
FIG. 6(b) is a front view of a fixing side plate.
Figure 6:
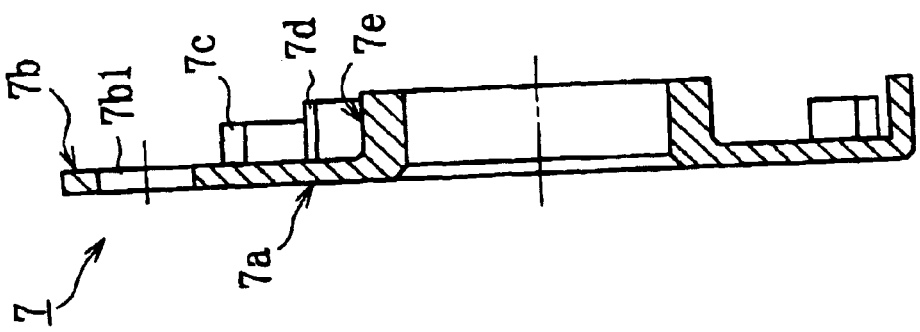

FIG. 6 shows the fixing side plate 7, which is fixed to the outer ring 4. The fixing side plate 7 comprises a radially extending flange portion 7a, a plurality of (three in this embodiment) bracket portions 7b radially protruding outwards from the outer peripheral end of the flange portion 7a, a plurality of (six in this embodiment) projections 7c extending from the outer peripheral end of the flange portion 7a toward one side in the axial direction, a plurality of (three in this embodiment) claws 7d, and an annular boss portion 7e protruding from the inner peripheral end of the flange portion 7a toward one side in the axial direction. The three bracket portions 7b are circumferentially spaced at predetermined intervals, and each of them has a through hole 7b1. The through holes 7b1 are provided for receiving hollow caulking members 8 shown in FIG. 1. The caulking member 8 may be integrally formed with the bracket portion 7b. The six projections 7c are arranged at spaced intervals in the circumferential direction, and they respectively engage in the direction of rotational with the cutouts 4d2 of the outer ring 4, thereby stopping the outer ring 4 from rotating relative to the fixing side plate 7. The three claws 7d are circumferentially arranged at predetermined intervals, and respectively caulked to the collar portion 4d of the outer ring 4, so as to prevent axial movement of the outer ring 4 relative to the fixing side plate 7.

Figure 7:
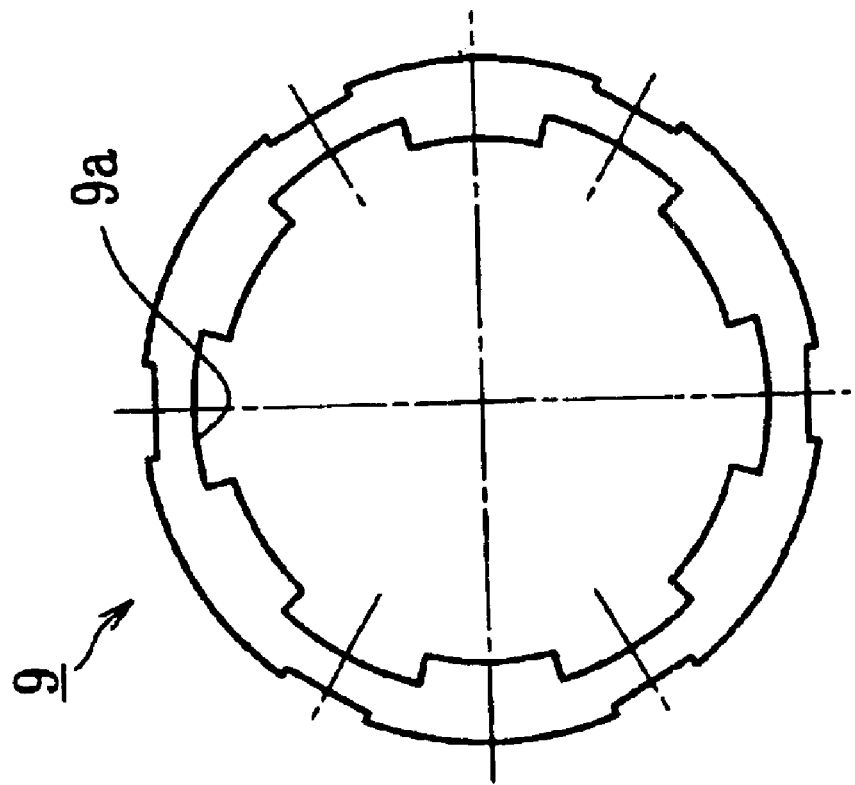
FIG. 7(a) is a longitudinal cross-sectional view.
FIG. 7(b) is a front view of a friction member serving as brake means.
Figure 7:
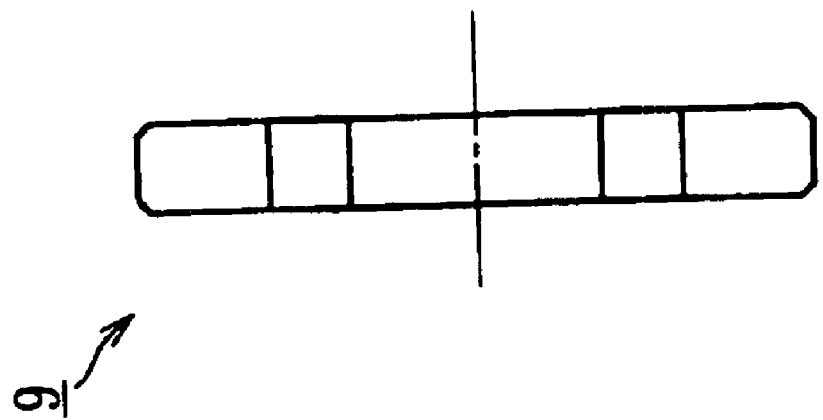

The boss portion 7e includes a plurality of (six in this embodiment) projections 7e1 formed circumferentially around the outer periphery thereof at spaced intervals, and a radial bearing surface 7e2 formed on the inner periphery thereof. The boss portion 7e is inserted into the annular recess 2b4 of the output shaft 2, and a friction member 9, which will be described later with reference to FIG. 7, is fitted with interference in the gap between the outer periphery of the boss portion 7e and the outer circumferential wall of the annular recess 2b4. The projections 7e1 of the boss portion 7e respectively engage with recesses 9a of the friction member 9 in the direction of rotational, so as to prevent the friction member 9 from rotating relative to the fixing side plate 7. The radial bearing surface 7e2 of the boss portion 7e is mounted on the journal surface 2b5 of the annular recess 2b4, thereby radially supporting the journal surface 2b5.

The fixing side plate 7 is a press-formed product of a steel plate such as a cold rolled steel sheet, for example SPCE, as in this preferred embodiment. The fixing side plate 7 used in this embodiment has not undergone any heat treatment in consideration of workability when caulking the claws 7d. Alternatively, the fixing side plate 7 may undergo carburizing (or carbonitriding), after subjecting the portions to be caulked such as claws 7d to anti-curburizing treatment (or anti-carbonitriding treatment).

FIG. 7 shows the friction member 9, which serves as a brake means. The friction member 9 in this embodiment is formed in a ring-like shape and has a plurality of, for example six, recesses 9a arranged circumferentially at predetermined intervals along the inner periphery thereof. The recesses 9a engage with the projections 7e1 of the boss portion 7e of the fixing side plate 7 in the direction of rotational, thereby preventing the friction member 9 from rotating relative to the fixing side plate 7.

The friction member 9 is made of elastic material such as rubber or synthetic resin, and press-fitted between the outer periphery of the boss portion 7e of the fixing side plate 7 and the outer circumferential wall of the annular recess 2b4 of the output shaft 2. The friction generated between the outer periphery of the friction member 9 and the outer circumferential wall of the annular recess 2b4 applies a braking force (frictional braking force) to the output shaft 2 in the direction of rotational. The braking force (braking torque) may be suitably set in accordance with the reverse input torque presumed to be input from the output shaft 2. In order to effectively prevent the flow back phenomenon of the reverse input torque, the braking force (braking torque) should preferably be set substantially the same as the presumed reverse input torque. In the case of the seat-height-adjusting device, the braking force (braking torque) should preferably be set substantially the same as the reverse input torque applied to the output shaft 2 when a sitter is seated on the sitting seat. By using the friction member 9 as brake means in this embodiment, the braking force is advantageously, freely adjustable by changing the size of the interference for the friction member 9.

The friction member 9 can be made of any materials. In this preferred embodiment, the friction member 9 is of an injection-molded product of synthetic resin composed of polyacetar (POM) and glass fiber of 30% in weight.

Figure 8:
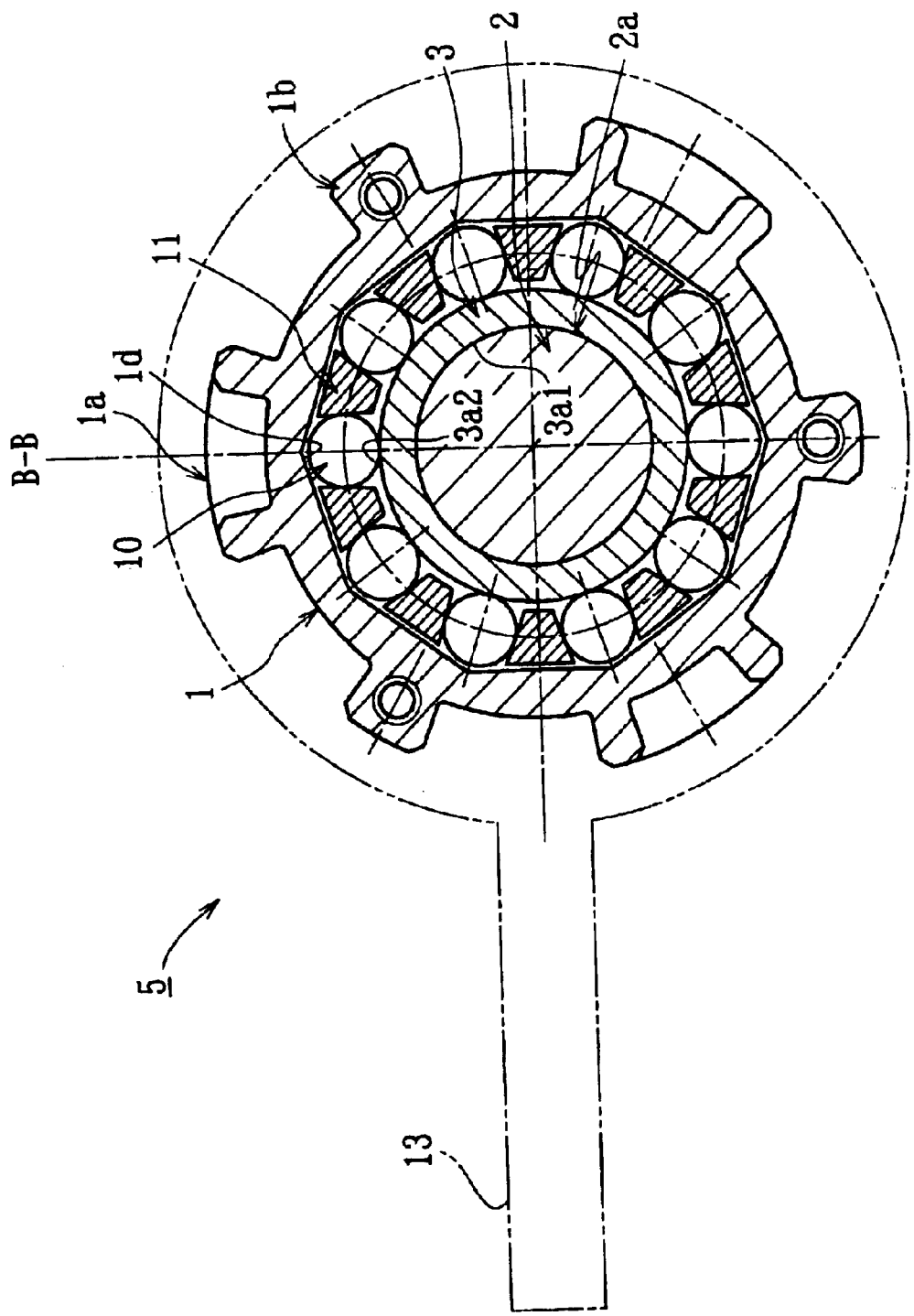
FIG. 8 is a cross-sectional view taken across the line BB of FIG. 1, showing a first clutch part.

FIG. 8 is a cross-section taken along the line B—B of FIG. 1 and shows the first clutch part 5. The first clutch part 5 comprises a plurality of, for example ten, cam surfaces 1d provided to the outer ring 1, the circumferential surface 3a2 provided to the inner ring 3, a plurality of, for example ten, rollers 10 as engaging members interposed between the cam surfaces 1d and the circumferential surface 3a2, a retainer 11 for retaining the rollers 10, and an elastic member, which is for example a centering spring 12 (see FIG. 10) as in this embodiment, for coupling the retainer 11 with the outer ring 4 in the direction of rotational. The cam surfaces 1d, the circumferential surface 3a2, and the rollers 10 constitute locking means, while the retainer 11 and the centering spring 12 constitute returning means. The cam surfaces 1d defines wedge gaps in both normal and reverse directions of rotation together with the circumferential surface 3a2. An operation lever 13 is connected to the outer ring 1, for inputting input torques in normal or reverse directions to the outer ring 1. The space between the inner periphery of the outer ring 1 and the outer periphery of the inner ring 3 (the cylindrical portion 3a), particularly between the cam surfaces 1d and the circumferential surface 3a2, is filled with grease. The grease may be of any type, but in an application of this clutch unit for a vehicle seat-adjusting device, it is preferable to use a grease containing, as a base oil, a lithium-base, urea-base, benton-base, or natrium-base lubricating oil, or a lubricating oil containing no extreme pressure additives, the base oil having viscosity ranging from 10 to 1000 cSt at 37.8° C. This is because the temperature inside of the vehicle compartment can be as high as 80° C. when parked for a long time on a hot summer day.

Figure 9:
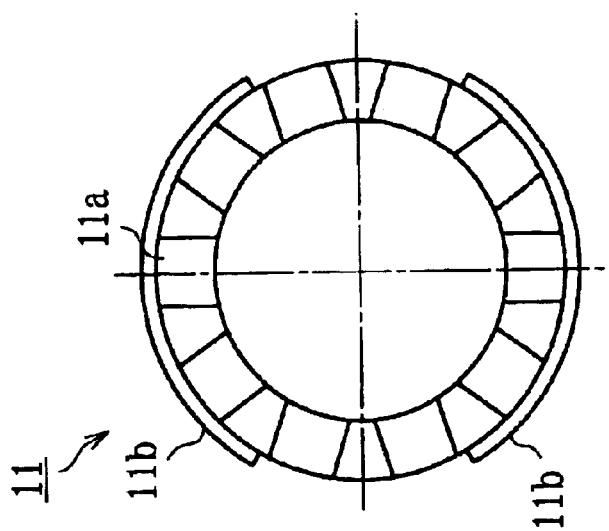
FIG. 9(a) is a front view.
FIG. 9(b) is a longitudinal cross-sectional view.
FIG. 9(c) is a cross-sectional view of a retainer of the first clutch part.
Figure 9:
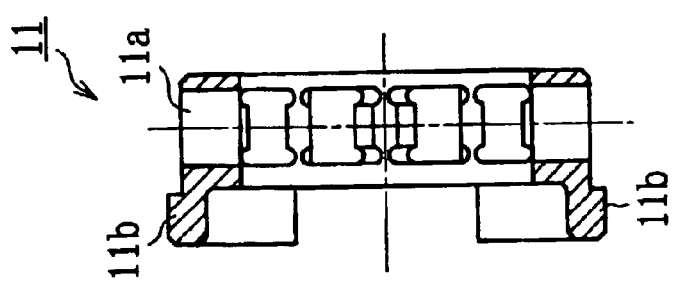
Figure 9:
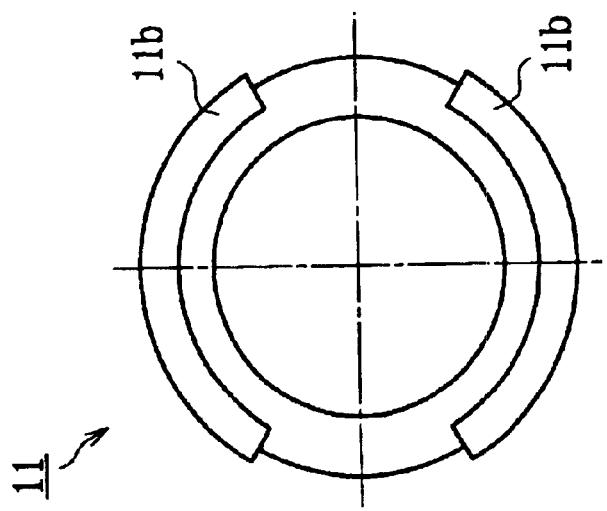

FIG. 9 shows the retainer 11. The retainer 11 comprises a plurality of, for example ten, window-like pockets 11a, and a pair of engaged portions 11b formed in an arc shape, for example, extending axially toward one side from one end face. The engaged portions 11b are mounted on the outer periphery of the engaged portions 4b of the outer ring 4. With the end faces of one of the engaged portions 11b, engaging portions 12a of the centering spring 12 (see FIG. 10) are engaged.

The retainer 11 can be made of any materials. In this preferred embodiment, the retainer 11 is of an injection-molded product of synthetic resin composed of polyamide 66 (PA66) and glass fiber of 30% in weight.

Figure 10:
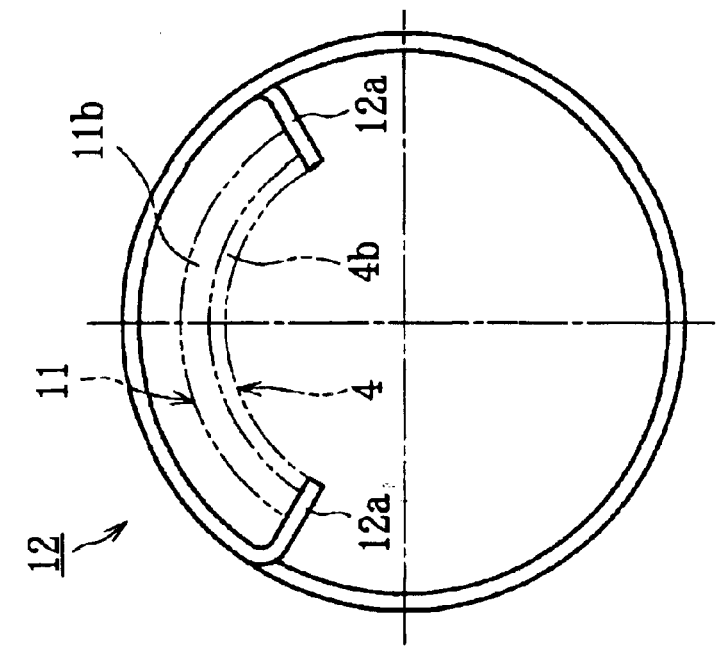
FIG. 10(a) is a side view.
FIG. 10(b) is a front view of a centering spring of the first clutch part.
FIG. 10(c) is a diagram showing the same when mounted.
Figure 10:
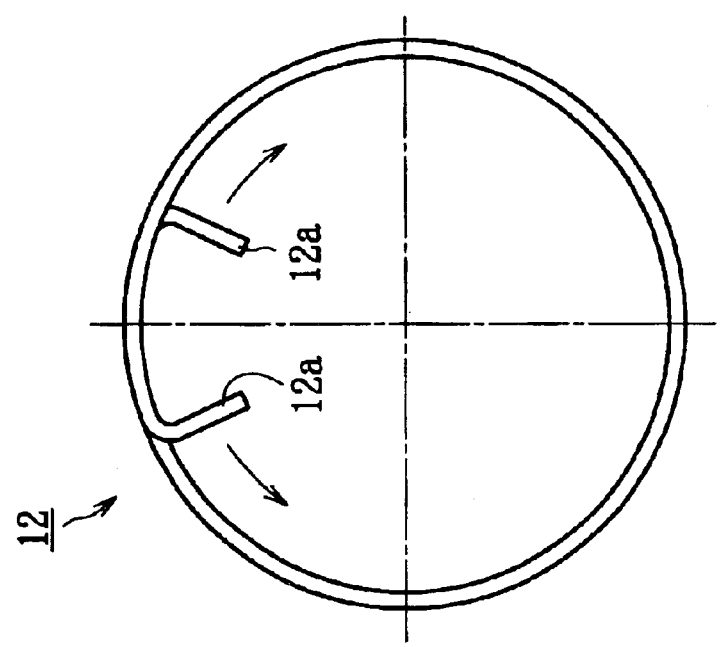
Figure 10:
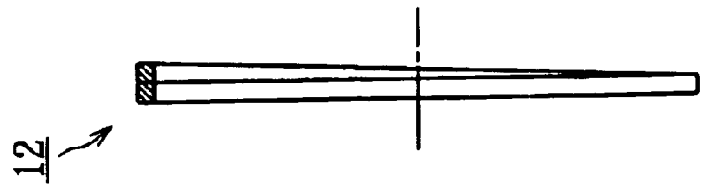

FIG. 10 shows the centering spring 12. The centering spring 12 comprises a pair of engaging portions 12a bent radially inwards and opposed each other at a circumferentially spaced interval. The centering spring 12 is made of wire, such as piano wire (SWPB), as in this preferred embodiment.

The pair of engaging portions 12a are made engagement with the engaged portion 11b of the retainer 11 and the engaged portion 4b of the outer ring 4 while widening an interval between the pair of the engaging portions 12a in circumferential directions form the natural state. At that time, the diameter of the centering spring 12 is somewhat decreased. With the use of the centering spring 12, the retainer 11 and the outer ring 4 are coupled together in the direction of rotation. For example, when the retainer 11 rotates clockwise with respect to the outer ring 4 in FIG. 10(c), one of the engaging portions 12a engaged at the clockwise direction (forward in the direction of rotational) is pushed forward by the engaged portion 11b of the retainer 11 and elastically displaced toward the clockwise direction, while the other engaging portion 12a engaged at the counterclockwise direction (backward in the direction of rotating) is stopped by the engaged portion 4b of the outer ring 4. Thereby, the centering spring 12 deforms in a manner wherein the interval between the pair of engaging portions 12a are widened, i.e., the diameter of the centering spring 12 decreases, and an elastic force is accumulated in accordance with the amount of deformation of the spring. The centering spring 12 accumulates an elastic force in a similar manner in reverse motions when the retainer 11 rotates counterclockwise in FIG. 10(c) relative to the outer ring 4.

Next, the function of the first clutch part 5 will be described with reference to FIGS. 11 through 13. In these drawings, the centering spring 12 and the outer ring 4 are conceptualized and only schematically shown. Illustration of the operation lever 13 is omitted.

Figure 11:
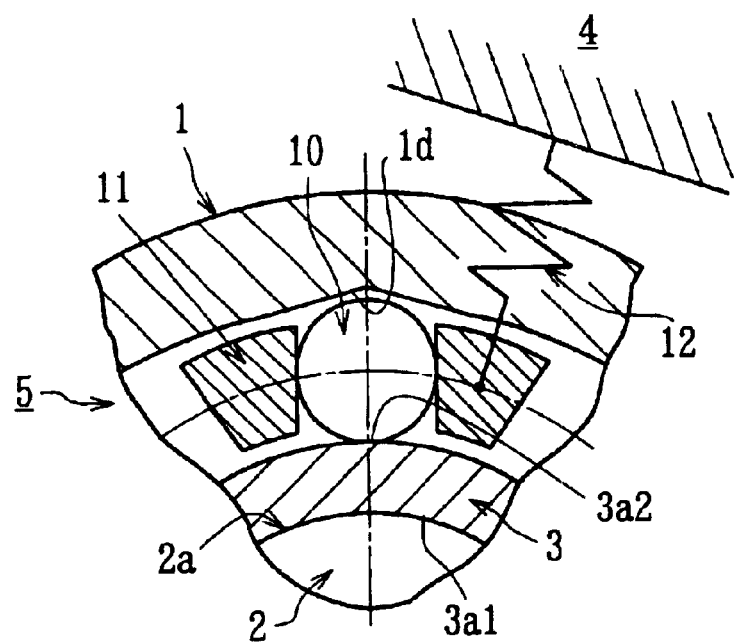
FIG. 11 is an explanatory diagram illustrating the first clutch part at a neutral position.

FIG. 11 shows the neutral position of the first clutch part 5 (in the state shown in FIG. 8). In this position, each of the rollers 10 is located in the middle of the respective cam surface 1d, and comes out from the wedge gap defined between the cam surface 1d and the circumferential surface 3a2 in both normal and reverse directions of rotation. The diameter of the roller 10 is set somewhat smaller than the distance between the center of the cam surface 1d and the circumferential surface 3a2 along the radial direction, so that there is a clearance in the radial direction between the roller 10 and the center of the cam surface 1d, and between the roller 10 and the circumferential surface 3a2. A reverse input torque input from the output shaft 2 is locked in both forward and reverse directions of rotation by the second clutch part 6, as will be described later. Therefore, the inner ring 3 rotates only in response to the input torque input from the operation lever 13 (the outer ring 1), and remains in position even when a reverse input torque is input from the output shaft 2.

Figure 12:
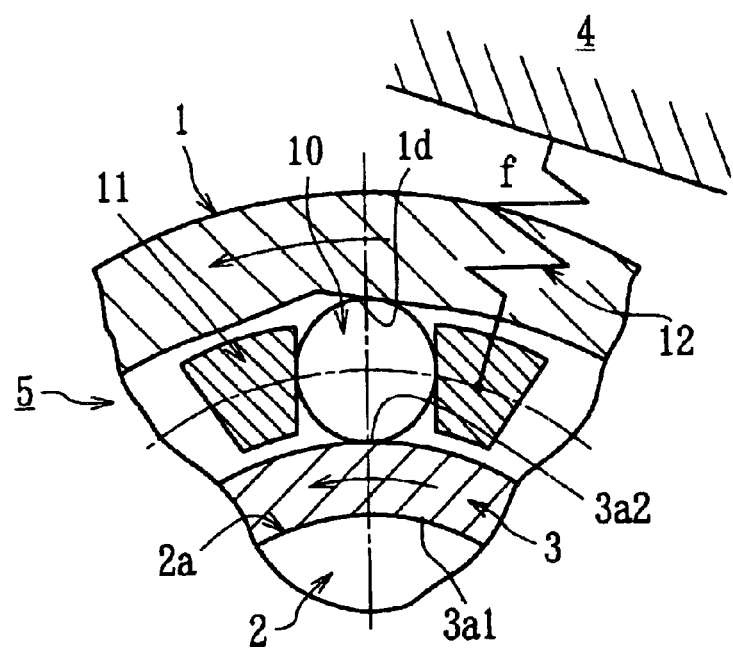
FIG. 12 is an explanatory diagram showing the first clutch part when a torque is transmitted.

FIG. 12 shows a state wherein an input torque has been input to the outer ring 1 by a pivoting movement of the operation lever 13. When the input torque in the counterclockwise direction, for example, input to the outer ring 1, the cam surfaces 1d relatively move in the counterclockwise direction with respect to the rollers 10 accompany with the rotation of the outer ring 1, thereby the rollers 10 come into wedging engagements with the wedge gaps. Thus, the input torque from the outer ring 1 is transmitted to the inner ring 3 through the rollers 10. As a result, the outer ring 1, the rollers 10, the retainer 11, and the inner ring 3 all rotate in the counterclockwise direction together. The rotation of the retainer 11 causes the centering spring 12 to deform, whereby an elastic force f in accordance with the amount of deformation is accumulated. The maximum range of the rotation amount of the outer ring 1 is restricted by the engagements between the protrusions 1a2 of the outer ring 1 and the stoppers 4a1 of the outer ring 4.

Figure 13:
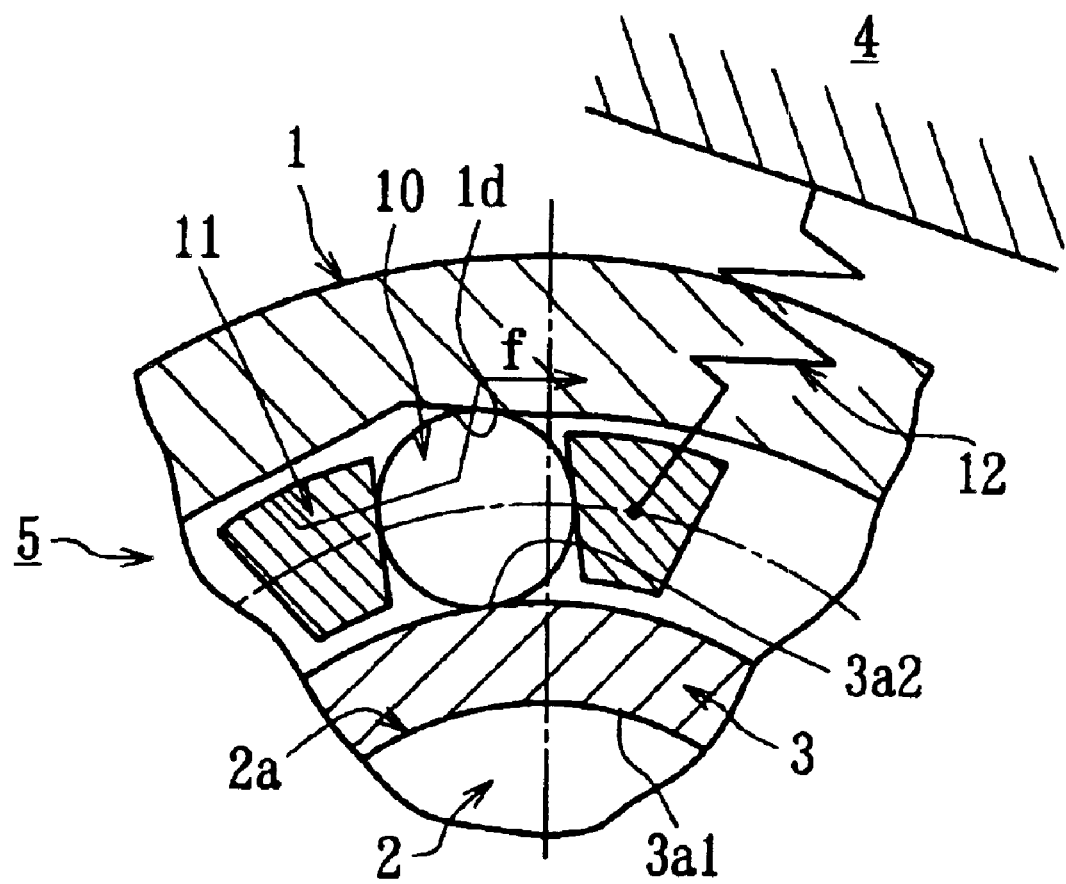
FIG. 13 is an explanatory diagram showing the first clutch part when it is returned to the neutral position.

FIG. 13 shows a state wherein the operation lever 13 (the outer ring 1) has been released after the state shown in FIG. 12. The elastic force f accumulated in the centering spring 12 applies the rotational driving force on the retainer 11 in the clockwise direction, whereby the rollers 10 are pushed by the retainer 11 to press the cam surfaces 1d. Thereupon, as the outer ring 1 has been released, the rollers 10, the retainer 11, and the outer ring 1 freewheel in the clockwise direction with respect to the inner ring 3, thus returning to the neutral position shown in FIG. 11. At this time, the inner ring 3 remains at the position given by the rotating operation shown in FIG. 12. Accordingly, when the rotating operation shown in FIG. 12 is repeated, the amount of rotation given by each of the rotating operations is accumulated in super-imposition to the inner ring 3. It should be noted that, if the input torque is input to the outer ring 1 in FIG. 11 in clockwise direction, the first clutch part 5 operates in reverse movements.

FIG. 14 is a cross-section taken along the line A—A of FIG. 1, and shows the second clutch part 6. The second clutch part 6 comprises the circumferential surface 4c1 provided to the outer ring 4, the plurality of, for example eight, cam surfaces 2b1 provided to the output shaft 2, a plurality of, for example eight, pairs of rollers 20 as engaging members interposed between each of the cam surfaces 2b1 and the circumferential surface 4c1, a plurality of elastic members, such as plate springs 21 having a U-shaped cross-section, interposed between each pair of rollers 20, the column portions 3c of the inner ring 3, the pins 3b1 of the inner ring 3 and the pin holes 2b3 of the output shaft 2. The cam surface 2b1, the circumferential surface 4c1, the paired rollers 20, and the plate spring 21 constitute each of the locking means, while the column portions 3c of the inner ring 3 positioned on both circumferential sides of the paired rollers 20 constitute each of the lock releasing means. The pin 3b1 of the inner ring 3 and the pin hole 2b3 of the output shaft 2 constitute each of the torque transmission means. In this embodiment, the plate springs 21 are made of stainless steel, for example SUS301CPS-H, which has undergone tempering as a heat treatment. The space between the inner periphery of the outer ring 4 and the outer periphery of the output shaft 2 (the large-diameter portion 2a), particularly between the cam surfaces 2b1 and the circumferential surface 4c1, is filled with grease. The grease may be of any type, but preferably it should contain, as a base oil, a lithium-base, urea-base, benton-base, or natrium-base lubricating oil, or a lubricating oil containing no extreme pressure additives, the base oil having viscosity ranging from 10 to 1000 cSt at 37.8° C. This is because the temperature inside of the vehicle compartment can be as high as 80° C. when parked for a long time on a hot summer day.

Figure 15:
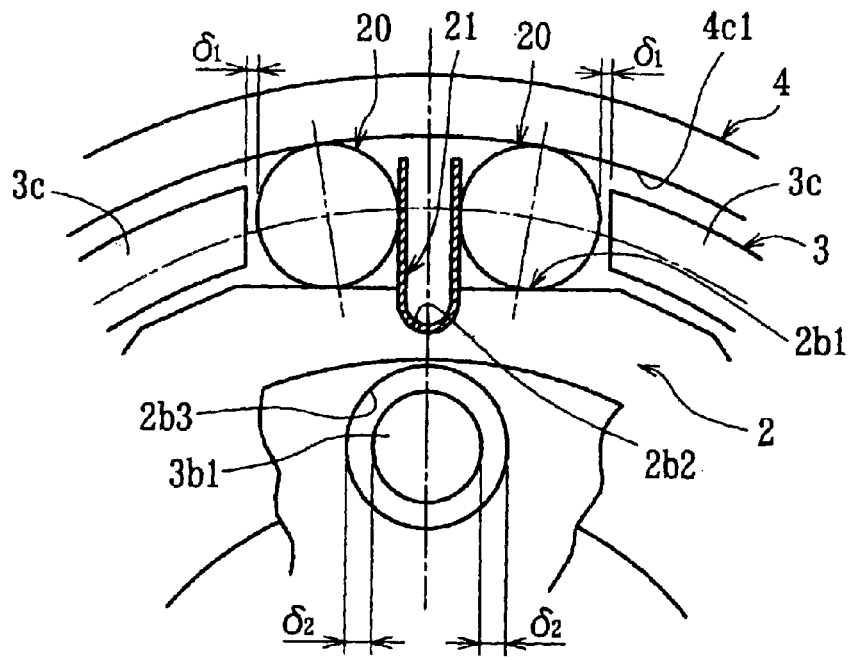
FIG. 15 is a partial cross-sectional explanatory view illustrating, to a larger scale, the second clutch part at a neutral position.

FIG. 15 shows the second clutch part 6 to a larger scale, which is located in a neutral position. In this position, the pairs of rollers 20 are biased by the plate springs 21 toward the wedge gaps defined between the cam surface 2b1 and the circumferential surface 4c1 in both normal and reverse directions of rotational. At this time, there is a rotational direction clearance $\delta 1$ between each of the rollers 20 and the adjacent column portion 3c of the inner ring 3. There is also a rotational direction clearance 2 in normal and reverse directions of rotational respectively between each of pins 3b1 of the inner ring 3 and the pin holes 2b3 of the output shaft 2. The rotational direction clearance $\delta 2$ is larger than the rotational direction clearance $\delta 1$. The rotational direction clearance $\delta 1$ is about 0 to 0.4 mm, at an angle of 0 to 1.5° with respect to the center axis of the second clutch part 6. The rotational direction clearance $\delta 2$ is about 0.4 to 0.8 mm, at an angle of 1.8 to 3.7° with respect to the axis of the second clutch part 6.

In the state shown in FIG. 15, when a reverse input torque, for example, in the clockwise direction is input to the output shaft 2, the roller 20 in the counterclockwise direction (backward in the direction of rotating) comes into wedging engagement with the wedge gap at that direction, thereby the output shaft 2 is locked clockwise with respect to the outer ring 4. When a reverse input torque in the counterclockwise direction is input to the output shaft 2, the roller 20 in the clockwise direction (backward in the direction of rotating) comes into wedging engagement with the wedge gap at that direction, thereby the output shaft 2 is locked counterclockwise with respect to the outer ring 4. Thus, the reverse input torque input from the output shaft 2 is prevented from being transmitted in both normal and reverse directions of rotation by the second clutch part 6.

Figure 16:
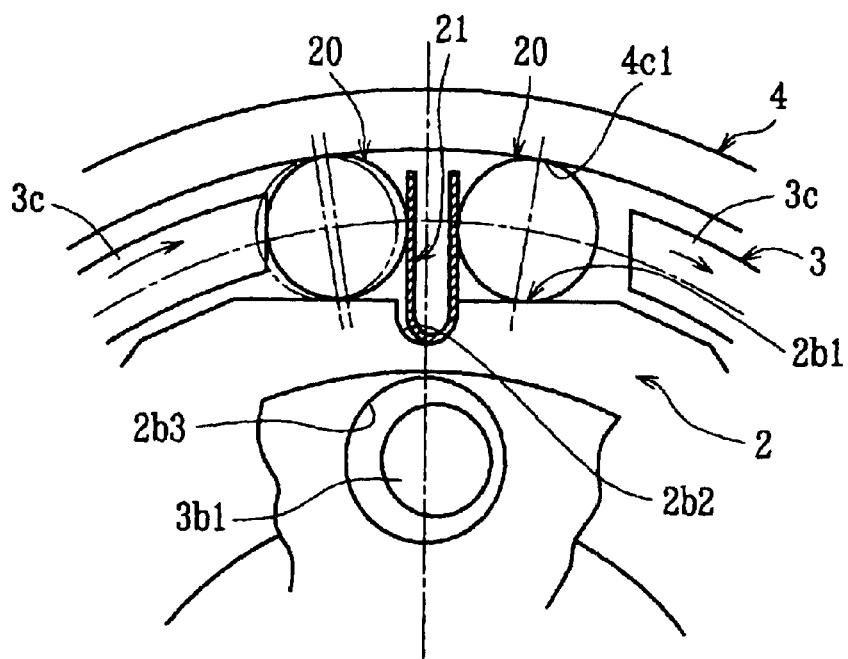
FIG. 16 is a partial cross-sectional explanatory view illustrating, to a larger scale, the second clutch part in an unlocking motion.

FIG. 16 shows an initial state where the input torque (clockwise in the diagram) from the outer ring 1 is input to the inner ring 3 through the first clutch part 5 so that the inner ring 3 starts to rotate clockwise in the diagram. Since the rotational direction clearances are set as $\delta 1 < \delta 2$, the column portion 3c of the inner ring 3 in the counterclockwise direction (backward in the direction of rotation) initially comes into wedging engagement with the roller 20 in that direction (backward in the direction of rotation) and pushes it clockwise (forward in the direction of rotation) against the elastic force of the plate spring 21. Thereby, the roller 20 in the counterclockwise direction (backward in the direction of rotation) comes out from the wedge gap in that direction, so that the locked state of the output shaft 2 is releases. At this time, the roller 20 in the clockwise direction (forward in the direction rotation) does not come into wedging engagement with the wedge gap in that direction. Accordingly, the output shaft 2 becomes to be rotatable in the clockwise direction.

Figure 17:
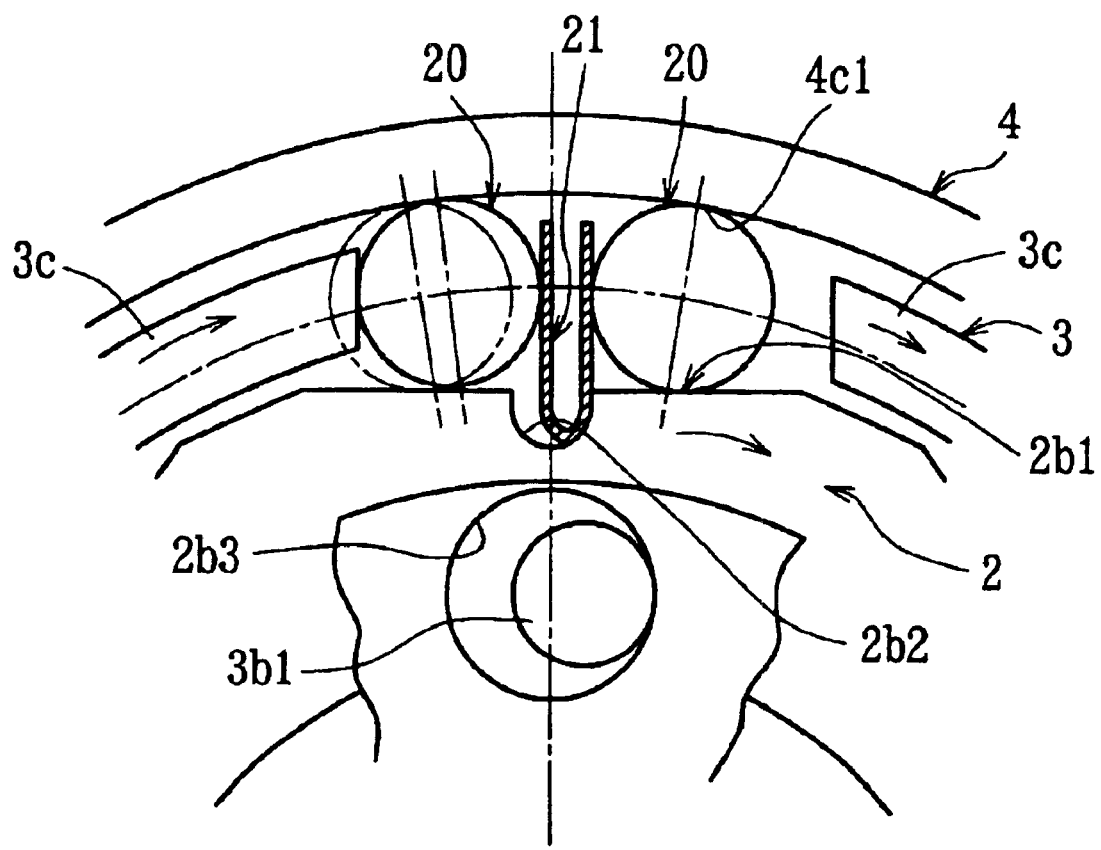
FIG. 17 is a partial cross-sectional explanatory view illustrating the second clutch part to a larger scale when a torque is transmitted.

When the inner ring 3 is further rotated clockwise the pins 3b1 of the inner ring 3 come into engagement with the pin holes 2b3 of the output shaft 2, shown in FIG. 17 clockwise. Thereby, the input torque in the clockwise direction from the inner ring 3 is transmitted to the output shaft 2 through the pins 3b1 and the pin holes 2b3, so that the output shaft 2 is rotated in the clockwise direction. When the input torque in the counterclockwise direction is input to the outer ring 1, the output shaft 2 is rotated counterclockwise in reverse motions as described above. Thus, the input torque from the outer ring 1 in both normal and reverse directions of rotation are transmitted to the output shaft 2 through the first clutch part 5, the inner ring 3, and the pins 3b1 and the pin holes 2b3 as the torque transmission means, so that the output shaft 2 is rotated in both normal and reverse directions of rotation. When the input of torque from the inner ring 3 is stopped, the elastic returning force of the plate springs 21 causes the second clutch part 6 to return to the neutral position shown in FIG. 15.

The outer ring 1, the output shaft 2, the inner ring 3, the outer ring 4, the first clutch part 5, the second clutch part 6, the fixing side plate 7, and the friction member 9 describe above are assembled as shown in FIG. 1 to complete the clutch unit of this embodiment. The operation lever 13 made of e.g. resin is connected to the outer ring 1, and the output shaft 2 is connected to a rotating member of an output-side mechanism (not shown). The fixing side plate 7 is fixed to a fixing member such as a casing (not shown) by caulking the caulking members 8. Incidentally, the outer ring 1 is restrained between a washer 18 attached to outside the collar portion 1c and the flange portion 4a of the outer ring 4 so as not to come off from either of the axial sides.

In the first clutch part 5, the centering spring 12 is accommodated in the inner periphery of the protrusions 1a2 of the outer ring 1, and restrained between one end face of the outer ring 1 and the flange portion 4a of the outer ring 4 so as not to come off from either of the axial sides. In addition, the retainer 11 and the rollers 10 are restrained between the collar portion 1c of the outer ring 1 and the flange portion 4a of the outer ring 4 so as not to come off from either of the axial sides. The retainer 11, the rollers 10, and the centering spring 12 of the first clutch part 5 are accommodated inside the outer ring 1 with no protrusion toward the input-side portion. Moreover, the engaged portions 11b of the retainer 11 are mounted on the outer periphery of the engaged portions 4b of the outer ring 4, so that the rotation of the retainer 11 is guided by the engaged portions 4b of the outer ring 4. The retainer 11 thus can rotate without a tilt, ensuring smooth clutching operation.

The second clutch part 6 is compactly accommodated in a space surrounded by the outer ring 4 and the fixing side plate 7 in radial and axial direction. Besides, the column portions 3c serving as the lock releasing means and the pins 3b1 serving as the torque transmitting means are integrally formed to the inner ring 3, with smaller parts count and simple structure.

Furthermore, because the output shaft 2 is supported in a state of straddle with the radial bearing surface 3a1 of the inner ring 3 and the radial bearing surface 7e2 of the fixing side plate 7, the output shaft 2 stabilizes in rotation, and the first clutch part 5 and the second clutch part 6 are less prone to partial load, allowing smooth clutch operation.

Figure 18:
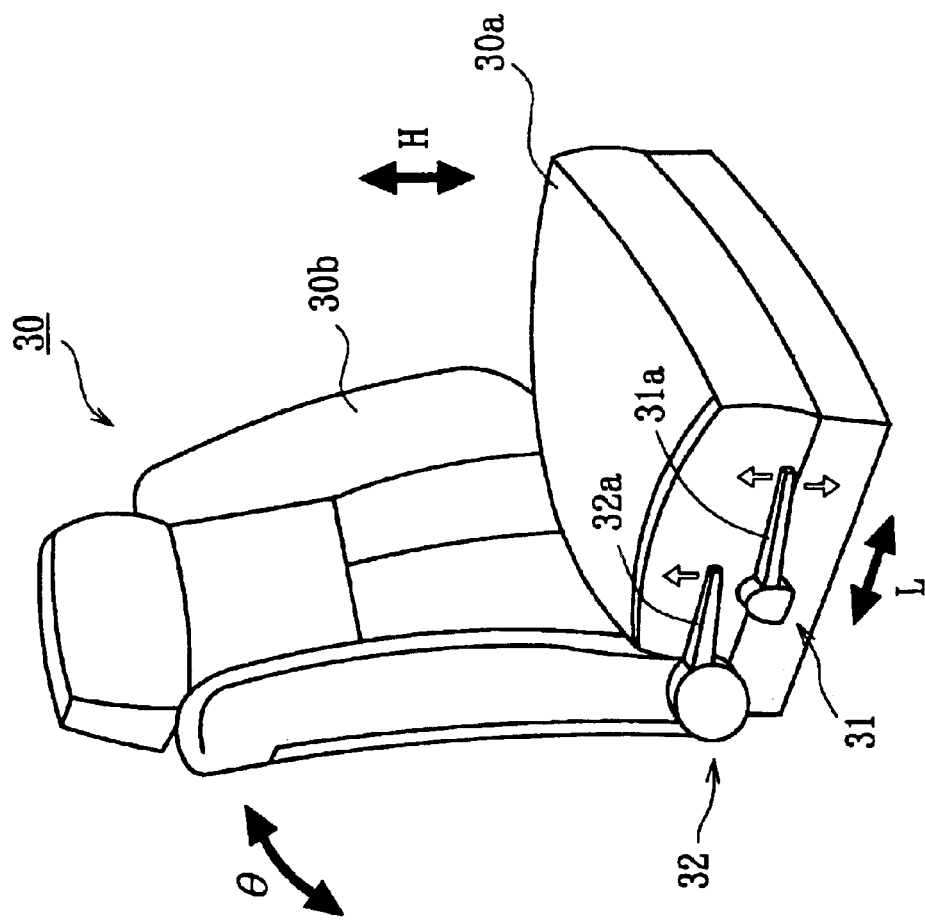
FIG. 18 is a conceptual diagram showing a vehicle seat for an automobile according to one embodiment of the present invention.

FIG. 18 shows a seat 30 equipped in a compartment of a vehicle. The seat 30 is composed of a sitting seat 30a and a backrest 30b, and comprises a seat-height-adjusting device 31 for adjusting the height H of the sitting seat 30a, a seat-inclination-adjusting device 32 for adjusting the inclination angle $\theta$ of the backrest 30b, and a seat-slide-adjusting device (not shown) for adjusting the position L of the sitting seat 30a in forward and backward directions. The adjustment of height H of the sitting seat 30a is effected through the operation lever 31a of the seat-height-adjusting device 31. The adjustment of the inclination angle θ of the backrest 30b is effected through the operation lever 32a of the seat-inclination-adjusting device 32. The adjustment of the position L in forward and backward directions of the sitting seat 30a is effected through an operation lever (not shown) of the seat-slide-adjusting device. The clutch unit of the embodiment described above is incorporated in the seat-height-adjusting device 31, for example.

FIG. 19(a) is a schematic view showing one example of the seat-height-adjusting device 31. One end of a link member 31c and one end of a link member 31d are pivotally connected to a slidable member 31b1 of a seat slide adjuster 31b respectively. The other ends of the link members 31c and 31d are pivotally connected to the sitting seat 30a respectively. The other end of the link member 31c is also pivotally connected to a sector gear 31f through a link member 31e. The sector gear 31f is pivotally connected to the sitting seat 30a, and is able to pivot around a fulcrum 31f1. The clutch unit X of the embodiment described above is fixed to an appropriate region of the sitting seat 30a through the fixing side plate 7. An operation lever 31a made of, e.g., resin (corresponding to the operation lever 13 in FIGS. 1 and 8) is connected to the outer ring 1 thereof. A pinion gear 31g for meshing with the sector gear 31f is connected to the output shaft 2.

For example, in FIG. 19(b), when the operation lever 31a is operated to pivot in the counterclockwise direction (upward), an input torque in that direction is transmitted to the pinion gear 31g through the clutch unit X so that the pinion gear 31g rotates in the counterclockwise direction. Then, the sector gear 31f meshing with the pinion gear 31g pivots clockwise to pull the other end of the link member 31c through the link member 31e. As a result, the link member 31c and the link member 31d are both erected to elevate the sitting surface of the sitting seat 30a. After the height H of the sitting seat 30a is adjusted in this way, the operation lever 31a is released. Because of the elastic force (elastic returning force) of the centering spring 12 of the first clutch part 5, the operation lever 31a pivots clockwise to return to its original position (neutral position) Incidentally, when the operation lever 31a is operated to pivot in the clockwise direction (downward), the sitting surface of the sitting seat 31a sinks by the action reverse to the foregoing. Moreover, when the operation lever 31a is released after the height adjustment, the operation lever 31a pivots in the counterclockwise direction to return to its original position (neutral position).

According to the seat-height-adjusting device 31 described above, the height H of the sitting seat 30a is adjustable only by the pivoting operation of the operation lever 13. The height position of the sitting seat 30a after the height adjustment is automatically maintained. The operation lever 13, when released, automatically returns itself smoothly to its neutral position, without generating any noise as in a ratchet mechanism. Moreover, the braking force in the rotational direction is applied to the output shaft 2 by the friction member 9, so that the flow back phenomenon of the reverse input torque when operating the lever 13 is eliminated or reduced, ensuring stable adjusting operation.

Figure 20:
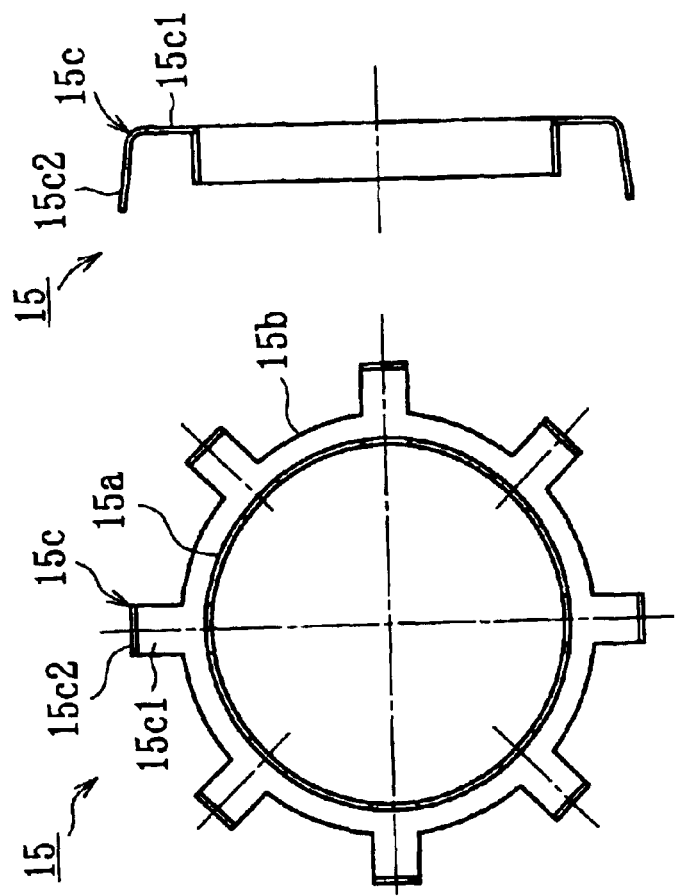
FIG. 20(a) is a longitudinal cross-sectional view of a clutch unit Y according to another embodiment of the invention.
FIG. 20(b) is a front view of a friction member.
FIG. 20(c) is a cross-sectional view of the friction member.
Figure 20:
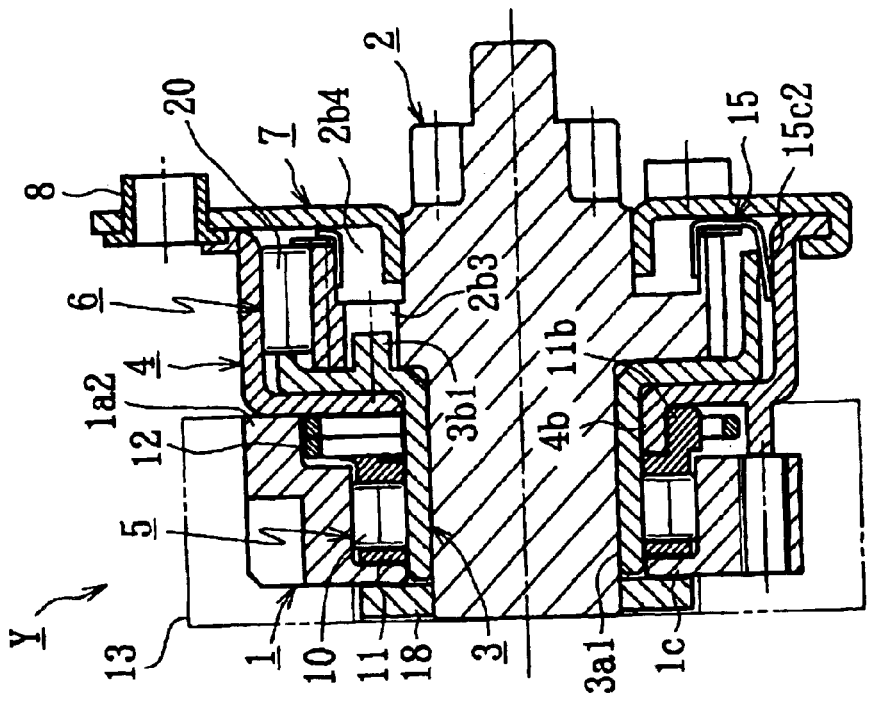

FIG. 20 shows a clutch unit according to the second embodiment of the present invention. The clutch unit according to the embodiment is different from the clutch unit according to the first embodiment described above in that the friction member 9, as the braking means, made of an elastic material such as rubber or synthetic resin is replaced with a friction member 15 having spring elasticity, as the braking means. The friction member 15 is made of a metallic material such as spring steel, and comprises a fitting portion 15a fitted in the outer circumferential wall of the annular recess 2b4 of the output shaft 2, a collar portion 15b continuous with one end of the fitting portion 15a, and a plurality of, for example eight, projections 15c radially extending outwards from the collar portion 15b. The fitting portion 15a is press-fitted with interference to the outer circumferential wall of the annular recess 2b4 of the output shaft 2, thereby preventing the friction member 15 from rotating relative to the output shaft 2. Each of the projections 15c includes a radially extending piece 15c1 and a tongue 15c2 obliquely extending from the end of the radially extending piece 15c1. The tongues 15c2 of the friction member 15 fit to the inner periphery of the outer ring 4 with interference, thereby providing a braking force (frictional braking force) to the output shaft 2 in the direction of rotation. The fitting portion 15a of the friction member 15 may take any form as long as it is capable of preventing from the rotation relative to the outer circumferential wall of the annular recess 2b4. In addition to the fit with interference as described above, it may make projection-recess engagement in the direction of rotation with the outer circumferential wall of the annular recess 2b4, for example. Since other respects of the embodiment are identical or similar to the first embodiment described above, the descriptions thereof are omitted.

Figure 21:
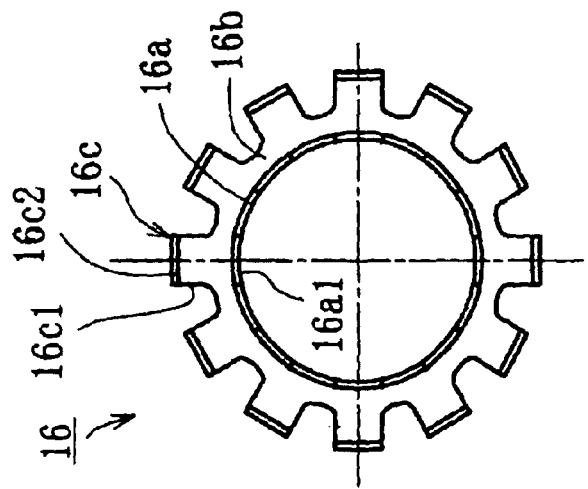
FIG. 21(a) is a longitudinal cross-sectional view of a clutch unit Z according to yet another embodiment of the invention.
FIG. 21(b) is a front view of a friction member.
FIG. 21(c) is a cross-sectional view of the friction member.
Figure 21:
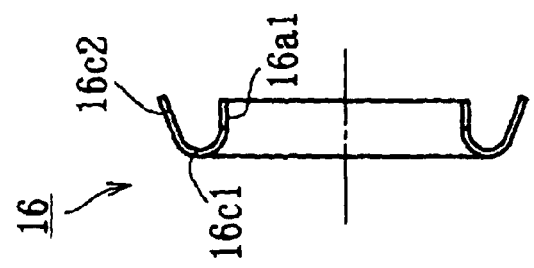
Figure 21:
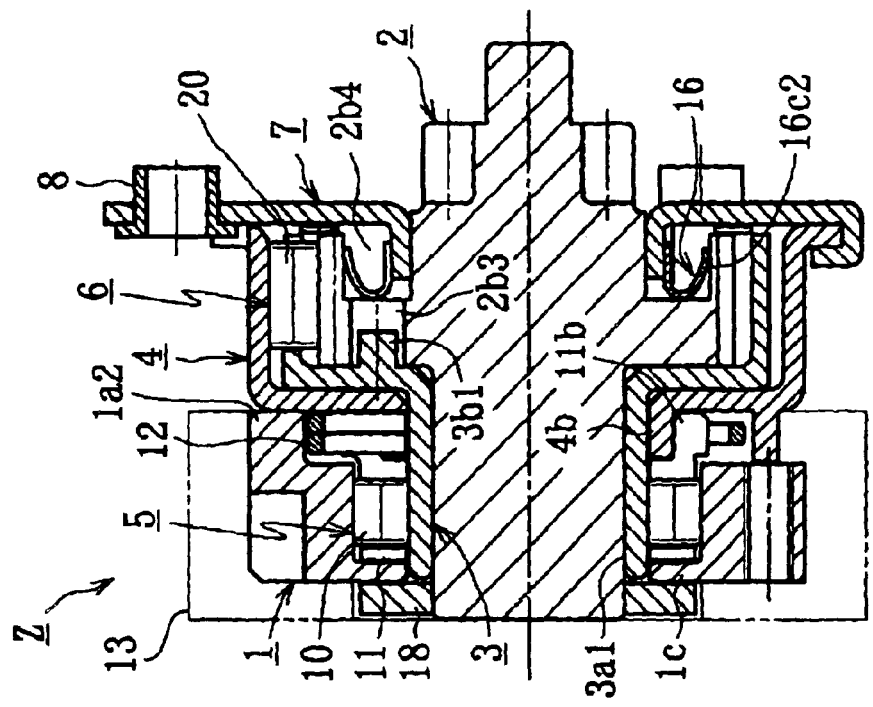

FIG. 21 shows a clutch unit according to the third embodiment of the present invention. The clutch unit according to the embodiment is different from the clutch unit according to the first embodiment described above in that the friction member 9, as the braking means, made of an elastic material such as rubber or synthetic resin is replaced with a friction member 16 having spring elasticity, as the braking means. The friction member 16 is made of a metallic material such as spring steel, and includes a mount portion 16a mounted on the boss portion 7e of the fixing side plate 7, a collar portion 16b continuous with one end of the mount portion 16a, and a plurality of, for example twelve, projections 16c radially extending outwards from the collar portion 16b. The mount portion 16a includes a plurality of, for example twelve, cutouts 16a1, for engaging in the direction of rotational with corresponding projections formed on the boss portion 7e of the fixing side plate 7, so as to prevent rotation of the friction member 16 relative to the fixing side plate 7. Each of the projections 16c includes a curved part 16c1, and a tongue 16c2 obliquely extending from the end of the curved part 16c1. The tongues 16c2 of the friction member 16 fit to the outer circumferential wall of the annular recess 2b4 of the output shaft 2 with interference, thereby providing a braking force (frictional braking force) to the output shaft 2 in the rotational direction. The mount portion 16a of the friction member 16 may take any form as long as it is capable of preventing from the rotation relative to the boss portion 7e of the fixing side plate 7. In addition to the projection-recess engagement in the direction of rotation as described above, it may make fit with interference to the boss portion 7e of the fixing side plate 7, for example. Since other respects of the embodiment are identical or similar to the first embodiment described above, the descriptions thereof are omitted.

Figure 22:
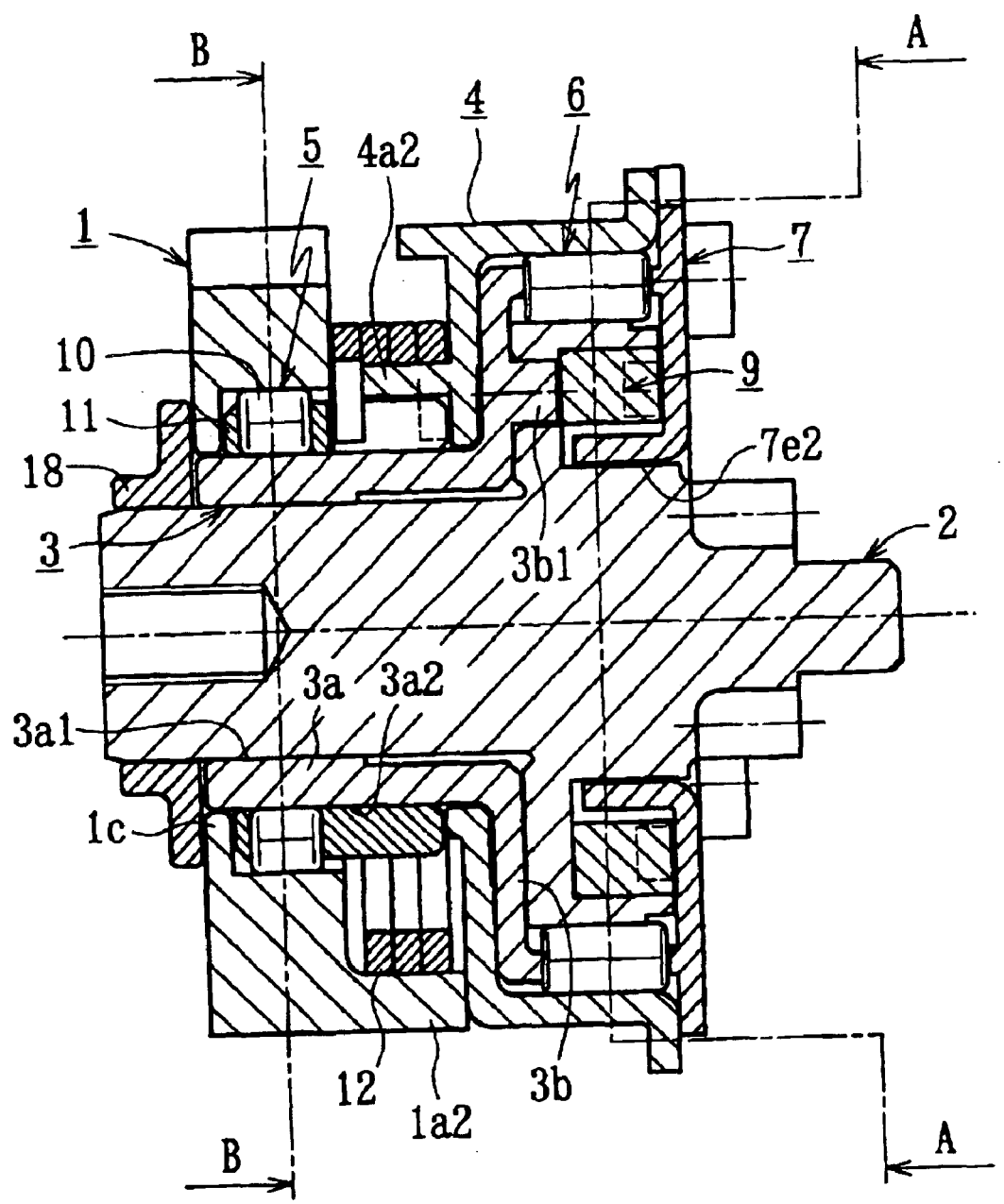
FIG. 22 is a longitudinal sectional view showing a clutch unit according to a fourth embodiment of the present invention.

FIG. 22 shows the entire structure of a clutch unit according to a fourth embodiment of the present invention. The clutch unit of this embodiment comprises an outer ring 1 as an input-side member, an output shaft 2 as an output-side member, an inner ring 3 as a control member, an outer ring 4 as a stationary-side member, a first clutch part 5 arranged between the outer ring 1 and the inner ring 3, and a second clutch part 6 arranged between the outer ring 4 and the output shaft 2.

Figure 23:
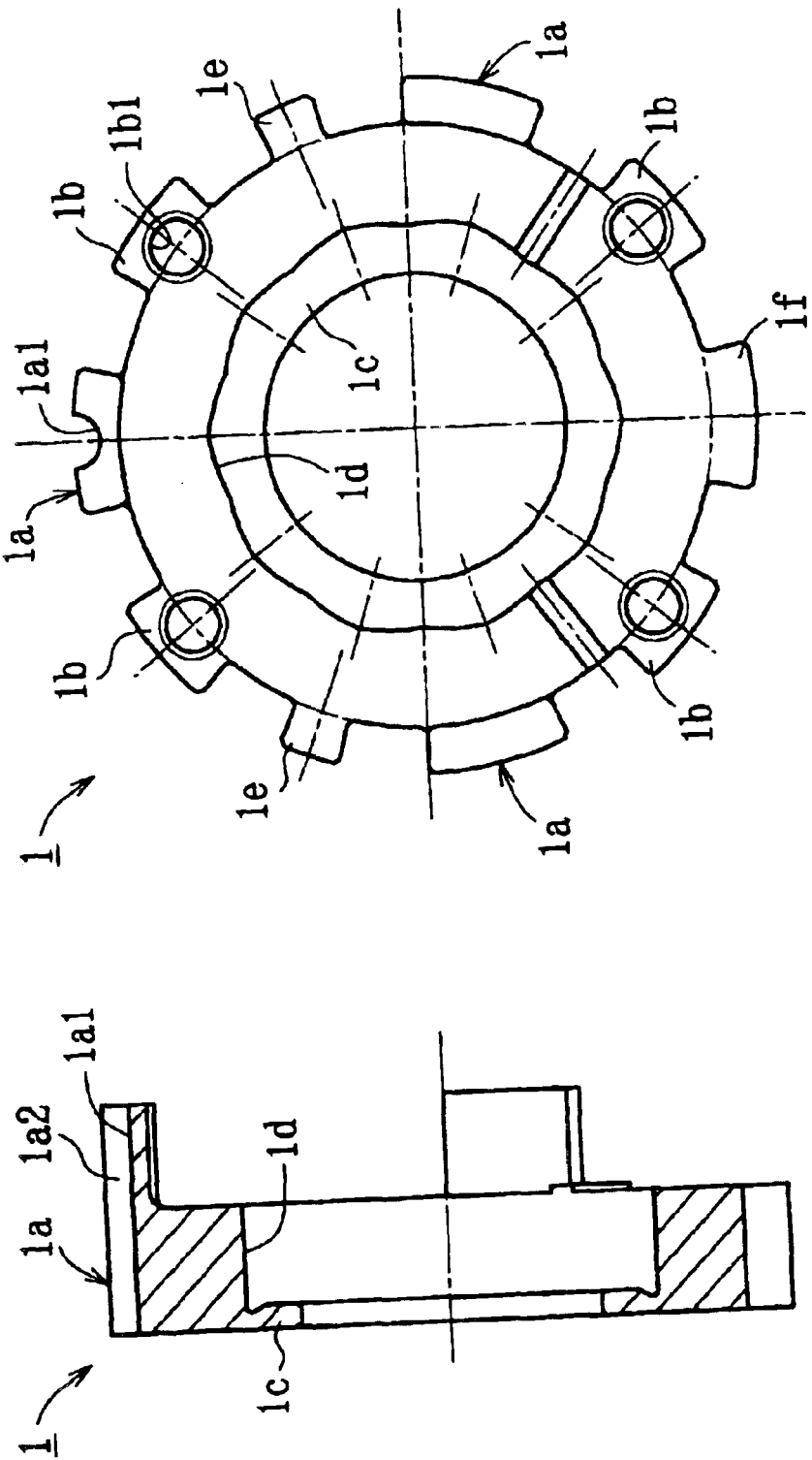
FIG. 23(a) is a longitudinal sectional view of an outer ring (input-side member)
FIG. 23(b) is a rear view of the same.

FIG. 23 shows the outer ring 1, as the input-side member. A plurality (three, for example) of ribs 1a, a plurality (four, for example) of ribs 1b, a plurality (two, for example) of ribs 1e, and one or more ribs 1f protruding outward are formed on the outer periphery of the outer ring 1 at predetermined circumferential intervals. An axial end portion of each rib 1a axially protrudes from an end of the outer ring 1, thereby forming a protruding portion 1a2. In addition, the outer periphery of any one of the three ribs 1a, for example, the rib 1a lying at the top in the diagram is provided with a distinction mark 1a1 intended for directional distinction in mounting this clutch unit on a mating member. In this embodiment, the distinction mark 1a1 has the shape of an axial groove. These ribs 1a, 1b, 1e, and 1f are engaged, in the direction of rotation, with the operation lever (13: see FIGS. 29 and 30) to be mounted on the outer periphery of the outer ring 1, thereby preventing the operation lever (13) from relative rotation with respect to the outer ring 1.

Figure 30:
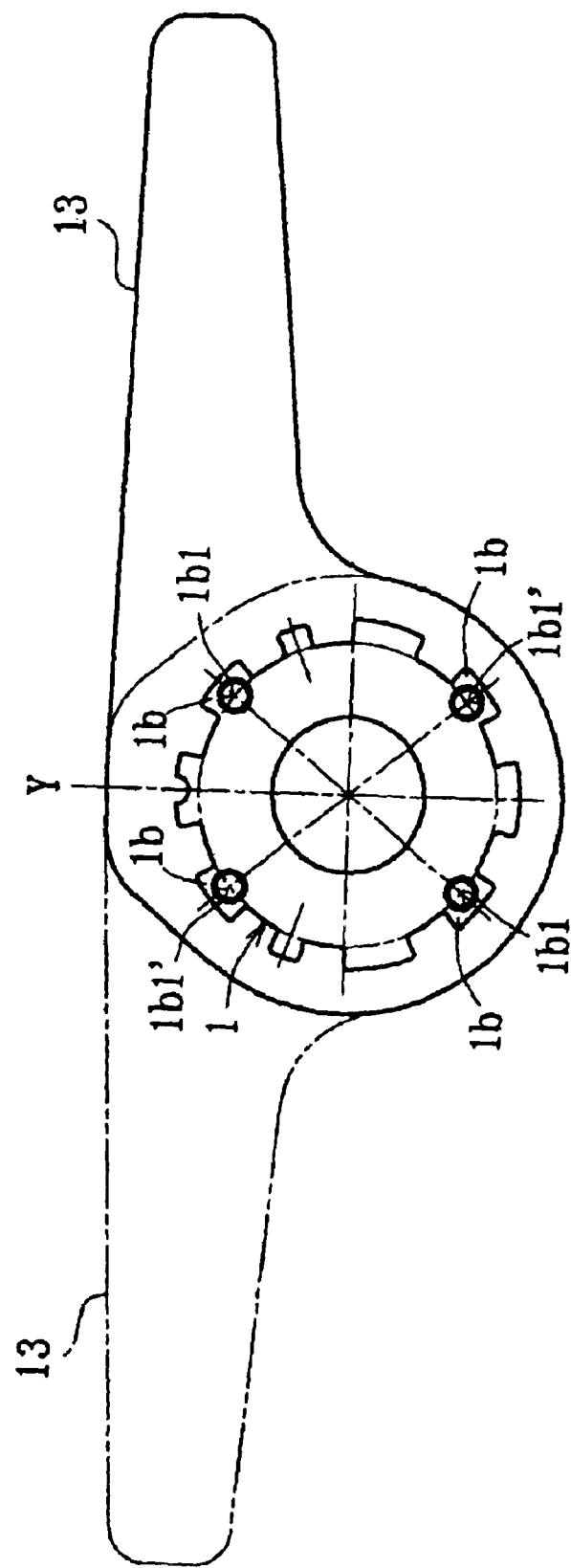
FIG. 30 is a front view showing an operation lever.

Axial screw holes 1b1 are formed in the ribs 1b. Axial relative movement of the operation lever (13) with respect to the outer ring 1 is prevented by screwing the operation lever (13) to the screw holes 1b1 in the ribs 1b. As shown in FIG. 30, in this embodiment, the outer ring 1 is shaped horizontally symmetric with respect to the Y axis in the diagram so that the operation lever (13) can be connected thereto either of rightward or leftward, whereby the clutch unit and the operation level (13) may be arranged on either of right and left sides of a seat depending on whether the vehicle is of right-hand drive or left-hand drive, and such factors as car-body and seat design. In this case, the operating torque of the operation lever (13) acts chiefly on the screwing portions of two ribs 1b lying at 180° opposite positions. Thus, these two ribs 1b may be provide with the screw holes 1b1 while prepared holes (through holes) for machining screw holes 1b1 are left as-is in the other two ribs 1b. This allows a reduction in the machining cost for hole threading. For example, when the operation lever (13) is connected rightward in the diagram (full line), the two ribs 1b lying on the oblique line that is inclined rightward with respect to the Y axis in the diagram are provided with the screw holes 1b1 while the two ribs 1b lying on the oblique line inclined leftward are given the prepared holes 1b1'. The arrangement shall be inverted from the foregoing when the operation lever (13) is connected rightward in the diagram (double-dotted chain line). Needless to say, the screw holes 1b1 may be formed in all the four ribs 1b.

The inner periphery of the protruding portions 1a2 accommodates a centering spring (12: see FIG. 32) of the first clutch part (5) to be described later. Besides, the protruding portions 1a2 are engaged with stopper portions (4a1) of the outer ring (4: see FIG. 26) to be described later, in the direction of rotation, so that the outer ring 1 is restrained in the range of rotation.

A collar portion 1c extending inward is formed on the inner periphery of the outer ring 1 at the other end. This collar portion 1c has the functions of restraining a retainer (11: see FIGS. 22 and 31) of the first clutch part (5) to be described later from coming off in one of the axial directions, and maintaining the outer ring 1 coaxial to the inner ring 3. Moreover, a plurality (ten, for example) of cam surfaces 1d are formed on the inner periphery of the outer ring 1 at circumferential regular intervals. Each cam surface 1d is deep in its circumferential center, and gets shallower obliquely toward both circumferential sides.

The outer ring 1 is in conformity with the first embodiment in material, the method of heat treatment, surface hardness, and so on (chromium molybdenum steel SCM 420 may be used as the material for forming the outer ring 1).

Figure 24:
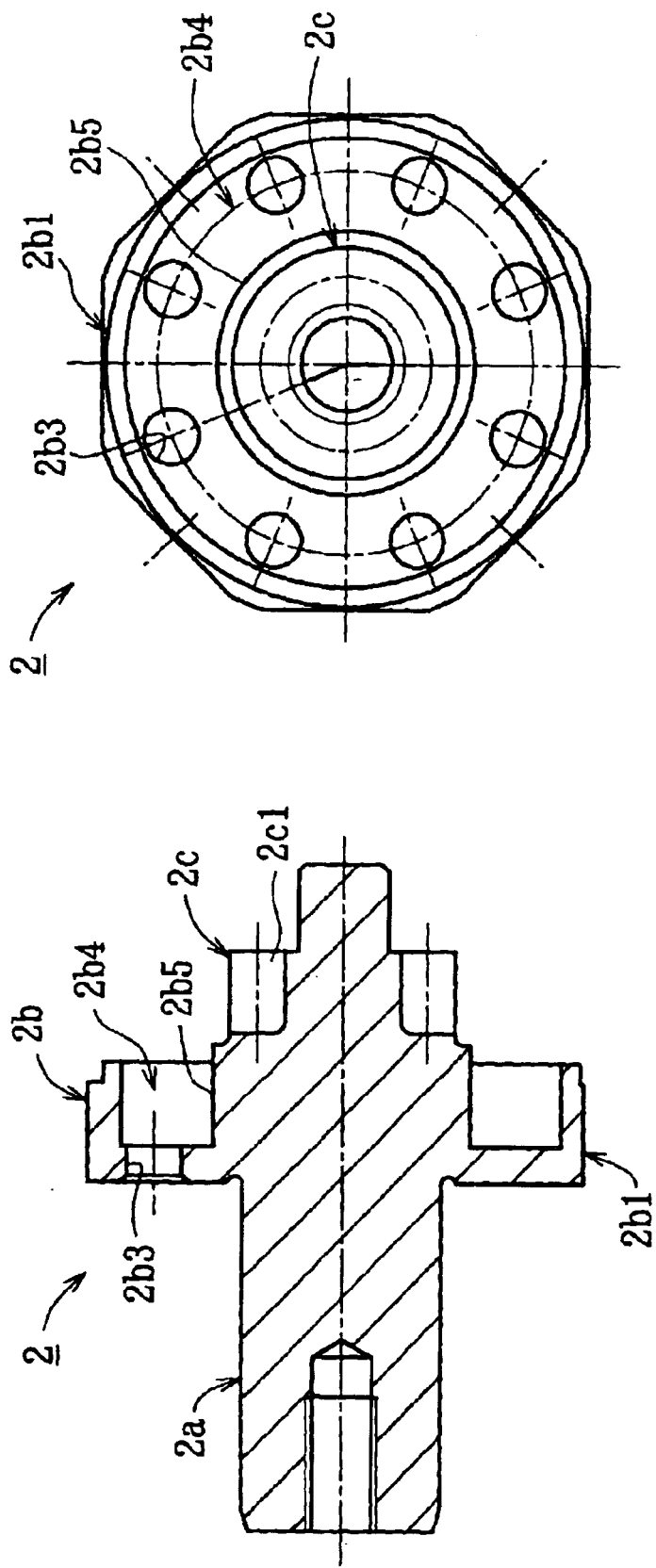
FIG. 24(a) is a longitudinal sectional view of an output shaft (output-side member)
FIG. 24(b) is a front view of the same.

FIG. 24 shows the output shaft 2, as the output-side member. The output shaft 2 has a journal portion 2a on one end, a large-diameter portion 2b at the center, and a connecting portion 2c on the other end. The journal portion 2a is inserted in a radial bearing surface (3a1) of the inner ring (3: see FIG. 25) to be described later. A plurality (eight, for example) of cam surfaces 2b1 are formed on the outer periphery of the large-diameter portion 2b at circumferential regular intervals. Each cam surface 2b1 is formed into a flat surface that makes a chord of a circle around the axial center of the output shaft 2. A plurality (eight, for example) of pin holes 2b3 are formed in one side of the large-diameter portion 2b at circumferential regular intervals. Pins (3b1) of the inner ring (3: see FIG. 25) to be described later are inserted in these pin holes 2b3. Besides, an annular recess 2b4 is formed in the other side of the large-diameter portion 2b. A frictional member (9: see FIG. 28) to be described later is attached to this annular recess 2b4. Moreover, the inner peripheral wall 2b5 of the annular recess 2b4 makes a journal surface to be inserted in a radial bearing surface (7e2) of the fixing side plate (7: see FIG. 27) to be described later. The connecting portion 2c is provided with a tooth profile 2c1 intended for connecting to another rotating member.

The output shaft 2 is in conformity with the first embodiment in material, the method of heat treatment, surface hardness, and so on (chromium molybdenum steel SCM 420 may be used as the material for forming the output shaft 2).

Figure 25:
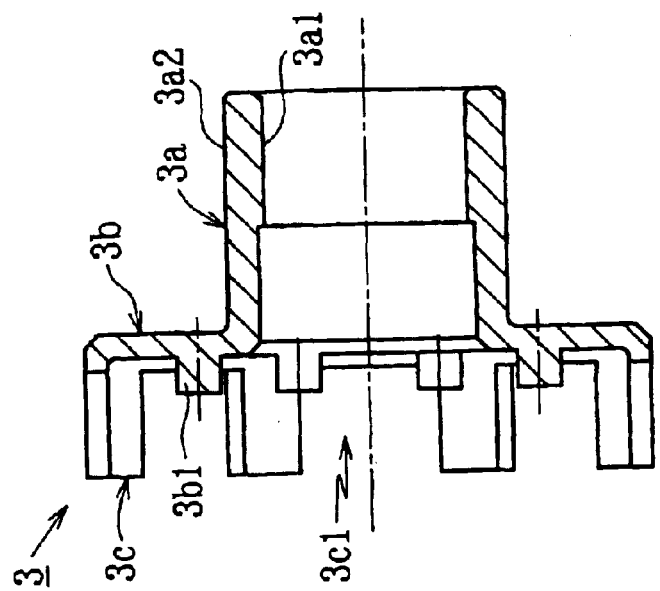
FIG. 25(a) is a front view of an inner ring (control member)
FIG. 25(b) is a longitudinal sectional view of the same.
FIG. 25(c) is an enlarged view of essential parts of the same.
Figure 25:
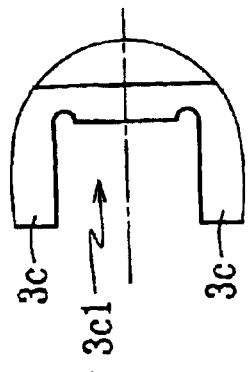
Figure 25:
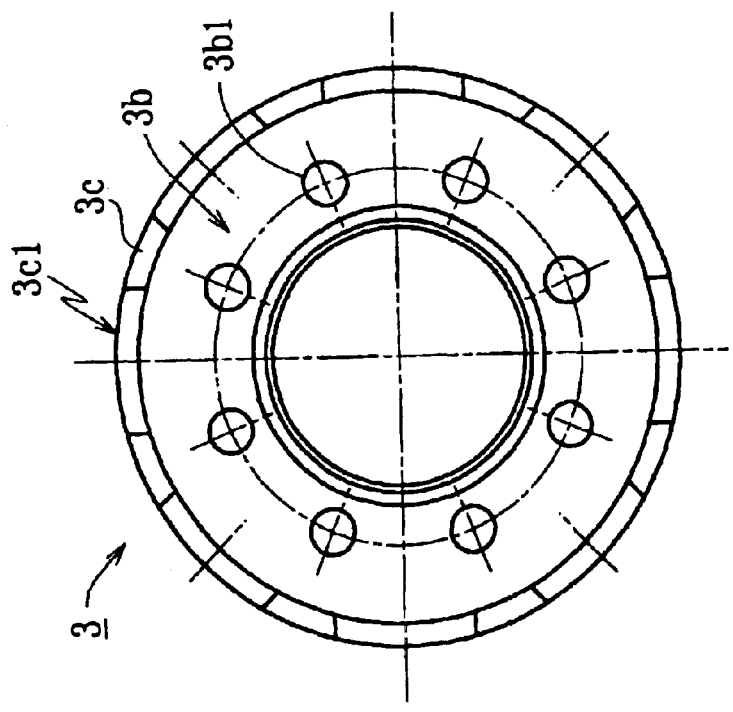

FIG. 25 shows the inner ring 3, as the control member. The inner ring 3 comprises a cylindrical portion 3a, a flange portion 3b extending outward from one end of the cylindrical portion 3a, and a plurality (eight, for example) of column portions 3c extending in one of the axial directions from the outer end of the flange portion 3b. The cylindrical portion 3a is mounted on the journal portion 2a of the output shaft 2, and inserted into the outer ring 1. A radial bearing surface 3a1 for supporting the journal portion 2a of the output shaft 2 radially is formed on the inner periphery of the cylindrical portion 3a at the other end. A circumferential surface 3a2 for defining wedge gaps together with the cam surfaces 1d of the outer ring 1 in both the normal and reverse directions of rotation is formed on the outer periphery of the cylindrical portion 3a at the other end. The plurality (eight, for example) of pins 3b1 protruding in an axial direction are formed on the flange portion 3b at circumferential regular intervals. These pins 3b1 are inserted in the pin holes 2b3 of the output shaft 2, respectively. Pockets 3c1 opening to an axial direction are formed between the column portions 3c adjoining circumferentially. These pockets 3c1 accommodate rollers (20) and plate springs (21) of the second clutch part (6: see FIG. 33) to be described later. Since the rollers (20) and the plate springs (21) can be loaded into the pockets 3c1 from the axial openings of the pockets 3c1, they are easy to assemble.

The inner ring 3 is in conformity with the first embodiment in material, the method of heat treatment, surface hardness, and so on (chromium molybdenum steel SCM 420 may be used as the material for forming the inner ring 3).

Figure 26:
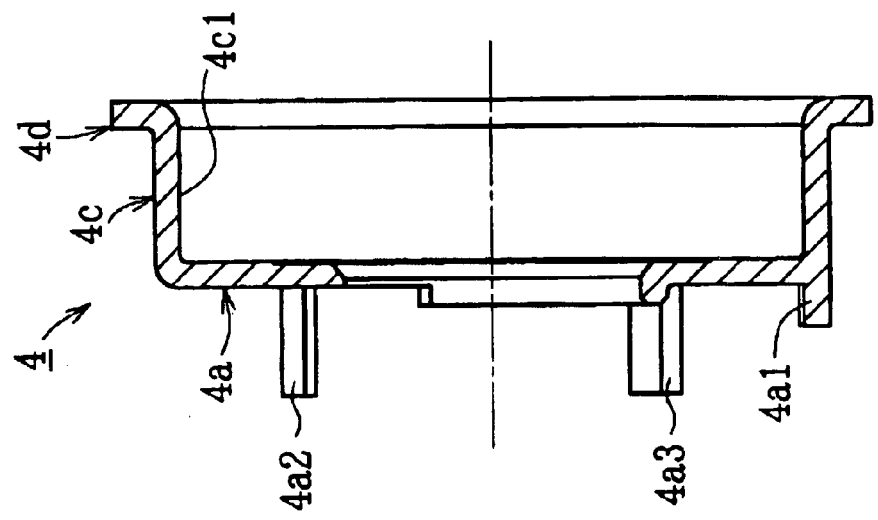
FIG. 26(a) is a front view of an outer ring (stationary-side member)
FIG. 26(b) is a longitudinal sectional view of the same.
Figure 26:
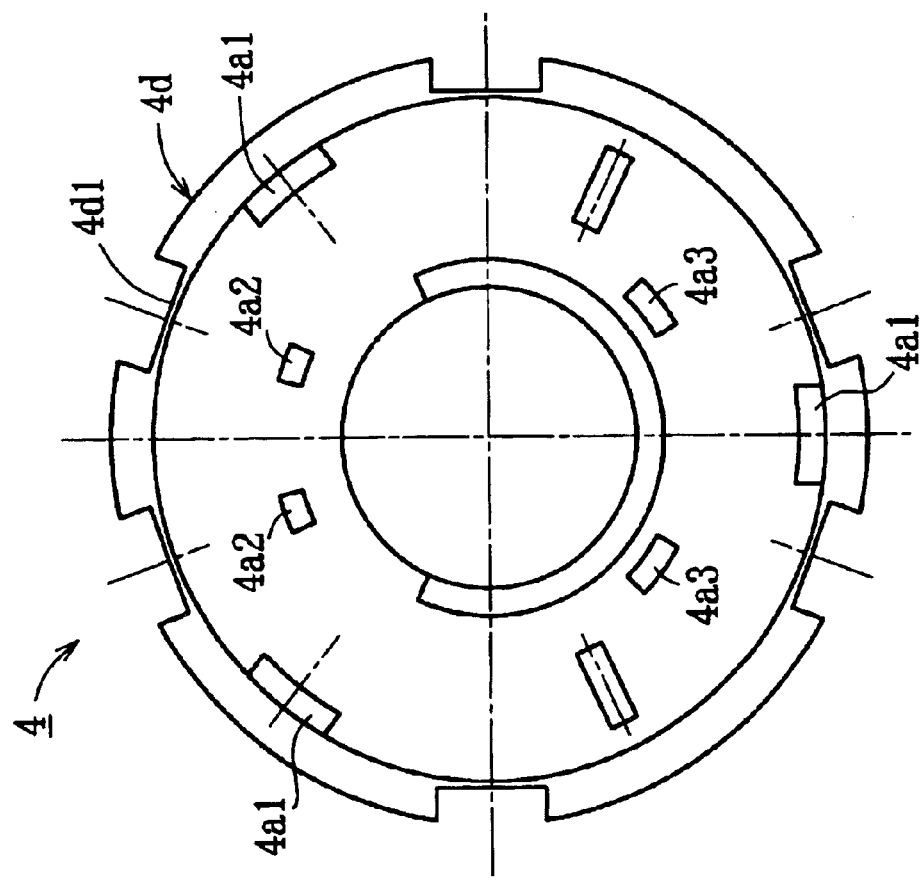

FIG. 26 shows the outer ring 4, as the stationary-side member. The outer ring 4 comprises a flange portion 4a extending radially, a cylindrical portion 4c extending in one of the axial directions from the outer end of the flange portion 4a, and a collar portion 4d protruding outward from an end of the cylindrical portion 4c. A plurality (three, for example) of stopper portions 4a1 protruding in the other axial direction are formed on the flange portion 4a as arranged at predetermined circumferential intervals. These stopper portions 4a1 are engaged with the protruding portions 1a2 of the outer ring 1 in the direction of rotation to restrain the range of rotation of the outer ring 1. In addition, a pair of engaged portions 4a2 protruding in the other axial direction and a plurality (two, for example) of mounting portions 4a3 are formed on the flange portion 4a. Engaging portions (12a1, 12a2) of the centering spring (12: see FIG. 32) of the first clutch part (5) to be described later are engaged with the circumferentially external surfaces of the pair of engaged portions 4a2, respectively. Besides, a winding portion (12a) of the centering spring (12) is mounted on the outer periphery of the mounting portions 4a3.

A circumferential surface 4c1 for defining wedge gaps together with the cam surfaces 2b1 of the output shaft 2 in both the normal and reverse directions of rotation is formed on the inner periphery of the cylindrical portion 4c. A plurality (six, for example) of notches 4d1 are formed in the collar portion 4d at predetermined circumferential intervals. The notches 4d1 match with caulking portions (7c: see FIG. 27) of the fixing side plate (7) to be described later.

The outer ring 4 is in conformity with the first embodiment in material, the method of heat treatment, surface hardness, and so on (chromium molybdenum steel SCM 420 may be used as the material for forming the outer ring 4).

FIG. 27 shows the fixing side plate 7 to be fixed to the outer ring 4. The fixing side plate 7 comprises a flange portion 7a extending radially, a plurality (four, for example) of bracket portions 7b protruding outward from the outer end of the flange portion 7a, a plurality (six, for example) of caulking portions 7c protruding in an axial direction from the outer end of the flange portion 7a, a plurality (four, for example) of engaged portions 7a1 protruding in an axial direction from the flange portion 7a, and a boss portion 7e protruding in an axial direction from the inner end of the flange portion 7a. The four bracket portions 7b are formed at predetermined circumferential intervals, each having a caulking portion 7b1 of a hollow pin shape formed integrally (or separately). The six caulking portions 7c are formed at predetermined circumferential intervals, each having a pair of tabs 7c1 branching in two. When these caulking portions 7c are attached to the notches 4d2 of the outer ring 4 with the pairs of tabs 7c1 caulked into contact with the collar portion 4d in circumferential opposite directions, the outer ring 4 can be prevented from axial relative movement and rotational relative movement with respect to the fixing side plate 7. The caulking portions 7b1 are fixed to the mounting holes of a mating member by caulking.

A radial bearing surface 7e2 is formed on the inner periphery of the boss portion 7e. The boss portion 7e is inserted in the annular recess 2b4 of the output shaft 2. The frictional member (9: see FIG. 28) to be described later is attached to between the outer periphery of the boss portion 7e and the outer peripheral wall of the annular groove 2b4. The engaged portions 7a1 are engaged with recesses (9a) of the frictional member (9) in the direction of rotation, thereby preventing the relative rotation of the frictional member (9) with respect to the fixing side plate 7. The radial bearing surface 7e2 of the boss portion 7e is mounted on the journal surface 2b5 of the annular recess 2b4 to support the journal surface 2b5 radially.

The fixing side plate 7 is formed, for example, by pressing a steel plate such as a cold-rolled steel sheet. In this embodiment, a cold-rolled steel sheet (such as SPCE) is used as the steel plate for forming the fixing side plate 7. With consideration given to workability and the like during caulking, the caulking portions 7c and 7b1 are given no heat treatment. Incidentally, the portions to be caulked, such as the caulking portions 7c and 7b1, may be given anti-carburizing processing (or anti-carbonitriding processing) before carburizing and tempering (or carbonitriding and tempering).

Figure 40:
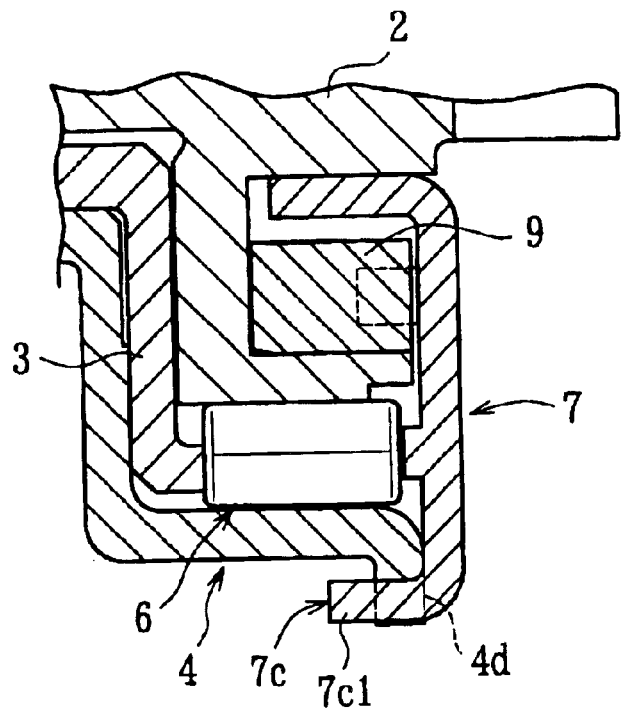
FIG. 40(a) is a longitudinal sectional view of essential parts showing a fixed state of the outer ring (stationary-side member) and the fixing side plate.
FIG. 40(b) is a front view of essential parts thereof.
FIG. 40(c) is a bottom view of essential parts thereof.
Figure 40:
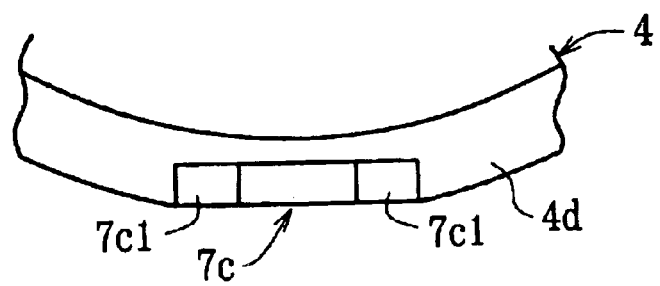
Figure 40:
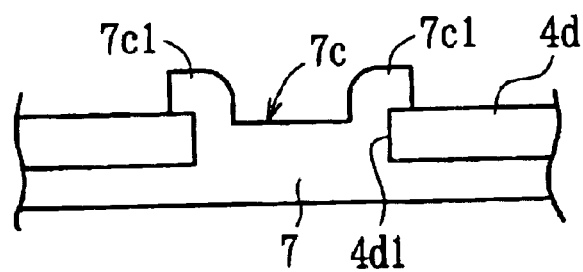

FIG. 40 shows the state where the outer ring 4 as the stationary-side member and the fixing side plate 7 are fixed by caulking. As shown in FIGS. 40(a) and 40(c), the base parts of the caulking portions 7c formed on the fixing side plate 7 are engaged with the notches 4d1 in the outer ring 4 where the pairs of tabs 7c1 formed at the extremities of the caulking portions 7c are bent in circumferentially opposite directions into contact with the collar portion 4d of the outer ring 4 for caulking. This precludes the axial relative movement and circumferential relative movement of the outer ring 4 with respect to the fixing side plate 7.

Under this state, as shown in FIG. 40(b), the outer surface of the outer ring 4 (collar portion 4d) and the outer surface of the fixing side plate 7 (caulking portions 7c) are generally flush with each other. When these members 4 and 7 are in this fixed state, there is no radial protrusion across the entire circumference. In addition, since the caulking portions 7c protrude forward from the fixing side plate 7 (leftward in FIG. 40(a)), no unnecessary protrusion lies on the backside of the fixing side plate 7. As a result, the clutch unit can be mounted on a mating member smoothly without trouble.

Consequently, bending the caulking portions 7c (the pairs of tabs 7c1) in the circumferential directions of the outer ring 4 causes no radial stress on the outer ring 4, thus precluding deformation in the radial directions of the outer ring 4. It is therefore possible to avoid caulking-based imperfection in the roundness of the inner periphery of the outer ring 4, and maintain the normal clutching facility of the second clutch part 6. Moreover, since the pairs of tabs 7c1 are bent with the caulking portions 7c engaged with the notches 4d1, both the axial movement and circumferential movement of the outer ring 4 with respect to the fixing side plate 7 can be restrained only by bending these tabs 7c1. This ensures the fixed state, and achieves simplification of the work and improved efficiency of the work.

Figure 41:
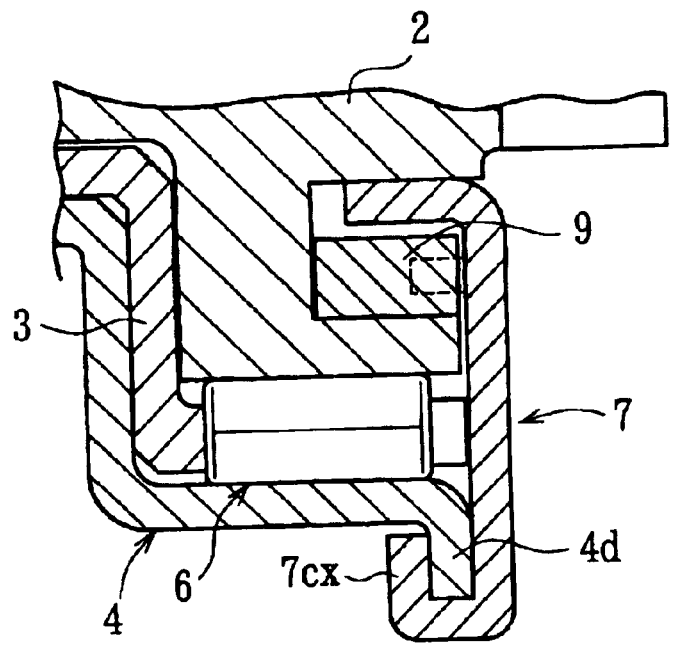
FIG. 41(a) is a longitudinal sectional view of essential parts showing another example of the fixed state of the outer ring (stationary-side member) and the fixing side plate.
FIG. 41(b) is a front view of essential parts of the same.
FIG. 41(c) is a bottom view of essential parts of the same.
Figure 41:
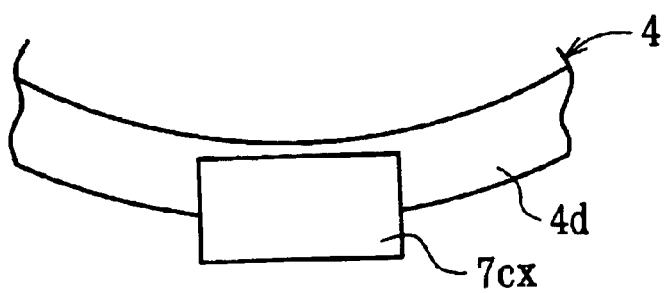
Figure 41:
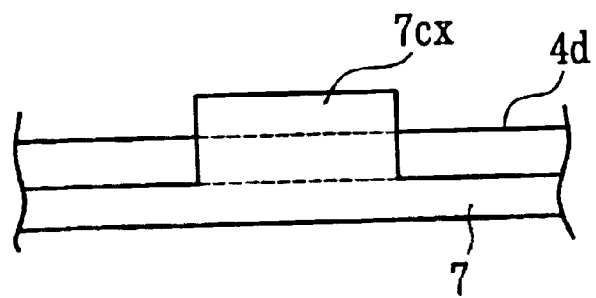

FIG. 41 shows another example of the state where the outer ring 4 as the stationary-side member and the fixing side plate 7 are fixed by caulking. As shown in FIGS. 41(a) and 41(c), caulking portions 7cx formed to protrude outward from the outer end of the fixing side plate 7 are bent inward so as to sandwich the outer end of the collar portion 4d of the outer ring 4 for caulking. In this case, the caulking portions 7cx are in contact with the outer surface and front surface of the collar portion 4. This precludes the axial relative movement of the outer ring 4 with respect to the fixing side plate 7. Then, although not shown in the diagram, either the outer end of the collar portion 4d of the outer ring 4 or the outer end of the fixing side plate 7 is provided with a notch, and the other a protrusion. These notch and protrusion are engaged with each other to preclude the circumferential relative movement of the ring 4 with respect to the fixing side plate 7. Incidentally, in this embodiment, the caulking portions 7cx protrude outward from the outer end of the fixing side plate 7 by their thickness as shown in FIG. 41(b). Nevertheless, notches may be formed in the outer end of the collar portion 4d of the outer ring 4. In this structure, the caulking portions 7cx are engaged with the notches so that the caulking portions 7cx do not protrude outward from the fixing side plate 7.

Figure 28:
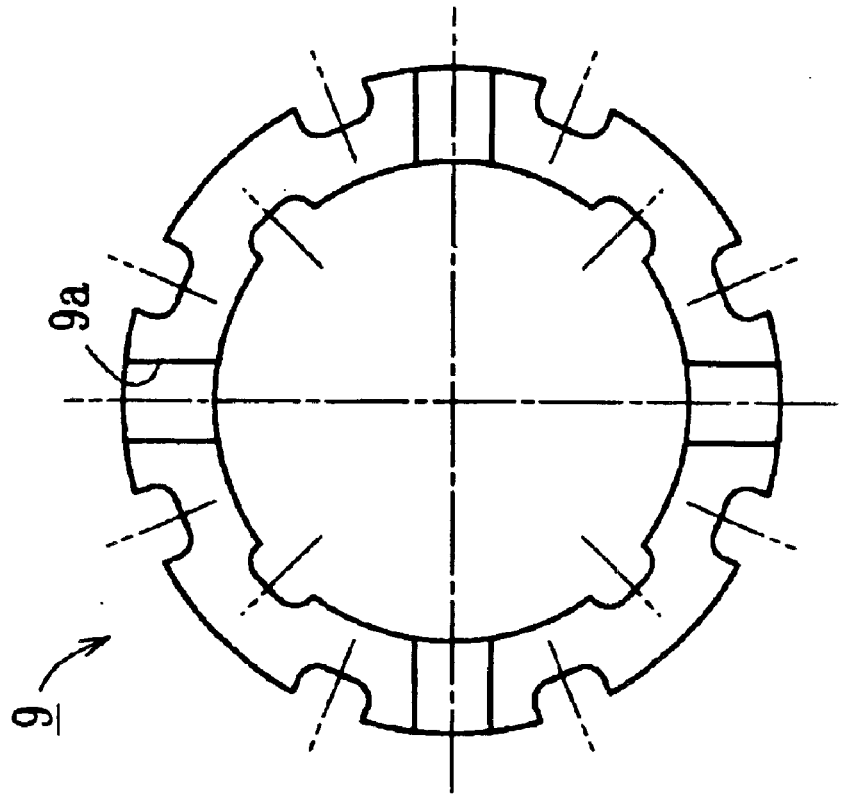
FIG. 28(a) is a longitudinal sectional view of a frictional member (braking means)
FIG. 28(b) is a front view of the same.
Figure 28:
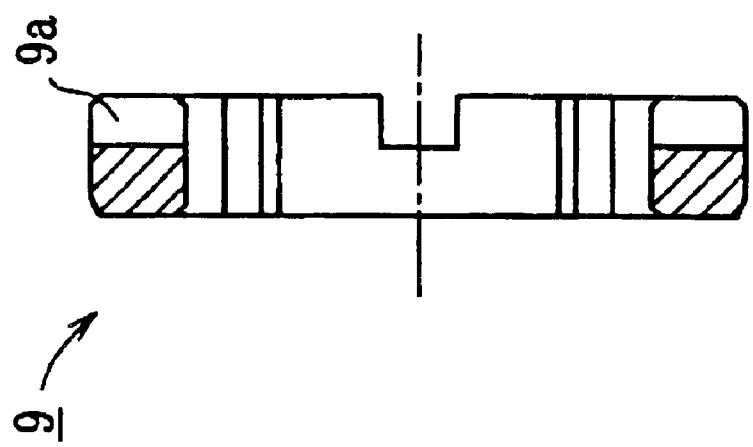

FIG. 28 shows the frictional member 9 as braking means. In this embodiment, the frictional member 9 has the shape of a ring, having a plurality (four, for example) of recesses 9a formed in one of its end faces at predetermined circumferential intervals. The recesses 9a are engaged with the engaged portions 7a1 of the fixing side plate 7 in the direction of rotation, thereby preventing the relative rotation of the frictional member 9 with respect to the fixing side plate 7.

The frictional member 9 is made of elastic-material such as rubber and synthetic resin, and is fit to the outer peripheral wall of the annular recess 2b4 of the output shaft 2 with interference, for example. The frictional force occurring between the outer periphery of the frictional member 9 and the outer peripheral wall of the annular recess 2b4 gives the output shaft 2 a braking force (frictional braking force) in the direction of rotation. The setting of the braking force (braking torque) from the frictional member 9 and the material for forming the frictional member 9 are in conformity with the first embodiment.

Figure 29:
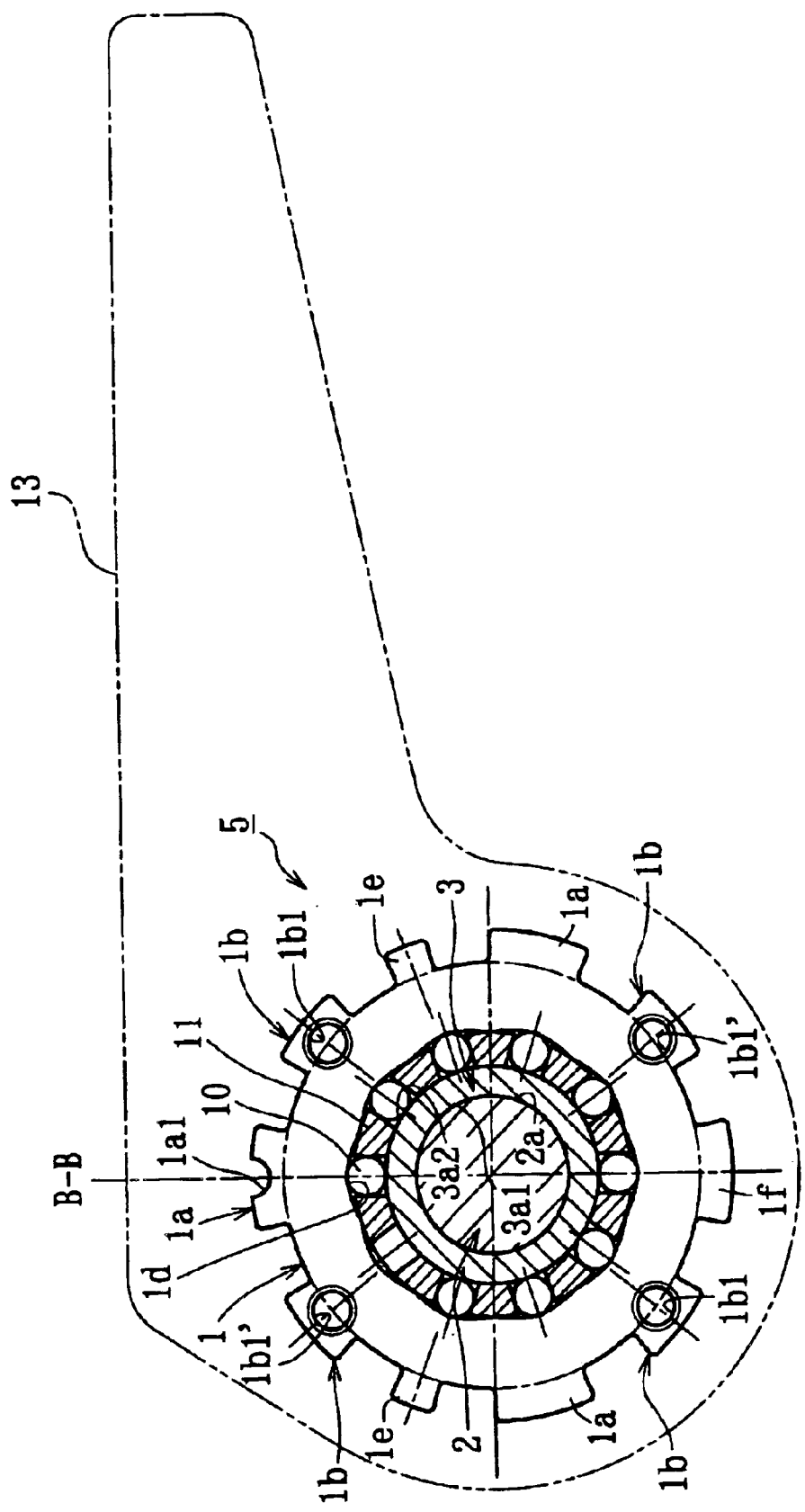
FIG. 29 is a B—B section of FIG. 1 showing a first clutch part.

FIG. 29 (B—B section of FIG. 22) shows the first clutch part 5. The first clutch part 5 comprises the plurality (ten, for example) of cam surfaces 1d provided to the outer ring 1, the circumferential surface 3a2 provided to the inner ring 3, a plurality (nine, for example) of rollers 10 as engaging members interposed between the cam surfaces 1d and the circumferential surface 3a2, the retainer 11 for retaining the rollers 10, and an elastic member for coupling the retainer 11 to the outer ring (4) in the direction of rotation, such as the centering spring (12: see FIG. 32). The cam surfaces 1d, the circumferential surface 3a2, and the rollers 10 constitute locking means. The retainer 11 and the centering spring (12) constitute returning means. In this embodiment, the cam surfaces 1d define wedge gaps together with the circumferential surface 3a2 in both the normal and reverse directions of rotation. Besides, the operation lever 13 is connected to the outer ring 1. Input torque in the normal direction or reverse direction is input to the outer ring 1 from the operation lever 13. Moreover, grease is filled into the space between the inner periphery of the outer ring 1 and the outer periphery of the inner ring 3 (cylindrical portion 3a), especially between the cam surfaces 1d and the circumferential surface 3a2.

Figure 31:
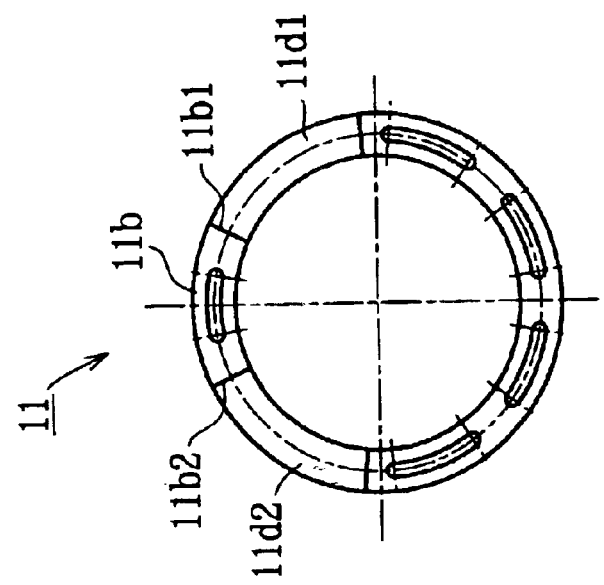
FIG. 31(a) is a longitudinal section and front view showing a retainer of the first clutch part.
FIG. 31(b) is a longitudinal section and side view of the same.
FIG. 31(c) is a rear view of the same.
Figure 31:
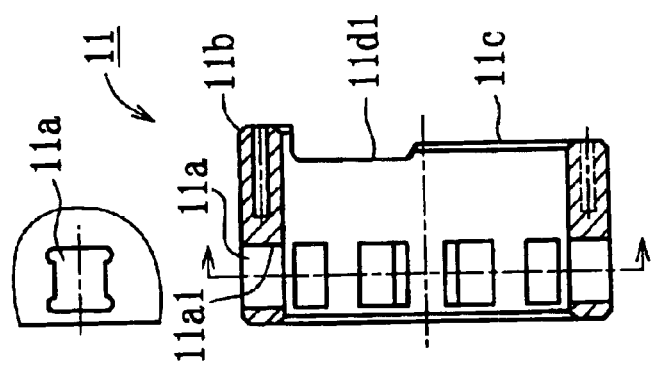
Figure 31:
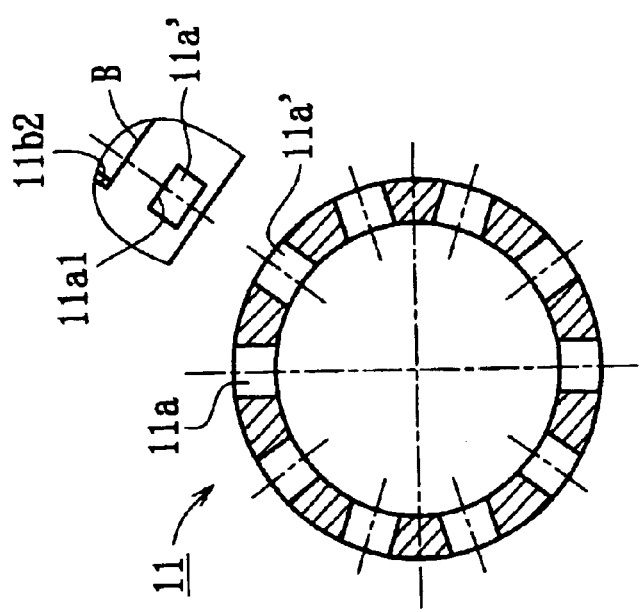
Figure 42:
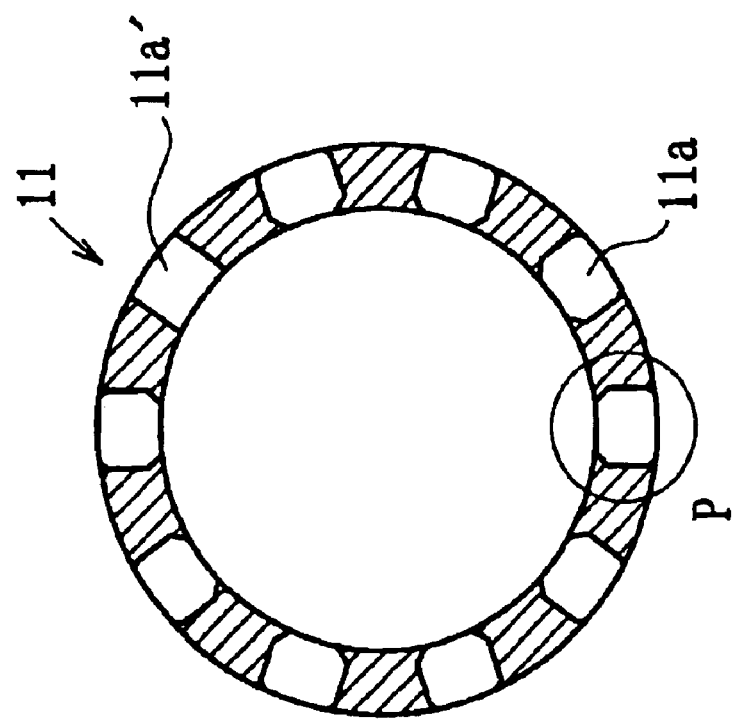
FIG. 42(c) is a longitudinal sectional view of the retainer of the first clutch part.
FIG. 42(b) is an enlarged view of the area P of (a) FIG. 42(a)
Figure 42:
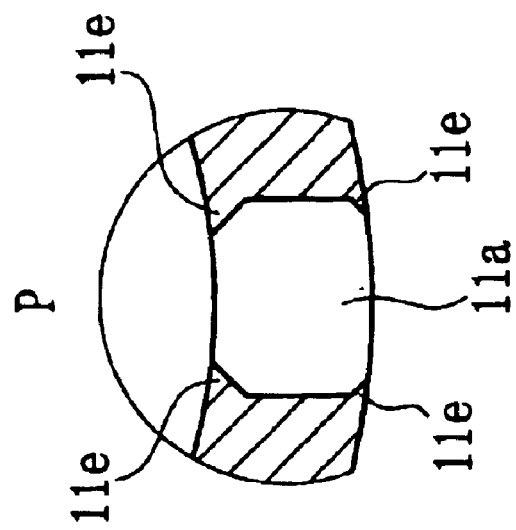

FIG. 31 shows the retainer 11. The retainer 11 comprises a plurality (ten, for example) of window-like pockets 11a for accommodating the rollers 10, and an engaged portion 11b protruding in an axial direction from one of the end faces. The engaged portion 11b is an arc-shaped protrusion to be inserted in the inner peripheral side of the engaged portions 4a2 of the outer ring 4 as shown in FIG. 32(c). In the present embodiment, axial notches 11d1 and 11d2 are formed in circumferential two positions of one end face 11c of the retainer 11 (the end face opposed to the outer ring 4) to form the engaged portion 11b. Both the circumferential sides 11b1 and 11b2 of the engaged portion 11b make portions to be engaged portions with which the engaging portions (12a1, 12a2) of the centering spring (12: see FIG. 32) engage. As shown in FIGS. 42(a) and 42(b), the peripheral regions of the pockets 11a of the retainer 11 are provided with roller stoppers 11e at inner portions and outer portions opposed to the outer peripheries of the rollers 10. This can prevent the rollers 10 from coming off the pockets 11a during assembly, thereby improving the assemblability.

The material of the retainer 11 is in conformity with the first embodiment.

FIG. 32 shows the centering spring 12. The centering spring 12 is a torsion coil spring having a plurality of turns (in the shown example, approximately three turns). Engaging portions 12a1 and 12a2 bent inward are formed on both ends of the turns of winding portion 12a. This pair of engaging portions 12a1 and 12a2 are opposed to each other at a predetermined circumferential spacing. In addition, the engaging portions 12a1 and 12a2 differ from each other in axial position. When installed into the retainer 11, one engaging portion 12a1 lies on the side of one end face 11c of the retainer 11, and the other engaging portion 12a2 lies closer to the axial center. The centering spring 12 is made of a wire rod shaped noncircular, such as rectangular, in section. In this embodiment, a piano wire rod (SWPB) is used as the wire rod. Moreover, this centering spring 12 is a spring of unwinding type to be unwound in use from its natural state, as well as a so-called pitched spring which is wound with spacings S between the turns of the winding portion 12a as shown in FIG. 32(e). Such provision of spacings S between the turns of the winding portion 12a avoids frictional loss resulting from contact between the turns.

As shown in FIG. 32(b), when the centering spring 12 is in its natural state, the centers of the plurality of turns are offset to a direction opposite from the direction of shift of the individual winding centers under unwinding deformation. In other words, the individual winding centers of the winding portion 12a of the centering spring 12 are offset to a direction opposite from the direction in which the individual winding centers shift when the angle of relative rotation of the retainer 11 with respect to the outer ring 4 increases in an assembled state to be described later. Then, when this centering spring 12 is assembled with the first clutch part 5, the pair of engaging portions 12a1 and 12a1 are engaged with the engaged portion 11b of the retainer 11 and the engaged portions 4a2 of the outer ring 4 with the interval between the pair of engaging portions 12a1 and 12a2 widened circumferentially (here, the centering spring 12 is unwound with a slight increase in diameter) as shown in FIG. 32(c). Consequently, the retainer 11 is coupled with the outer ring 4 in the direction of rotation through the intervention of the centering spring 12. At this point, the individual winding centers of the centering spring 12 fall on the same axis.

As shown in FIG. 32(d), when the retainer 11 is relatively rotated clockwise with respect to the outer ring 4 from such a state, the engaging portion 12a1 of the centering spring 12 in the clockwise direction (forward in the direction of rotation) is pressed by the engaged portion 11b of the retainer 11 to make clockwise elastic displacement. At this point, the engaging portion 12a2 of the centering spring 12 in the counterclockwise direction (backward in the direction of rotation) is locked by the engaged portion 4a2 of the outer ring 4. Consequently, the centering spring 12 bends to the direction in which the interval between the pair of engaging portions 12a1 and 12a2 is widened, accumulating elastic force corresponding to the amount of bending. In this case, the individual winding centers of the centering spring 12 shift as the increasing angle of relative rotation of the retainer 11. Since the individual winding centers fall on the same axis when the retainer 11 is not rotated relatively, the amounts of shift of the individual winding centers are small when the retainer 11 is relatively rotated by a predetermined angle. Subsequently, when the rotating force acting on the retainer 11 is released, the elastic force of the centering spring 12 centers the retainer 11 (engaged portion 11b) to the neutral position shown in FIG. 32(c). Incidentally, when the retainer 11 is relatively rotated counterclockwise from the state shown in FIG. 32(c), the engaging portion 12a2 of the centering spring 12 in the counterclockwise direction is pressed by the engaged portion 11b of the retainer 11 with counterclockwise elastic displacement. The centering spring 12 accumulates elastic force by the action reverse to the foregoing.

As above, since the individual winding centers of the centering spring 12 make smaller amounts of shift when the retainer 11 is rotated relatively, there occurs no interference with the protruding portions 1a2 of the outer ring 1 as the input-side member. As a result, the clutch unit that incorporates the first clutch part 5 having the above-described centering spring 12 enhances in design flexibility, and the clutch unit can be made smaller.

Incidentally, the foregoing structure of the centering spring 12 is also applicable to a spring of winding type. That is, in the natural state shown in FIG. 39(a) described previously, the individual winding centers of the winding type centering spring Ya shall be offset in a direction opposite to the direction in which the individual winding centers shift as the increasing angle of relative rotation of the retainer in an assembled state. Then, the individual winding centers of the centering spring Ya are positioned on the same axis when the retainer (engaged portion Yb) is not rotated relatively in the assembled state shown in FIG. 39(b) described previously. In this case, the inner diameter of the centering spring Ya must be designed to a dimension not to cause interference with the retainer due to a reduction in diameter.

As above, with the normal and reverse rotations of the retainer 11, the engaged portions 11b1 and 11b2 of the retainer 11 undergo circumferential pressing forces from the engaging portions 12a1 and 12a2 due to elastic deformation of the centering spring 12. Here, since the engaged portions 11b1 and 11b2 of the retainer 11 protrude axially, the base parts of the engaged portions 11b1 and 11b2 undergo circumferential moment, which might cause a crack or the like between the base parts and the pockets 11a. To avoid this, the base parts of the engaged portions 11b1 and 11b2 are desirably increased in axial thickness by some means.

FIGS. 43(a) and 43(b) show a concrete example of the thickening means. In FIG. 43(a), one notch 11d1 is made smaller in depth (in the axial direction) than the other notch 11d2. That is, the bottom A of the notch 11d1 is located closer to the retainer end face 1c than the bottom B of the other notch 11d2 is, so that the base part of the engaged portion 11b1 is thickened for improved durability of the retainer 11 (the double-dashed chain line shows the case where a notch having the same depth as that of the other notch 11d2 is formed). The engaged portion 11b1 thickened at the base part by such means is engaged with the engaging portion 12a1 that lies closer to the retainer end face 11c after assembly out of the engaging portions 12a1 and 12a2 of the centering spring 12.

Meanwhile, the other engaging portion 12a2 lies closer to the axial center of the retainer 11 after assembly than the engaging portion 12a1 does. Thus, if the notch depth is made smaller as described above, sure engagement with the engaging portion 12a2 cannot be established. FIG. 43(b) shows the thickening means for such an engaged portion 12a2. A pocket near the base part of the engaging portion 12a2 is formed as a small pocket 11a' having a smaller axial dimension. In this case, the distance between a pocket surface 11a'1 of the small pocket 11a' on the side of the retainer base surface 11c and the bottom B of the notch 11d2 also becomes greater than the distance between the corresponding pocket surface 11a1 of another pocket 11a and the bottom B of the notch 11d2, successfully thickening the base part of the engaged portion 11b2. The small pocket 11a' is also beneficial in avoiding shrinkage during the injection molding of the resin retainer 11. When shrinkage does not matter, the small pocket 11a' may be omitted for a holeless structure with the same effect. Incidentally, when the small pocket 11a' is provide, the small pocket 11a' accommodates none of the rollers 10 as the engaging members.

Since the operation of the first clutch part 5 is the same as in the first embodiment, description thereof will be omitted.

Figure 33:
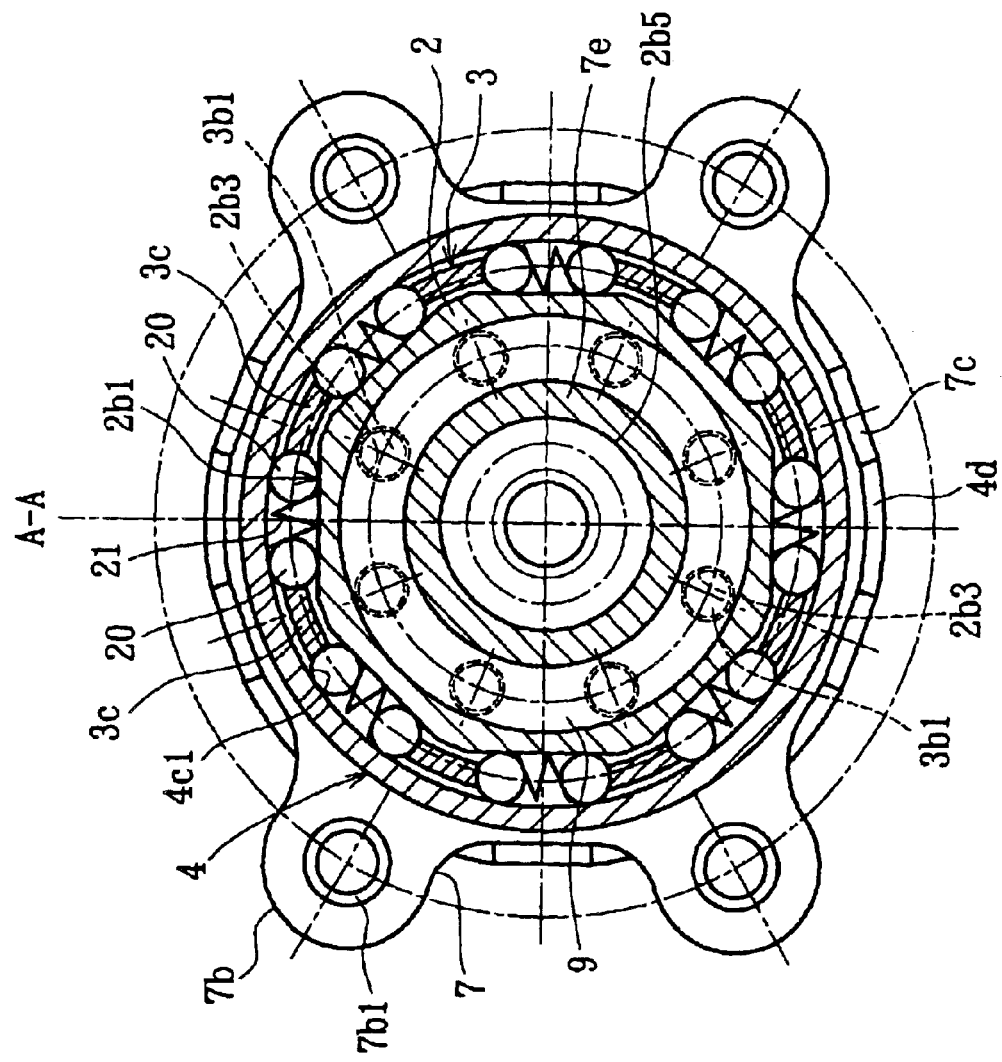
FIG. 33 is an A—A section of FIG. 2 showing a second clutch part.

FIG. 33 (A—A section of FIG. 22) shows the second clutch part 6. The second clutch part 6 comprises the circumferential surface 4c1 provided to the outer ring 4, the plurality (eight, for example) of cam surfaces 2b1 provided to the output shaft 2, a pair (a total of eight pairs, for example) of rollers 20 as engaging members interposed between each of the cam surfaces 2b1 and the circumferential surface 4c1, an elastic member interposed between the pair of rollers 20, such as the plate spring 21, the column portions 3c of the inner ring 3, the pins 3b1 of the inner ring 3, and the pin holes 2b3 of the output shaft 2. The cam surfaces 2b1, the circumferential surface 4c1, the pair of rollers 20, and the plate spring 21 constitute locking means. The column portions 3c of the inner ring 3 lying on both circumferential sides of the pair of rollers 20 constitute lock releasing means. The pins 3b1 of the inner ring 3 and the pin holes 2b3 of the output shaft 2 constitute torque transmitting means. Incidentally, in this embodiment, the plate springs 21 are made of stainless steel (SUS 301 CPS-H, for example) and given tempering as heat treatment. Moreover, grease is filled into the space between the inner periphery of the outer ring 4 and the outer periphery of the output shaft 2 (large-diameter portion 2b), especially between the cam surfaces 2b1 and the circumferential surface 4c1.

Figure 44:
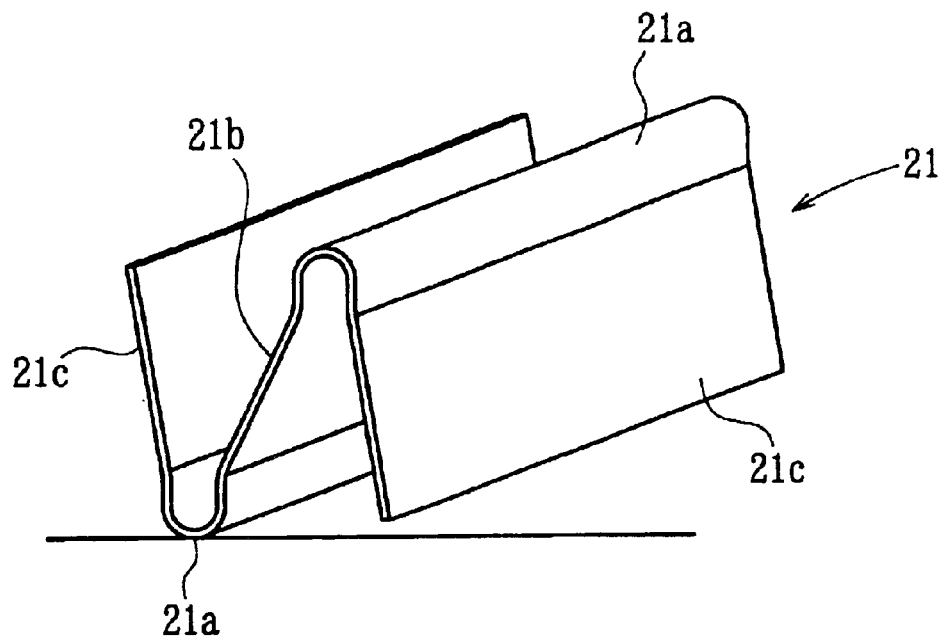
FIG. 44 is a perspective view of an elastic member for use in the second clutch part.

In this embodiment, as shown in FIG. 44, the plate spring 21 is generally N-shaped in section, consisting of two arc-shaped bending portions 21a, a coupling portion 21b for coupling the opposing ends of the bending portions 21a to each other, and side plate portions 21c extending from the other ends of both the bending portions 21a. The side plate portions 21c are generally parallel flat surfaces, and the coupling portion 21b is shaped into a flat surface oblique thereto. The plate spring 21 is made of stainless steel (SUS 301 CPS-H, for example), and further given tempering as heat treatment.

Figure 34:
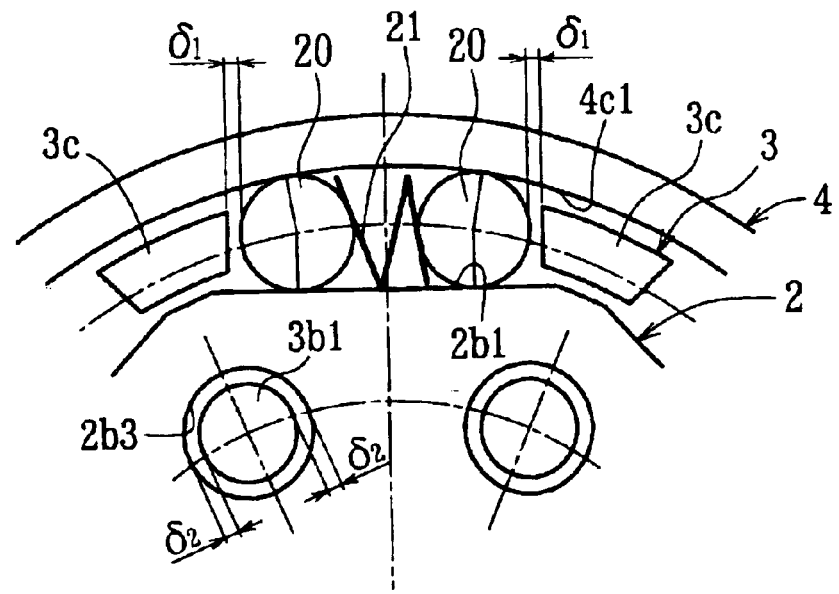
FIG. 34 is an enlarged partial front view showing the operation of the second clutch part (in a neutral position)

As shown enlarged in FIG. 34, in the neutral position, the pair of rollers 20 are pressed by the plate spring 21 toward the wedge gaps defined between the cam surface 3b1 and the circumferential surface 4c1 in both the normal and reverse directions of rotation, respectively. Here, the column portions 3c of the inner ring 3 and the rollers 20 have rotational direction clearances $\delta 1$ therebetween. Moreover, the pins 3b1 of the inner ring 3 and the pin holes 2b3 of the output shaft 2 have rotational direction clearances $\delta 2$ therebetween in both the normal and reverse directions of rotation. The rotational direction clearance 61 and the rotational direction clearance $\delta 2$ have the relationship of $\delta 1 < \delta 2$. The magnitude of the rotational direction clearance $\delta 1$ is on the order of 0 to 0.4 mm (0 to 1.5° about the axis of the second clutch part 6), for example. The magnitude of the rotational direction clearance $\delta 2$ is on the order of 0.4 to 0.8 mm (1.8 to 3.7° about the axis of the second clutch part 6), for example.

In the state shown in the diagram, for example, when clockwise reverse input torque is input to the output shaft 2, the roller 20 in the counterclockwise direction (backward in the direction of rotation) makes wedge engagement with the wedge gap in that direction, whereby the output shaft 2 is locked clockwise with respect to the outer ring 4. When counterclockwise reverse input torque is input to the output shaft 2, the roller 20 in the clockwise direction (backward in the direction of rotation) makes wedge engagement with the wedge gap in that direction, whereby the output shaft 2 is locked counterclockwise with respect to the outer ring 4. Consequently, reverse input torques from the output shaft 2 are locked by the second clutch part 6 in both the normal and reverse directions of rotation.

Figure 35:
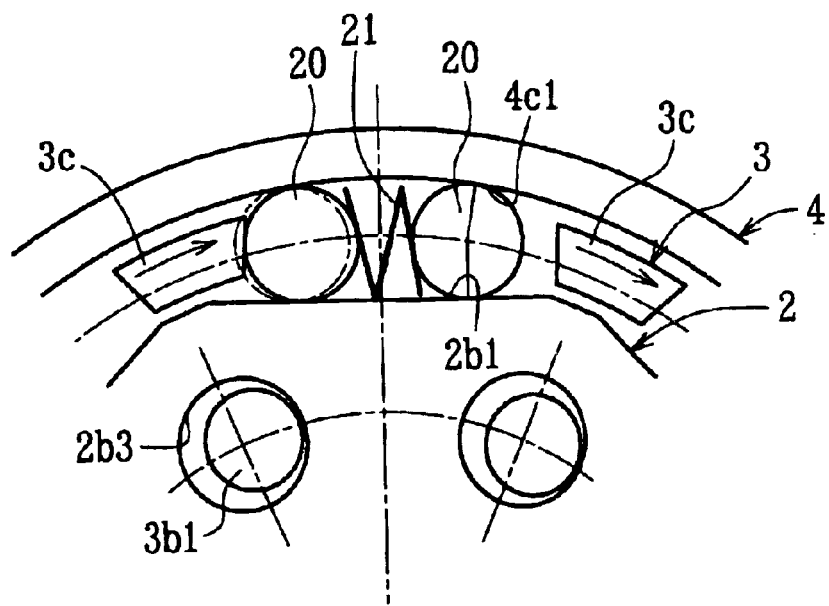
FIG. 35 is an enlarged partial front view showing the operation of the second clutch part (in releasing the lock)
Figure 36:
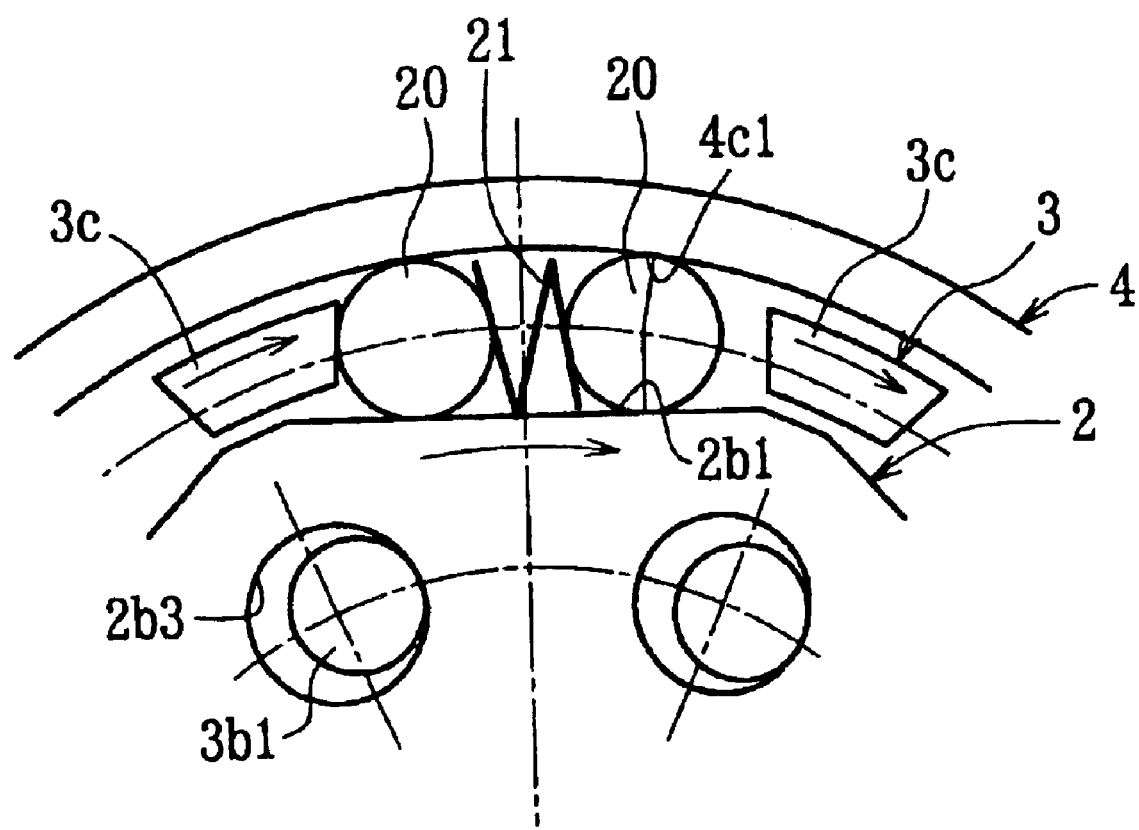
FIG. 36 is an enlarged partial front view showing the operation of the second clutch part (during torque transmission)

FIG. 35 shows an initial state where input torque (clockwise in the diagram) from the outer ring 1 is input to the inner ring 3 through the first clutch part 5 so that the inner ring 3 starts to rotate clockwise in the diagram. Since the rotational direction clearances are set as $\delta_1 < \delta_2$, the column portion 3c of the inner ring 3 in the counterclockwise direction (backward in the direction of rotation) initially comes into engagement with the roller in that direction (backward in the direction of rotation), and presses it clockwise (forward in the direction of rotation) against the elastic force of the plate spring 21. Consequently, the roller 20 in the counterclockwise direction (backward in the direction of rotation) comes out from the wedge gap in that direction, releasing the locked state of the output shaft 2. The output shaft 2 thus becomes capable of clockwise rotation.

When the inner ring 3 is further rotated clockwise, the pins 3b1 of the inner ring 3 come into engagement with the pin holes 2b3 of the output shaft 2 clockwise. Consequently, the clockwise input torque from the inner ring 3 is transmitted to the output shaft 2 through the pins 3b1 and the pin holes 2b3, so that the output shaft 2 rotates clockwise. When counterclockwise input torque is input to the outer ring 1, the output shaft 2 rotates counterclockwise by the action reverse to the foregoing. Thus, the input torques from the outer ring 1 in both the normal and reverse directions of rotation are transmitted to the output shaft 2 through the first clutch part 5, the inner ring 3, and the pins 3b1 and the pin holes 2b3 as the torque transmitting means, so that the output shaft 2 rotates in both the normal and reverse directions of rotation. Incidentally, when the input torque from the inner ring 3 disappears, the elastic returning force of the plate spring 21 restores the neutral position shown in FIG. 34.

The pair of rollers 20 are pressed by the inner ring 3 each time the locked state is released. Since the pressing narrows the gap (spring space) between the rollers 20, the plate spring 21 between the rollers 20 undergoes large bending (stress). For that reason, the plate spring 20 desirably has high elastic limit so as not to cause plastic deformation even under such stress. The N-sectioned plate spring 21 described above has two bending portions 21a and thus bends smaller at the bending portions 21a, being less prone to plastic deformation as compared to plate springs having a single bending portion alone, such as U-sectioned and V-sectioned ones. Thus, the use of the N-shaped plate spring 21 allows a reduction in the dimension of the gap (spring space) between the rollers 20 for the miniaturization of the clutch unit. Moreover, in the cases of U-shaped and V-shaped plate springs, the cam surface 2b1 of the output shaft 2 requires an axial groove intended to mount the plate spring. Since the N-shaped plate spring 21 is freestanding, grooves of this type are unnecessary. The cam surface 2b1 may be a groove-free flat surface over a region for the plate springs 21 to be mounted on. It is therefore possible to reduce the machining cost of the output shaft 2 and avoid the problem of stress concentration resulting from groove formation.

The plate spring 21 may have three or more bending portions 21a. In that case, however, there is a fear that a sufficient pressing force becomes difficult to obtain and the spring space increases in size. Instead of the plate spring 21, a coil spring such as a conical spring can be used to obtain a sufficient elastic limit with a reduction in the size of the spring space. Nevertheless, easy entanglement and hard separation can cause a problem in terms of parts management. From the foregoing reasons, the plate spring 21, especially a plate spring having two bending portions 21a, is desirable for the elastic member. Needless to say, U-shaped and V-shaped plate springs or coil springs may also be used if the foregoing problems do not matter.

Figure 45:
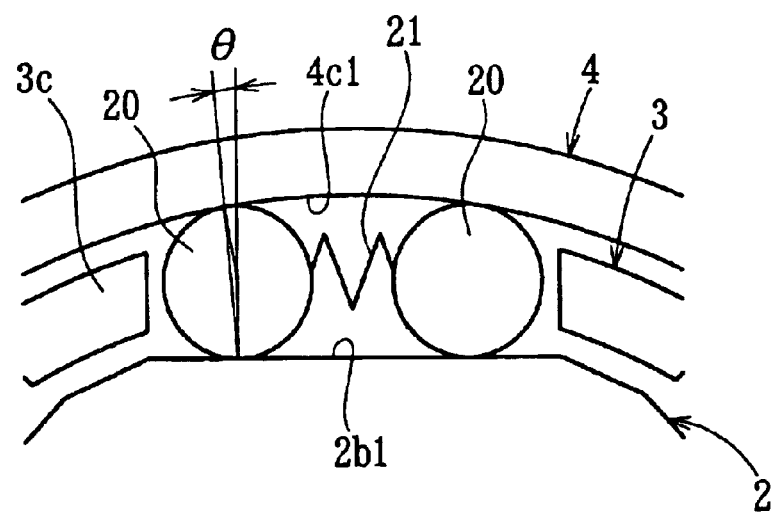
FIG. 45 is an enlarged partial cross-sectional view for explaining the operation of the second clutch part.

Now, increasing a strut angle $\theta$ shown in FIG. 45 is effective at increasing the torque capacity of the clutch while maintaining the outer diameter dimension of the clutch. Here, the strut angle refers to an acute angle out of the interior angles of a triangle that is defined by connecting the tangent points of the roller 20 on the circumferential surface 4c1 of the outer ring 4 and the cam surface 2b1 of the output shaft 2, and the center of the roller 20. When the strut angle $\theta$ is increased, the roller 20 engaged into the wedge gap undergoes lower surface pressure, which allows an increase in the torque capacity. Meanwhile, excessive strut angles $\theta$ can preclude the engagement of the roller 20 into the wedge gap and thus hamper the clutch function. Consequently, to obtain a sufficient torque capacity while securing the clutch function, the strut angle $\theta$ is favorably set within the range of 3° and 4.5°, or yet preferably the range of 4° and 4.5°.

Figure 46:
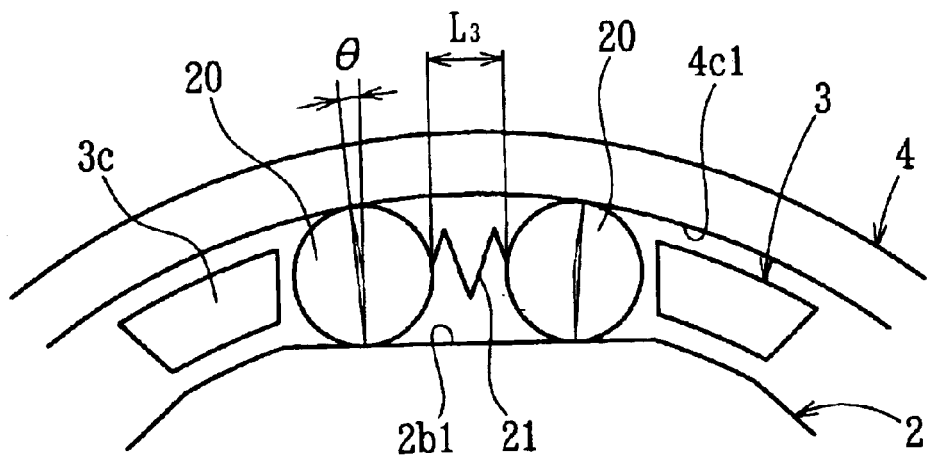
FIG. 46 is an enlarged partial cross-sectional view for explaining the operation of the second clutch part (with flat cam surfaces)
Figure 47:
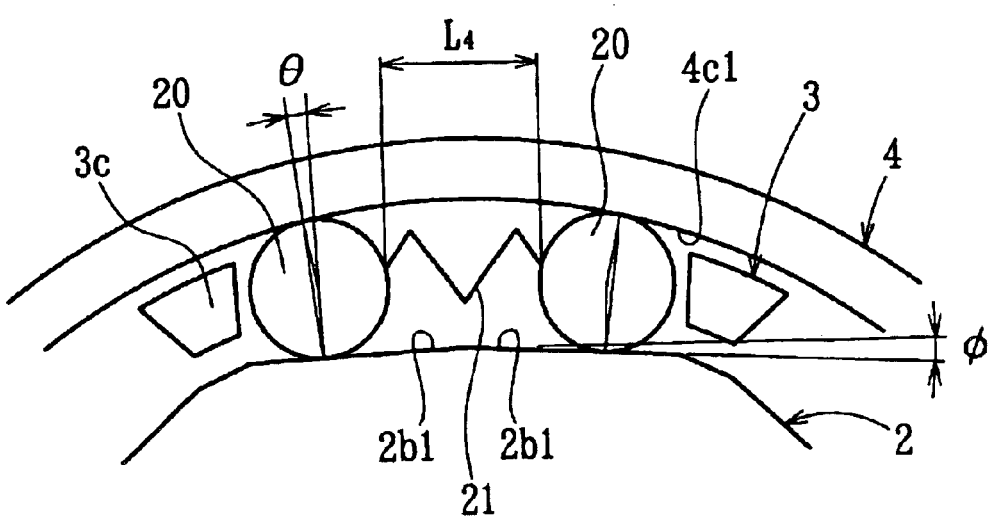
FIG. 47 is an enlarged partial cross-sectional view for explaining the operation of the second clutch part (with tapered cam surfaces)

In the embodiment described above, the cam surface 2b1 of the output shaft 2 is a flat surface that makes a chord of a circumference, as shown enlarged in FIG. 46. When this cam surface 2b1 is formed convex with the obtuse top of two tapered surfaces at the center as shown in FIG. 47, the spring space increases from $L_3$ to $L_4$ in size ($L_3 < L_4$) even when the strut angle $\theta$ is the same as with the flat cam surface. This improves the design flexibility of the plate spring 21, allowing an increase in torque capacity resulting from higher rigidity of the plate spring 21 or the miniaturization of the clutch unit resulting from the reduced size of the plate spring 21. In this case, the taper angle $\phi$ between the two tapered cam surfaces 2b1 is desirably set within the range of 1° and 5°.

The outer ring 1, the output shaft 2, the inner ring 3, the outer ring 4, the first clutch part 5, the second clutch part 6, the fixing side plate 7, and the frictional member 9 described above are assembled as shown in FIG. 22 to complete the clutch unit of this embodiment. The outer ring 1 is connected to an operation lever (13) made of resin, for example. The output shaft 2 is connected to a rotating member of a not-shown output-side mechanism. Besides, the fixing side plate 7 is fixed to a fixing member such as a not-shown casing by caulking the caulking portions 7b1. Incidentally, the outer ring 1 is restrained between a washer (or nut) 18 attached to outside the collar portion 1c and the flange portion 4a of the outer ring 4 so as not to come off from either of the axial sides.

In the first clutch part 5, the centering spring 12 is accommodated in the inner periphery of the protruding portions 1a2 of the outer ring 1, and restrained between one end face of the outer ring 1 and the flange portion 4a of the outer ring 4 so as not to come off from either of the axial sides. In addition, the retainer 11 and the rollers 10 are restrained between the collar portion 1c of the outer ring 1 and the flange portion 4a of the outer ring 4 so as not to come off from either of the axial sides. The retainer 11, the rollers 10, and the centering spring 12 of the first clutch part 5 are accommodated inside the outer ring 1 with no protrusion toward the input-side part. Moreover, the retainer 11 is mounted on the circumferential surface 3a2 of the inner ring 3 so that the rotation of the retainer 11 is guided by the circumferential surface 3a2 of the inner ring 3. The retainer 11 can thus rotate without a tilt, allowing smooth clutch operation.

The second clutch part 6 is compactly accommodated in a space surrounded by the outer ring 4 and the fixing side plate 7 in radial and axial directions. Besides, the column portions 3c serving as the lock releasing means and the pins 3b1 serving as the torque transmitting means are integrally arranged on the inner ring 3, with smaller parts count and simple structure. Moreover, the pockets 3c1 between the column portions 3c are shaped to open to an axial direction (toward the side plate 7). It is therefore possible to assemble the rollers 20 and the plate springs 21 into the pockets 3c1 through the axial openings of the pockets 3c1, after assembling the output shaft 2, the inner ring 3, the outer ring 4, and the like, for easy assembly.

Furthermore, because of the structure for supporting the output shaft 2 in a state of straddle with the radial bearing surface 3a1 of the inner ring 3 and the radial bearing surface 7e2 of the fixing side plate 7, the output shaft 2 stabilizes in rotation. Besides, the first clutch part 5 and the second clutch part 6 are less prone to partial load, allowing smooth clutch operation.

Figure 19:
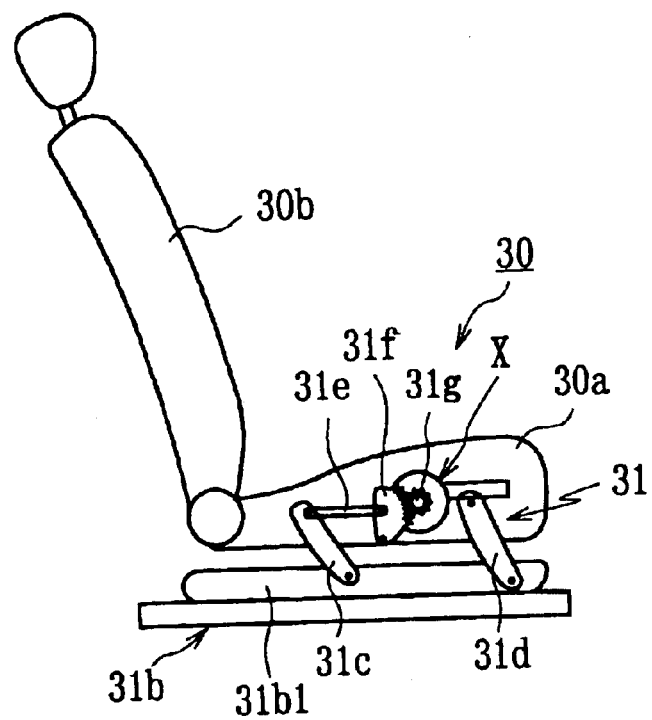
FIG. 19(a) is a conceptual diagram showing one example of a structure for the seat-height-adjusting device.
FIG. 19(b) is a detail view of the structure for the seat-height-adjusting device.
Figure 19:
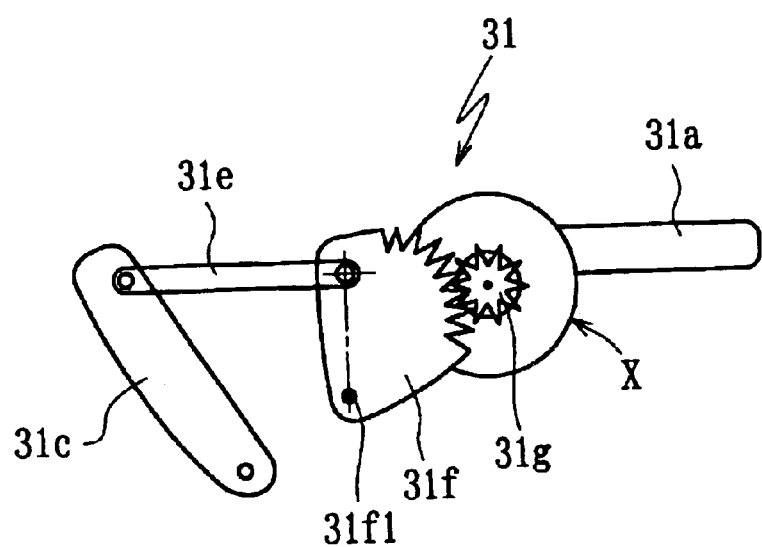

The clutch unit of this embodiment can be used in, for example, the seat-height-adjusting device 31 of the seat 30 shown in FIGS. 18 and 19, as the clutch unit of the foregoing embodiment is.

Figure 37:
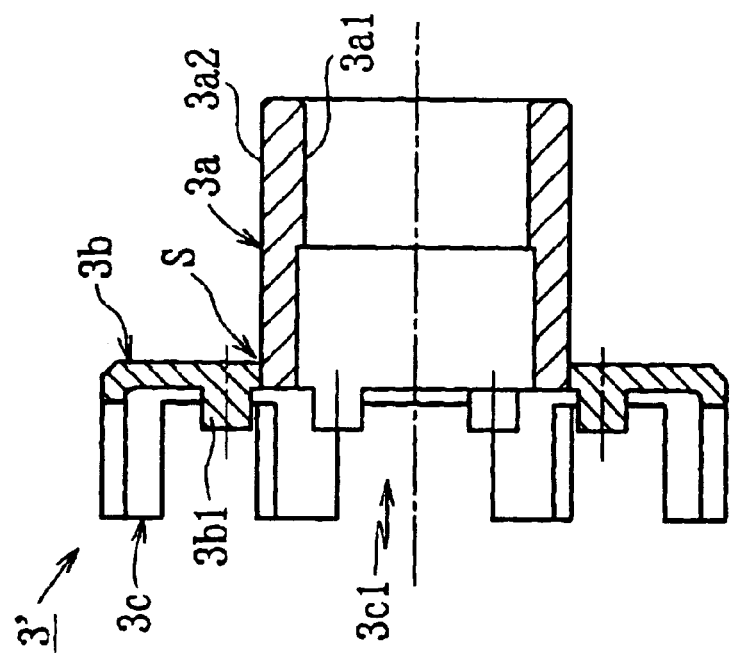
FIG. 37(a) is a rear view showing another example of the inner ring (control member)
FIG. 37(b) is a longitudinal sectional view of the same.
Figure 37:
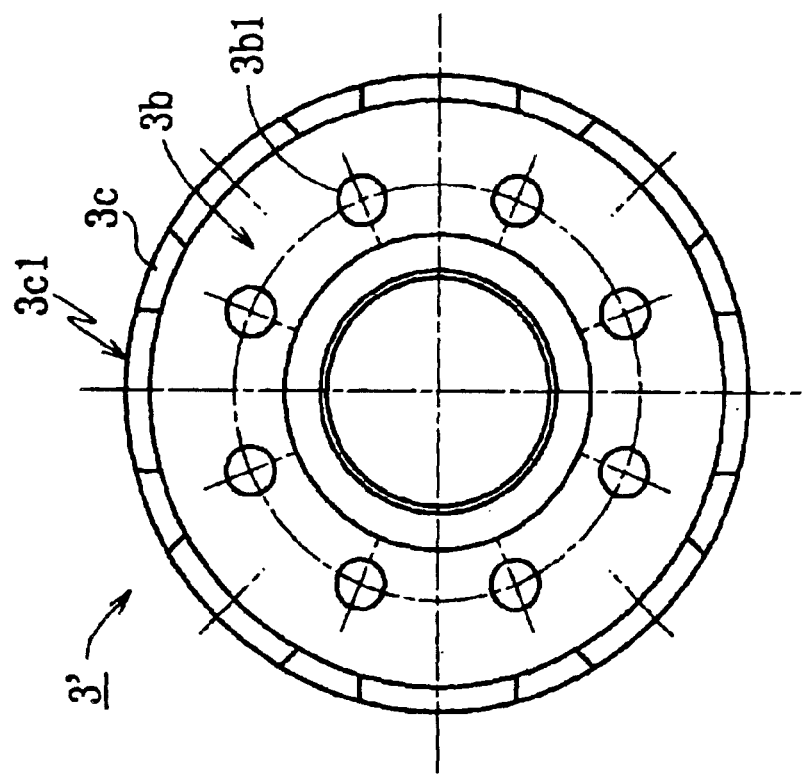

Incidentally, an inner ring 3' shown in FIG. 37 may be used instead of the inner ring 3 in the clutch unit of the foregoing embodiment. The inner ring 3' shown in the diagram has a structure in which the cylindrical portion 3a and the other portions (the portions consisting of the flange portion 3b, the column portions 3c, and the pins 3b1) are separated. The two portions are fixed by appropriate fixing means such as brazing. As compared to the inner ring 3 of integral structure, there is the advantage that precise fabrication is possible at relatively low cost.

Figure 48:
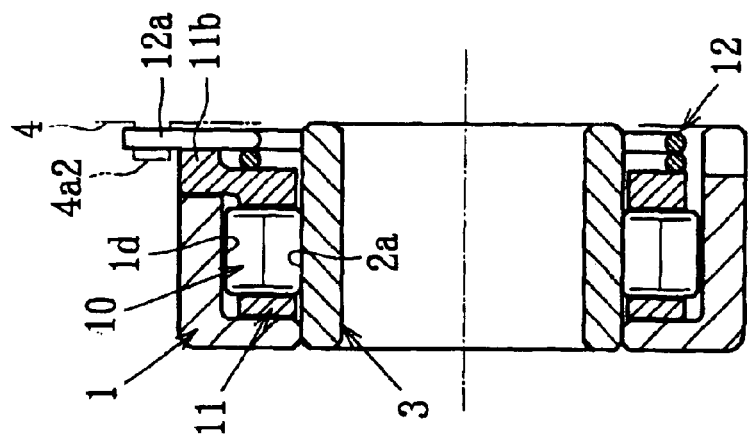
FIG. 48 shows an example where the input-side part alone is configured as an independent clutch unit, FIG. 48(a) being a longitudinal sectional view, FIG. 48(b) being a cross-sectional view.
Figure 48:
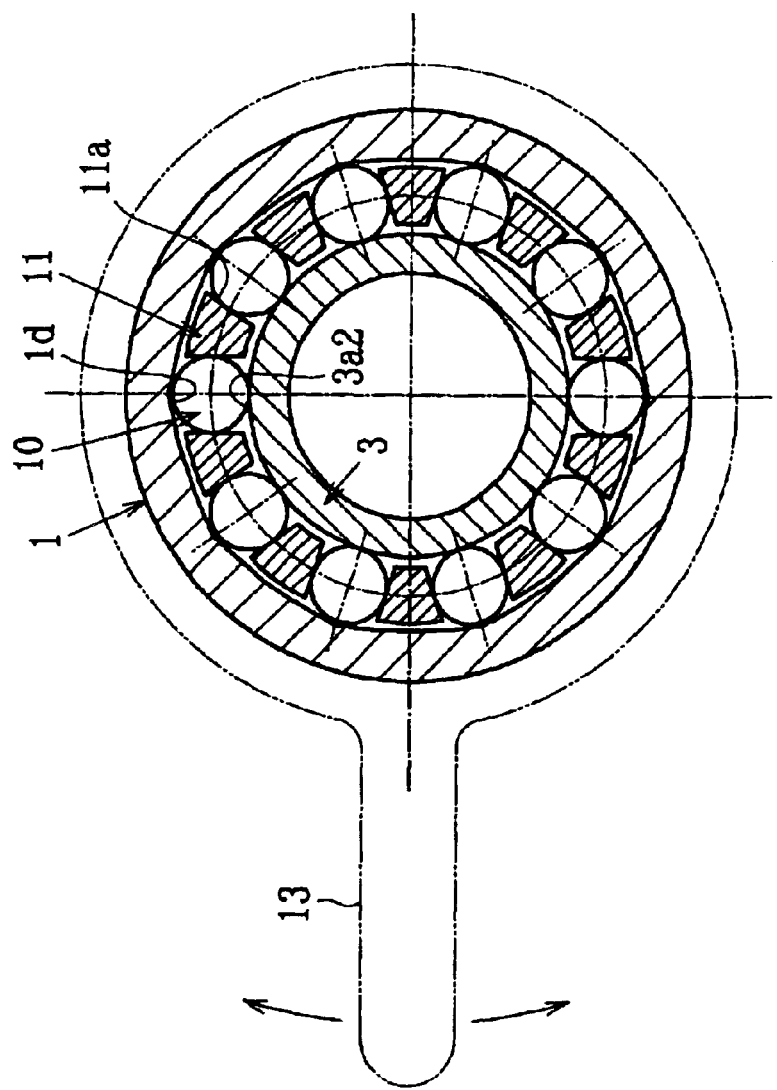

Otherwise, the input-side part alone may be configured as an independent clutch unit in such form as shown in FIG. 48.

FIG. 49 shows a clutch unit which is the input-side part of the clutch unit (FIG. 54) according to a fifth embodiment of the present invention to be described later, exclusively configured as an independent clutch unit.

This clutch unit comprises an outer ring 1' as an input-side member, an inner ring 2' as an output-side member, a plurality of rollers 3' as engaging members, a retainer 4' for retaining the rollers 3', and an elastic member attached to the retainer 4, such as a centering spring 5'.

Figure 50:
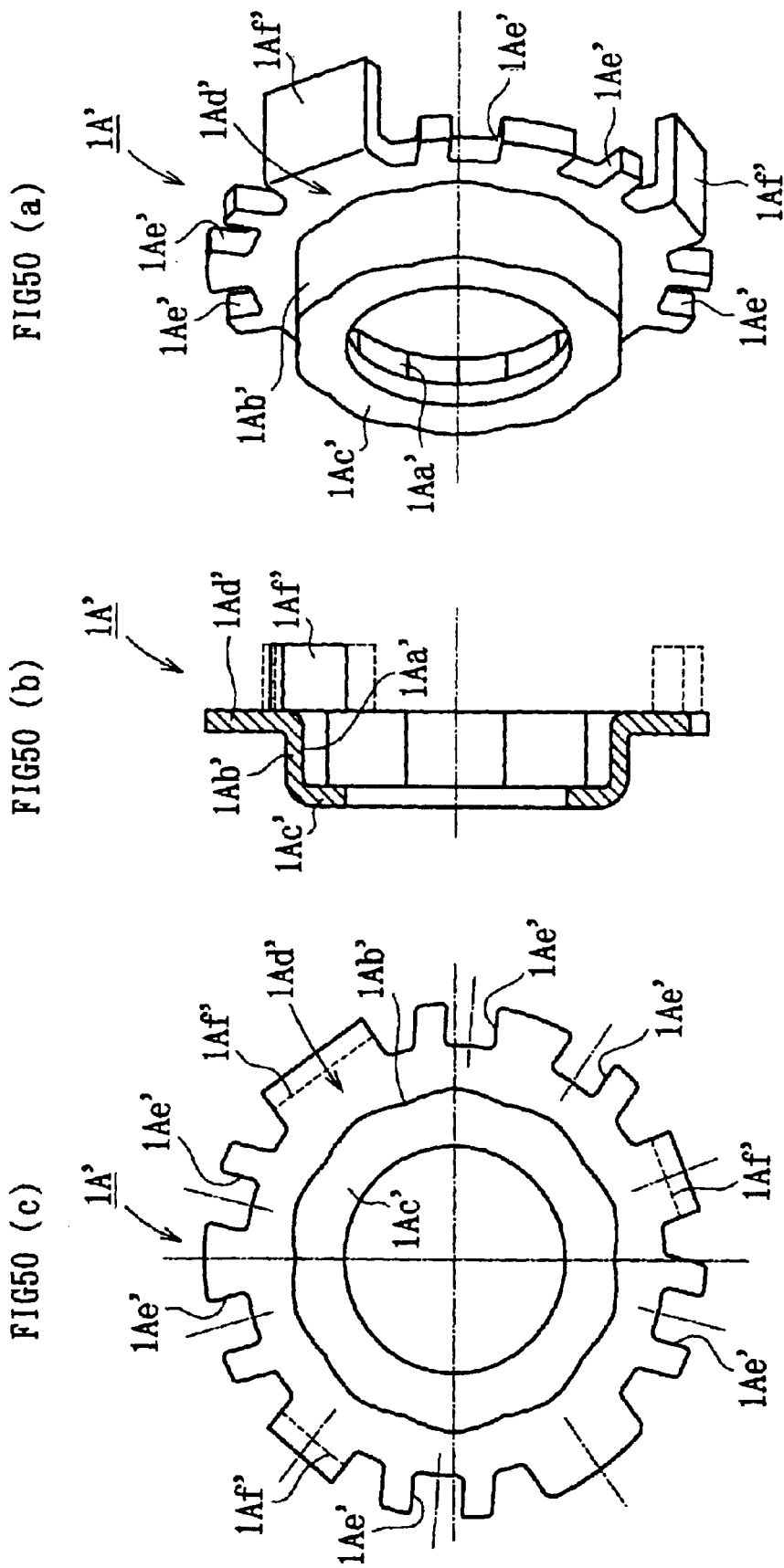
FIG. 50(a) is a perspective view of a first thin member.
FIG. 50(b) is a longitudinal sectional view of the same.
FIG. 50(c) is a front view of the same.

The outer ring 1' is composed of a first thin member 1A' shown in FIG. 50 and a second thin member 1B' shown in FIG. 51. These thin members 1A' and 1B' are both fabricated by press-forming a steel plate. Incidentally, for example, the second thin member 1B' may be made of a molded product of resin or the like if necessary.

The first thin member 1A' comprises a cylindrical portion 1Ab' having a plurality of cam surfaces 1Aa' formed on an inner periphery thereof at regular circumferential intervals, an inner flange portion 1Ac' extended inward from an end of the cylindrical portion 1ab', and an outer flange portion 1Ad' extended outward from the other end of the cylindrical portion 1Ab'.

Each cam surface 1Aa' is deep in its circumferential center, and gets shallower obliquely from the center toward both circumferential sides. The inner flange portion 1Ac' has the functions of restraining the retainer 4' from coming off in an axial direction and maintaining the outer ring 1' coaxial to the inner ring 2'.

The outer flange portion 1Ad' is provided with a plurality (six, in the shown example) of fitting grooves 1Ae' intended for connection with the second thin member 1B', and a plurality (three, in the shown example) of stopper tabs 1Af' axially extended from the outer end in a direction opposite from the cylindrical portion 1ab'. In the direction of rotation, these stopper tabs 1Af' are engaged with not-shown stopper protrusions of a stationary-side member 7' which is arranged on one side (right side in FIG. 49(a)) of the first thin member 1A' with rotation constraint, so that the rotation of the outer ring 1' is restrained within a predetermined range.

The entire first thin member 1A' or the cam surfaces 1Aa' are given heat treatment (surface hardening) such as carburizing and tempering, carbonitriding and tempering, induction hardening and tempering, or drip quenching and tempering.

Figure 52:
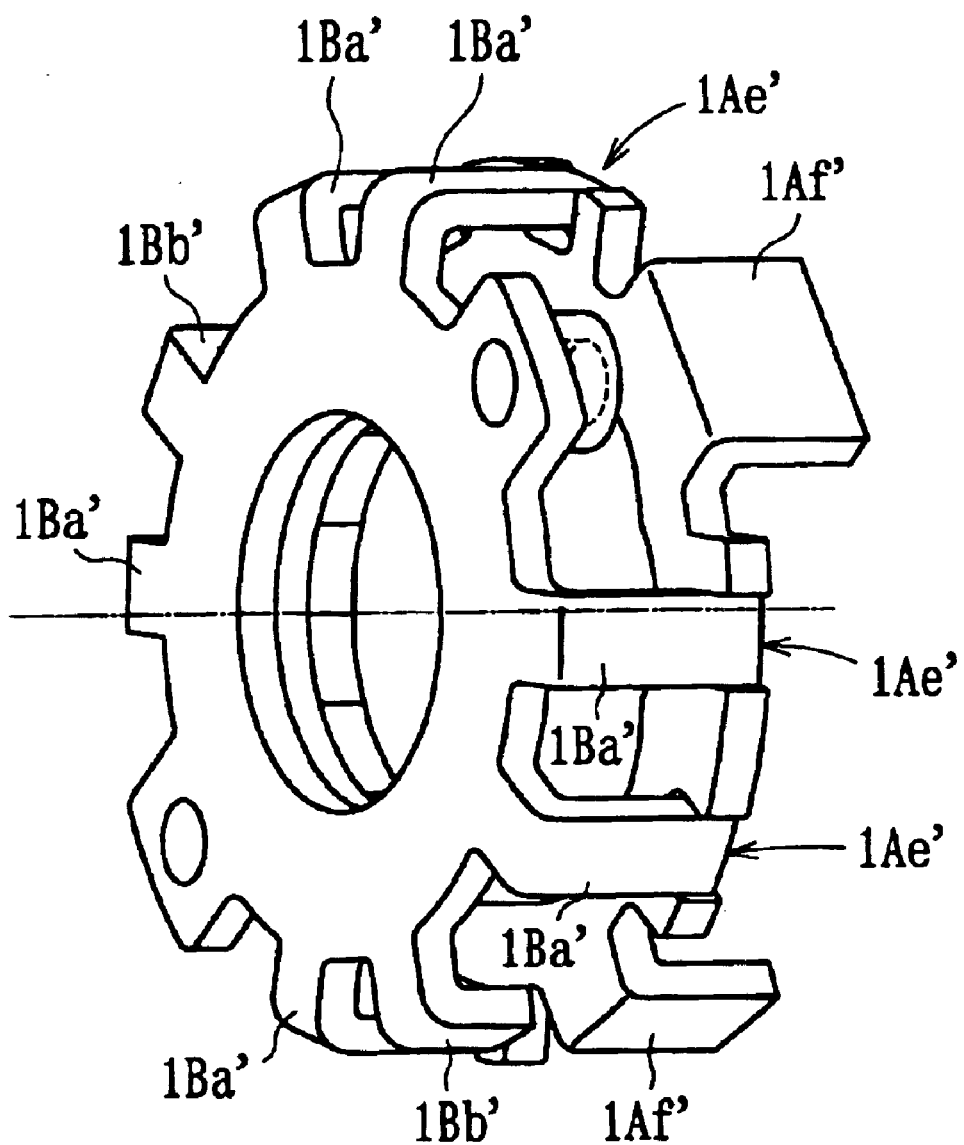
FIG. 52 is a perspective view showing the input-side member.

As shown in FIG. 51, the second thin member 1B' is provided with a plurality (six, in the shown example) of fitting tabs 1Ba' axially extended from the outer end toward the first thin member 1A'. The fitting tabs 1Ba' are fitted in the fitting grooves 1Ae' of the first thin member 1A' as shown in FIG. 52, so that both the thin members 1A' and 1B' are restrained from relative rotation and axial relative movement. Then, under this state, the fitting tabs 1Ba' are engaged with projections and depressions of an operation lever 6' as an operating member to be mounted on the outer periphery. The operation lever 6' is thus restrained from relative rotation with respect to the outer ring 1'. Note that two short tabs 1Bb' are formed in the shown example. These tabs 1Bb' are not intended for connection with the first thin member 1A' (having the function of restraint on the direction of rotation alone).

A plurality (two, in the shown example) of burring portions 1Bc' axially extended toward the first thin member 1A' are formed on the outer ends of the second thin member 1B'. Bolt through holes (or screw holes) 1Bd' are formed in these burring portions 1Bc', respectively. Through these holes 1Bd', the operation lever 6' is screwed to restrain the axial relative movement of the operation lever 6' with respect to the outer ring 1'.

Consequently, when the operation lever 6' is operated for rotation, the first thin member 1A' and the second thin member 1B' rotate integrally so that the input torque from the operation lever 6' is input to the outer ring 1'. In addition, the inner ring 2' has a circumferential surface 2a' for defining wedge gaps together with the cam surfaces 1Aa' of the outer ring 1' (the first thin member 1A'), and is connected to a not-shown output member.

Figure 53:
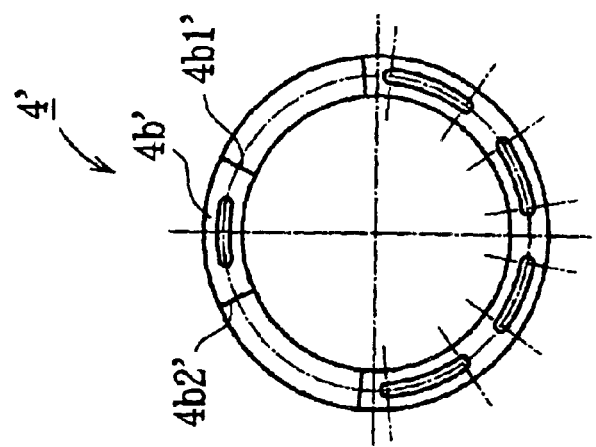
FIG. 53(a) is a side and front view showing a retainer of the first clutch part.
FIG. 53(b) is a longitudinal section and side view of the same.
FIG. 53(c) is a front view of the same.
Figure 53:
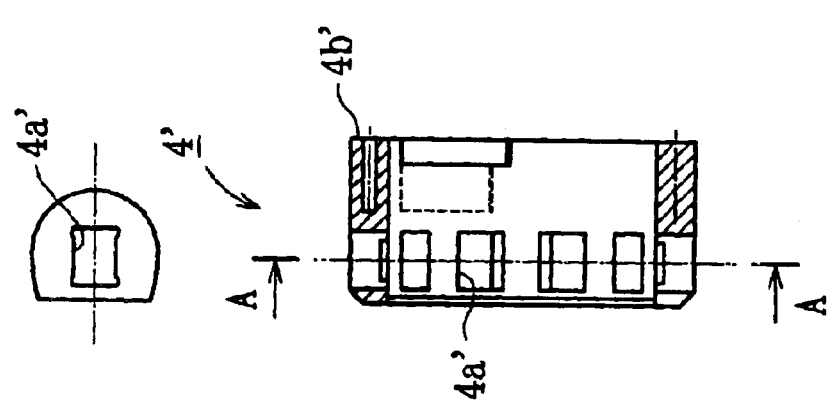
Figure 53:
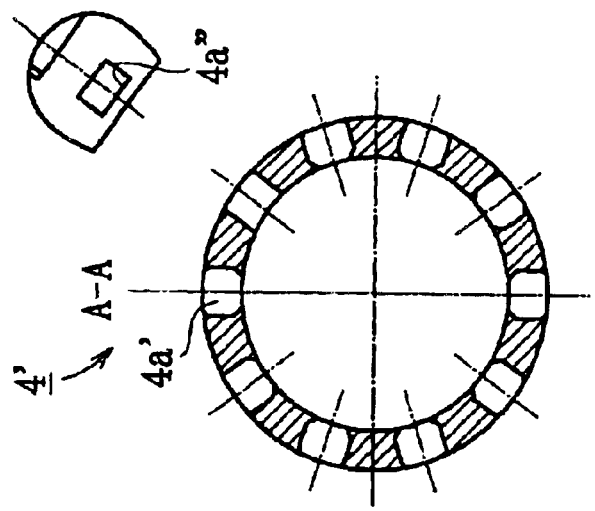

As shown in FIG. 53, the retainer 4' comprises a plurality (ten, for example) of window-like pockets 4a' for accommodating the rollers 3', and a engaged portion 4b' protruding in an axial direction from one of the end faces. The engaged portion 4b' is formed in an arc shape, for example. Moreover, engaging portions of the centering spring 5' are engaged with both circumferential sides 4b1' and 4b2' of the engaged portion 4b', respectively.

The material of the retainer 4' is in conformity with the first embodiment. Incidentally, in this example, the pocket 4a' adjoining to one of the circumferential sides 4b1' and 4b2' of the engaged portion 4b' is made smaller in axial dimension than the other pocket 4a'.

A clutch part 8' comprises the cam surfaces 1Aa' of the first thin member 1A' of the outer ring 1', the circumferential surface 2a' of the inner ring 2', the retainer 4' interposed between the cam surfaces 1Aa' and the circumferential surface 2a', and the centering spring 5'. Moreover, the cam surfaces 1Aa', the circumferential surface 2a', and the rollers 3' constitute locking means. The retainer 4' and the centering spring 5' constitute returning means.

The centering spring 5' is the same as the centering spring 12 shown in FIG. 32. Description will thus be omitted of the structure and operation. The operation of the clutch part 8' is also the same as in the embodiment described before. Description thereof will thus be omitted.

According to this clutch unit, the outer ring 1' serving as the input-side member is fabricated by applying presswork to the two members, the first thin member 1A' and the second thin member 1B'. This facilitates the machining with a reduction in fabrication cost, and allows a reduction in the weight of the outer ring 1' and by extension the clutch unit as compared to the case where the outer ring 1' were integrally formed by cold forging or the like.

Moreover, while the first thin member 1A' has the cam surfaces 1Aa' which are components of the clutch part, the second thin member 1B7 has the fitting tabs 1Ba' which are the connecting portions for the operation lever 6'. The two members 1A' and 1B' thus differ in rigidity and hardness requirements. Applying surface hardening (heat treatment) to the first thin member 1A' alone allows the individual characteristic requirements to be met efficiently.

Figure 54:
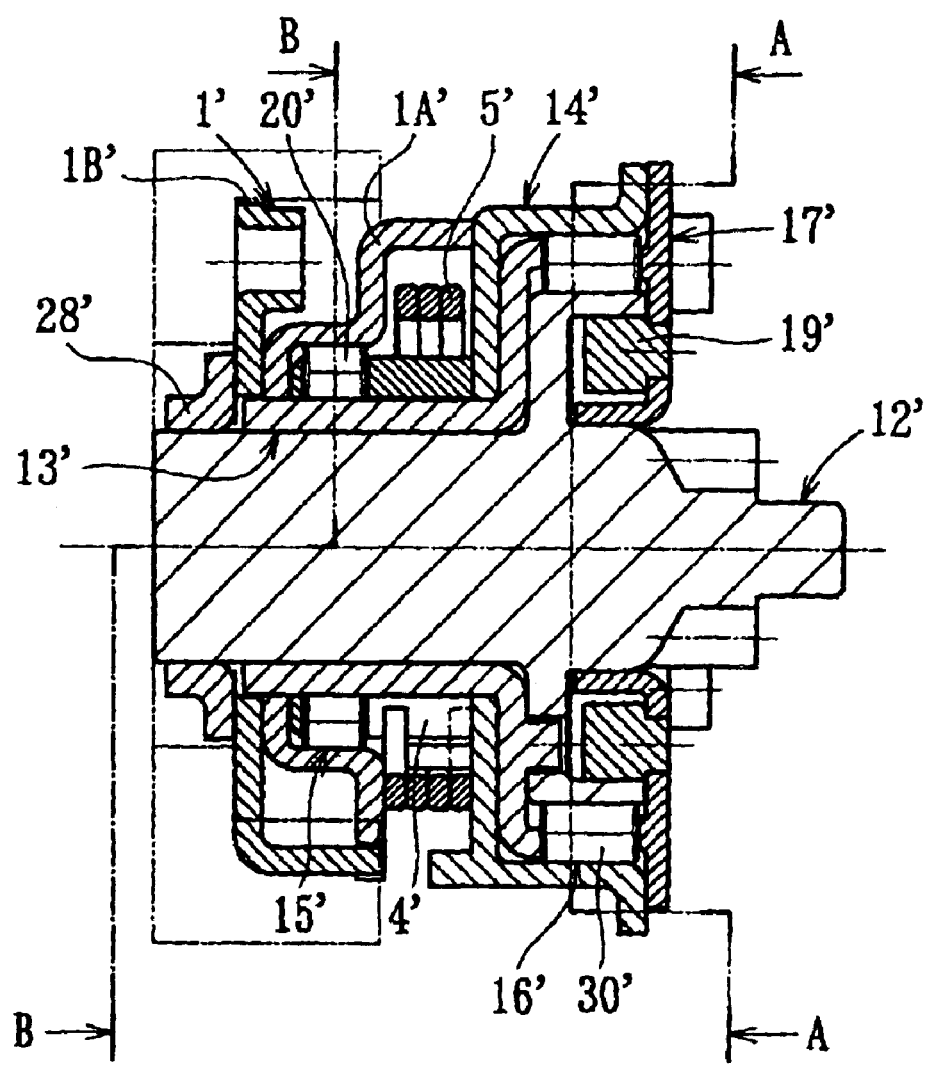
FIG. 54 is a longitudinal sectional view showing the entire structure of the clutch unit according to the fifth embodiment.

FIG. 54 shows a clutch unit according to a fifth embodiment of the present invention. The clutch unit according to this embodiment is that the clutch unit of the input-side part described above is integrally unitized with an output-side clutch unit to be described below. It comprises an outer ring 1' as an input-side member, an output shaft 12' as an output-side member, an inner ring 13' as a control member, an outer ring 14' as a stationary-side member, a first clutch part 15' arranged between the outer ring 1' and the inner ring 13', and a second clutch part 16' arranged between the outer ring 14' and the output shaft 12'.

Figure 55:
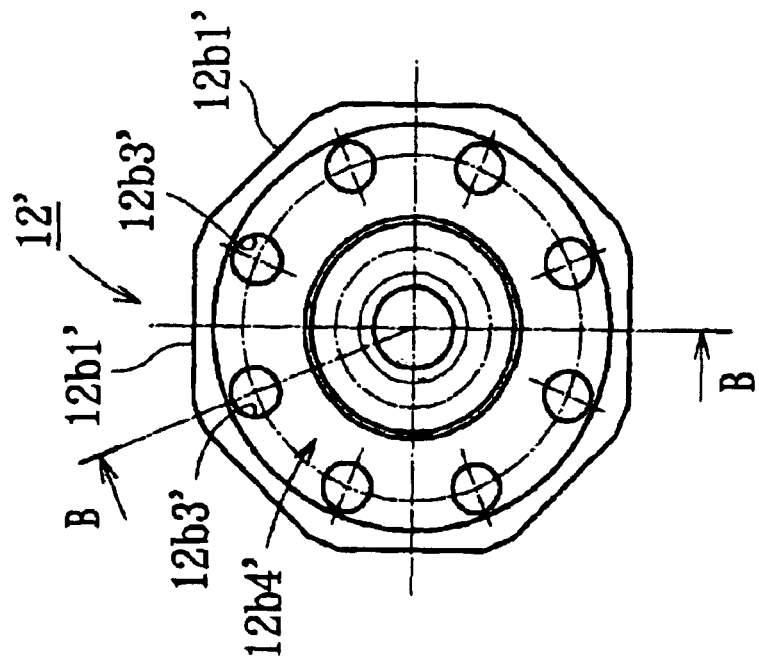
FIG. 55(a) is a front view of an output shaft.
FIG. 55(b) is a longitudinal sectional view of the same.
Figure 55:
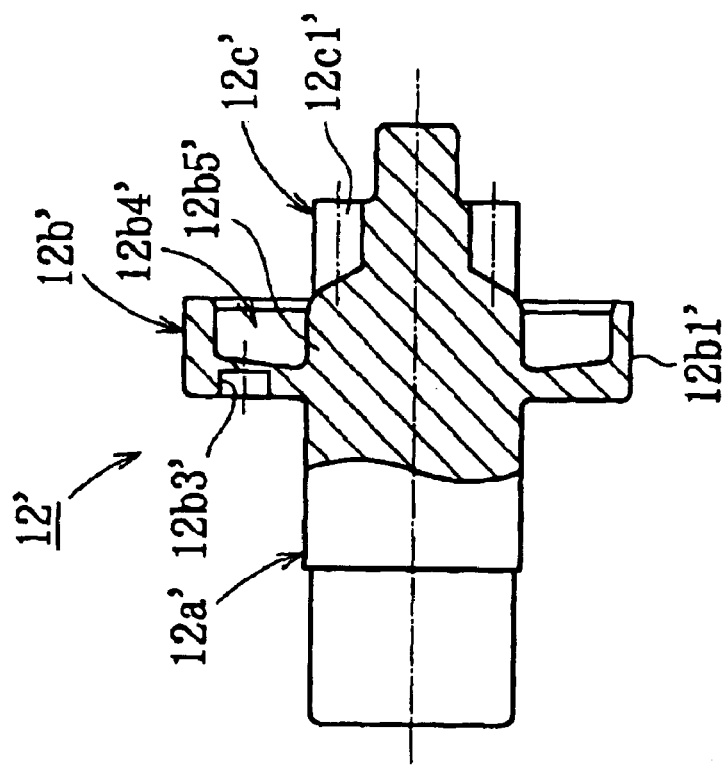

FIG. 55 shows the output shaft 12' as the output-side member. The output shaft 12' has a journal portion 12a' on one end, a large-diameter portion 12b' at the center, and a connecting portion 12c' on the other end. The journal portion 12a' is inserted in a radial bearing surface (13a1') of the inner ring (13': see FIG. 56) to be described later. A plurality (eight, for example) of cam surfaces 12b1' are formed on the outer periphery of the large-diameter portion 12b' at circumferential regular intervals. Each cam surface 12b1' is formed into a flat surface that makes a chord of a circle around the axial center of the output shaft 12'. A plurality (eight, for example) of pin holes 12b3' are formed in one side of the large-diameter portion 12b' at circumferential regular intervals. Pins (13b1') of the inner ring (13') are inserted in the pin holes 12b3'. Besides, an annular recess 12b4' is formed in the other side of the large-diameter portion 12b'. A frictional member (19': see FIG. 59) to be described later is pressed into the annular recess 12b4'. Moreover, the inner peripheral wall 12b5' of the annular recess 12b4' makes a journal surface to be inserted in a radial bearing surface (17e2') of a fixing side plate (17': see FIG. 58) to be described later. The connecting portion 12c' is provided with a tooth profile 12c1' intended for connecting to another rotating member.

The output shaft 12' is in conformity with the first embodiment in material, the method of heat treatment, surface hardness, and so on (chromium molybdenum steel SCM 420 may be used as the material for forming the output shaft 12').

FIG. 56 shows the inner ring 13' as the control member. The inner ring 13' comprises a cylindrical portion 13a', a flange portion 13b' extending outward from one end of the cylindrical portion 13a', and a plurality (eight, for example) of column portions 13c' extending in an axial direction from the outer end of the flange portion 13b'. The cylindrical portion 13a' is mounted on the journal portion 12a' of the output shaft 12', and inserted into the outer ring 1'. A radial bearing surface 13a1' for supporting the journal portion 12a' of the output shaft 12' radially is formed on the inner periphery of the cylindrical portion 13a' at the other end. A circumferential surface 13a2' for defining wedge gaps together with the cam surfaces 1Aa' of the outer ring 1' in both the normal and reverse directions of rotation is formed on the outer periphery of the cylindrical portion 13a' at the other end. A plurality (eight, for example) of pins 13b1' protruding in an axial direction are formed on the flange portion 13b' at circumferential regular intervals. These pins 13b1' are inserted in the pin holes 12b3' of the output shaft 12', respectively. Pockets 13c1' opening to one axial direction are formed between the column portions 13c' adjoining circumferentially. These pockets 13c1' accommodate rollers (30') and plate springs (31') of a second clutch part (16': see FIG. 61) to be described later. Since the rollers (30') and the plate springs (31') are loaded into the pockets 13c1' through the axial openings of the pockets 13c1', they are easy to assemble.

The inner ring 13' is in conformity with the first embodiment in material, the method of heat treatment, surface hardness, and so on (chromium molybdenum steel SCM 420 may be used as the material for forming the inner ring 13').

FIG. 57 shows the outer ring 14' as the stationary-side member. The outer ring 14' comprises a flange portion 14a' extending radially, a cylindrical portion 14c' extending in one axial direction from the outer end of the flange portion 14a', and a collar portion 14d' protruding outward from an end of the cylindrical portion 14c'. A plurality (two, for example) of stopper portions 14a1' protruding in the other axial direction are formed on the flange portion 14a' as arranged at predetermined circumferential intervals. These stopper portions 14a1' are engaged with the stopper tabs 1Af' of the outer ring 1' in the direction of rotation to restrain the range of rotation of the outer ring 1'. The flange portion 14a' is also provided with a pair of engaged portions 14a2' protruding in the other axial direction and a plurality (two, for example) of mounting portions 14a3'. The engaging portions of the centering spring 5' of the first clutch part (15') are engaged with the circumferential outer sides of the pair of engaged portions 14a2', respectively. Besides, the winding portion of the centering spring 5' is mounted on the outer periphery of the mounting portions 14a3'.

A circumferential surface 14c1' for defining wedge gaps together with the cam surfaces 12b1' of the output shaft 12' in both the normal and reverse directions of rotation is formed on the inner periphery of the cylindrical portion 14c'. A plurality (six, for example) of notches 14d1' are formed in the collar portion 14d' at predetermined circumferential intervals. The notches 14d1' match with caulking portions (17c': see FIG. 58) of the fixing side plate (17') to be described later.

The outer ring 14' is in conformity with the first embodiment in material, the method of heat treatment, surface hardness, and so on (chromium molybdenum steel SCM 420 may be used as the material for forming the outer ring 14').

Figure 58:
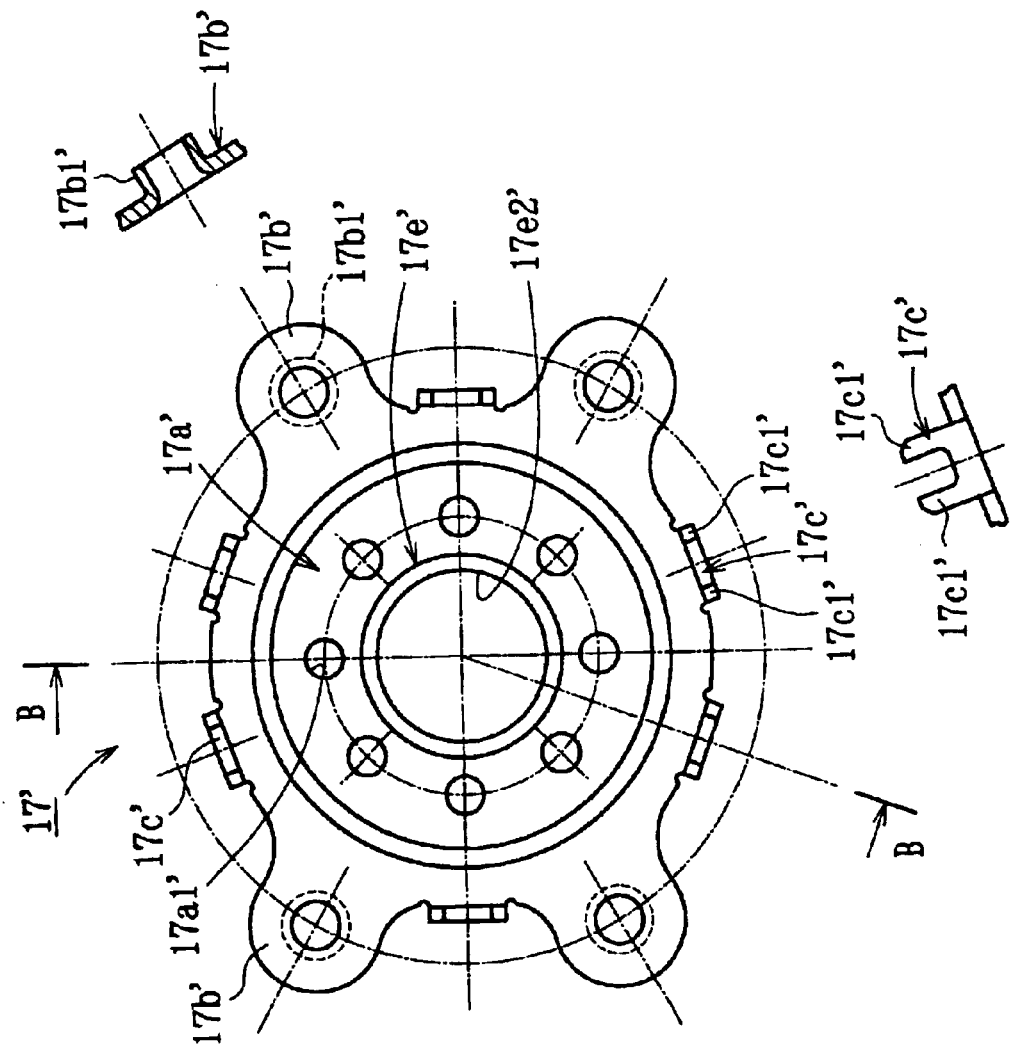
FIG. 58(a) is a front view of a fixing side plate.
FIG. 58(b) is a longitudinal sectional view of the same.
Figure 58:
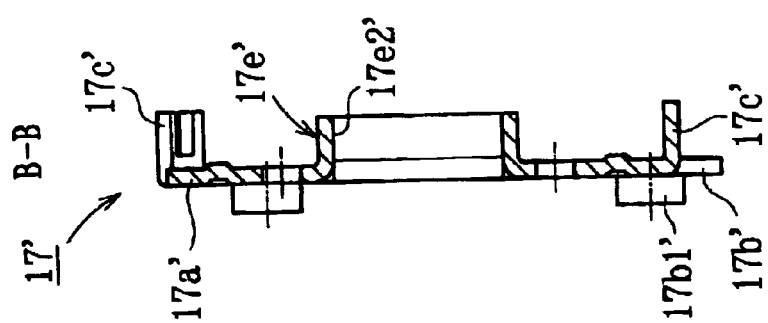

FIG. 58 shows the fixing side plate 17' to be fixed to the outer ring 14'. The fixing side plate 17' comprises a flange portion 17a' extending radially, a plurality (four, for example) of bracket portions 17b' protruding outward from the outer end of the flange portion 17a', a plurality (six, for example) of caulking portions 17c' protruding in one axial direction from the outer end of the flange portion 17a', a plurality (eight, for example) of engaging holes 17a1' formed in the flange portion 17a', and a boss portion 17e' protruding in one axial direction from the inner end of the flange portion 17a'. The four bracket portions 17b' are formed at predetermined circumferential intervals, each having a caulking portion 17b1' of hollow pin shape formed integrally (or separately) therewith. The six caulking portions 17c' are formed at predetermined circumferential intervals, each having a pair of tabs 17c1' branching in two. When these caulking portions 17c' are fitted to the notches 14d1' of the outer ring 14' with the pairs of tabs 17c1' caulked in circumferential opposite directions into contact with the collar portion 14d', so that the outer ring 14' can be prevented from axial relative movement and rotational relative movement with respect to the fixing side plate 17'. The caulking portions 17b1' are fixed to the mounting holes of a mating member by caulking.

A radial bearing surface 17e2' is formed on the inner periphery of the boss portion 17e'. The boss portion 17e' is inserted in the annular recess 12b4' of the output shaft 12'. The frictional member (19': see FIG. 59) to be described later is attached to between the outer periphery of the boss portion 17e' and the outer peripheral wall of the annular groove 12b4'. The engaging holes 17a1' are engaged with projections (19a') of the frictional member (19') in the direction of rotation, thereby preventing the relative rotation of the frictional member (19') with respect to the fixing side plate 17'. The radial bearing surface 17e2' of the boss portion 17e' is mounted on the journal surface 12b5' of the annular recess 12b4' to support the journal surface 12b5' radially.

The fixing side plate 17' is in conformity with the fourth embodiment in material, the method of formation, and the method of heat treatment.

Figure 59:
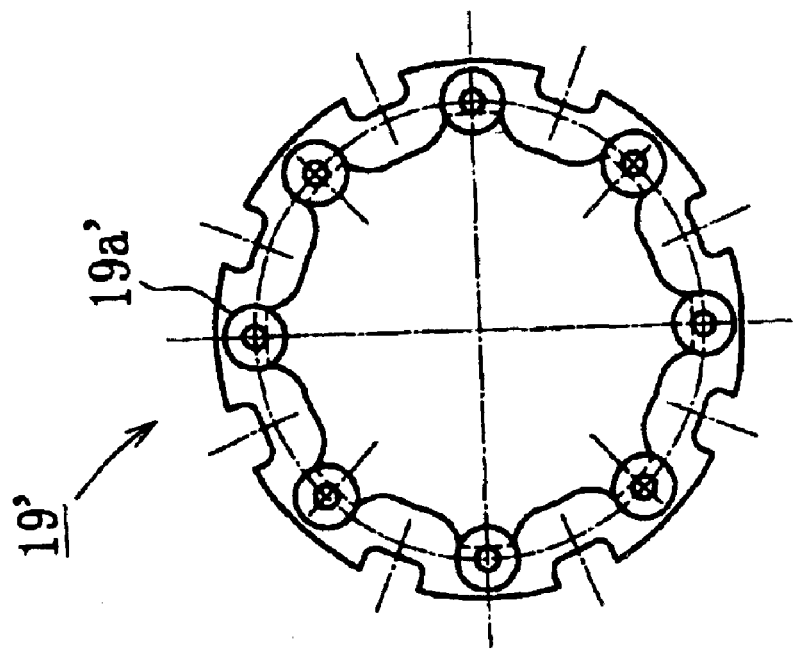
FIG. 59(a) is a front view of a frictional member (braking means)
FIG. 59(b) is a longitudinal sectional view of the same.
Figure 59:
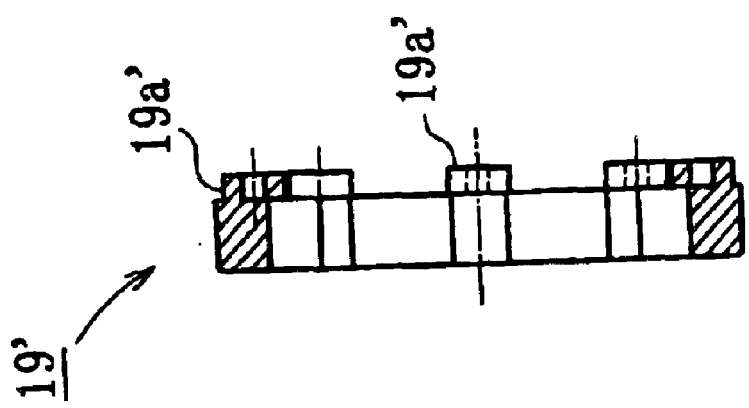

FIG. 59 shows the frictional member 19' as braking means. In this embodiment, the frictional member 19' has the shape of a ring, having a plurality (eight, for example) of projections 19a' formed on one of its end faces at predetermined circumferential intervals. The projections 19a' are engaged with the engaging holes 17a1' of the fixing side plate 17' in the direction of rotation, thereby preventing the relative rotation of the frictional member 19' with respect to the fixing side plate 17'.

The frictional member 19' is made of elastic material such as rubber and synthetic resin, and is pressed into the annular recess 12b4' of the output shaft 12' with interference to the outer peripheral wall, for example. The frictional force occurring between the outer periphery of the frictional member 19' and the outer peripheral wall of the annular recess 12b4' applies a braking force (frictional braking force) in the direction of rotation on the output shaft 12'. The setting of the braking force (braking torque) from the frictional member 19' and the material for forming the frictional member 19' are in conformity with the first embodiment.

Figure 60:
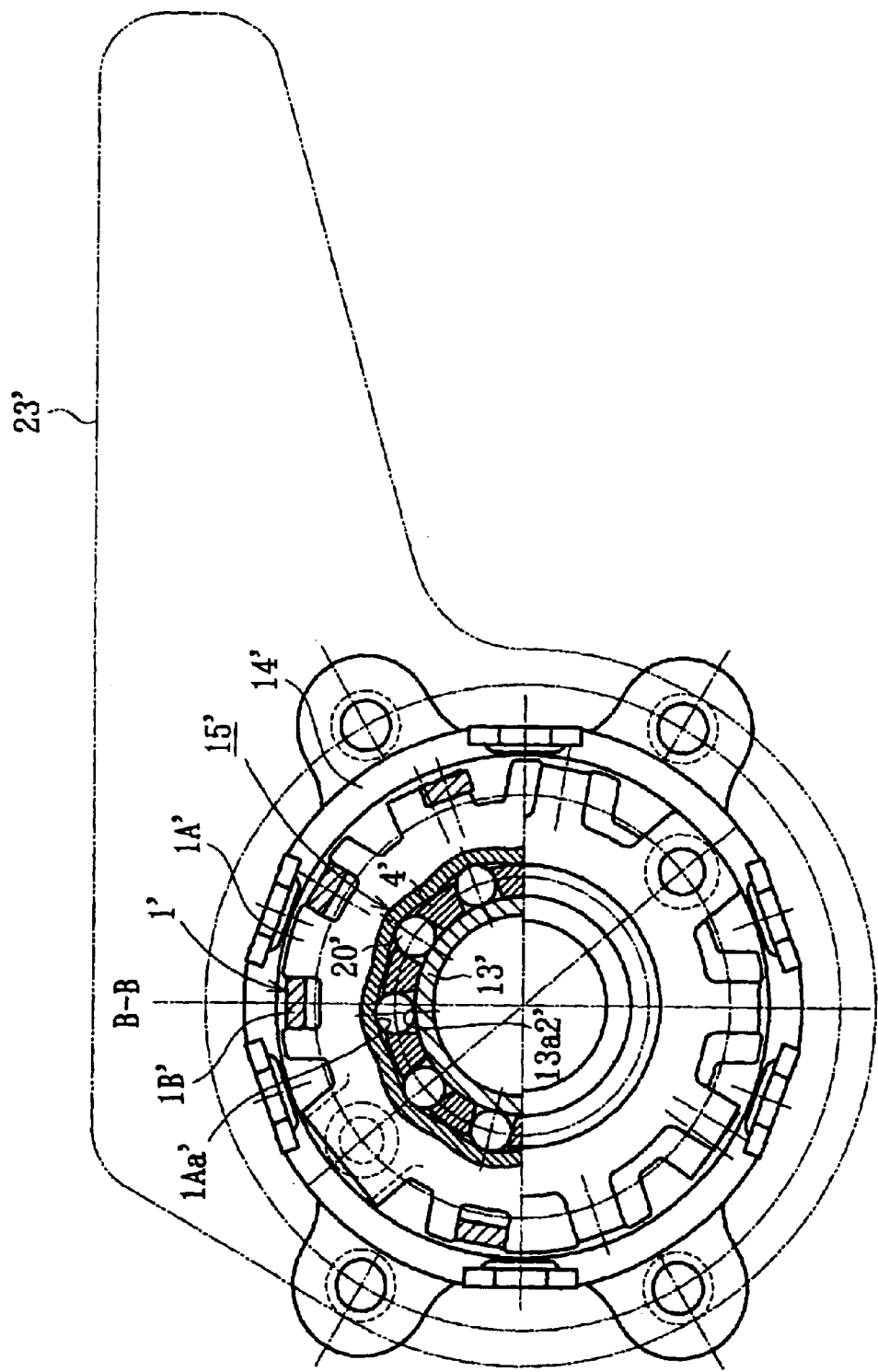
FIG. 60 is a cross-sectional view of the first clutch part.

FIG. 60 (B—B section of FIG. 54) shows the first clutch part 15'. The first clutch part 15' comprises the plurality (ten, for example) of cam surfaces 1Aa' provided to the outer ring 1', the circumferential surface 13a2' provided to the inner ring 13', a plurality (nine, for example) of rollers 20' as engaging members interposed between the cam surfaces 1Aa' and the circumferential surface 13a2', the retainer 4' for retaining the rollers 20', and an elastic member for coupling the retainer 4' to the outer ring (14') in the direction of rotation, such as the centering spring 5'. The cam surfaces 1Aa', the circumferential surface 13a2', and the rollers 20' constitute locking means. The retainer 4' and the centering spring 5' constitute returning means. In this embodiment, the cam surfaces 1Aa' define wedge gaps together with the circumferential surface 13a2' in both the normal and reverse directions of rotation. Besides, an operation lever 23' is connected to the outer ring 1'. Input torque in the normal direction or reverse direction is input to the outer ring 1' from the operation lever 23'. Moreover, grease is filled into the space between the inner periphery of the outer ring 1' and the outer periphery of the inner ring 13' (cylindrical portion 13a'), especially between the cam surfaces 1Aa' and the circumferential surface 13a2' in particular.

Figure 61:
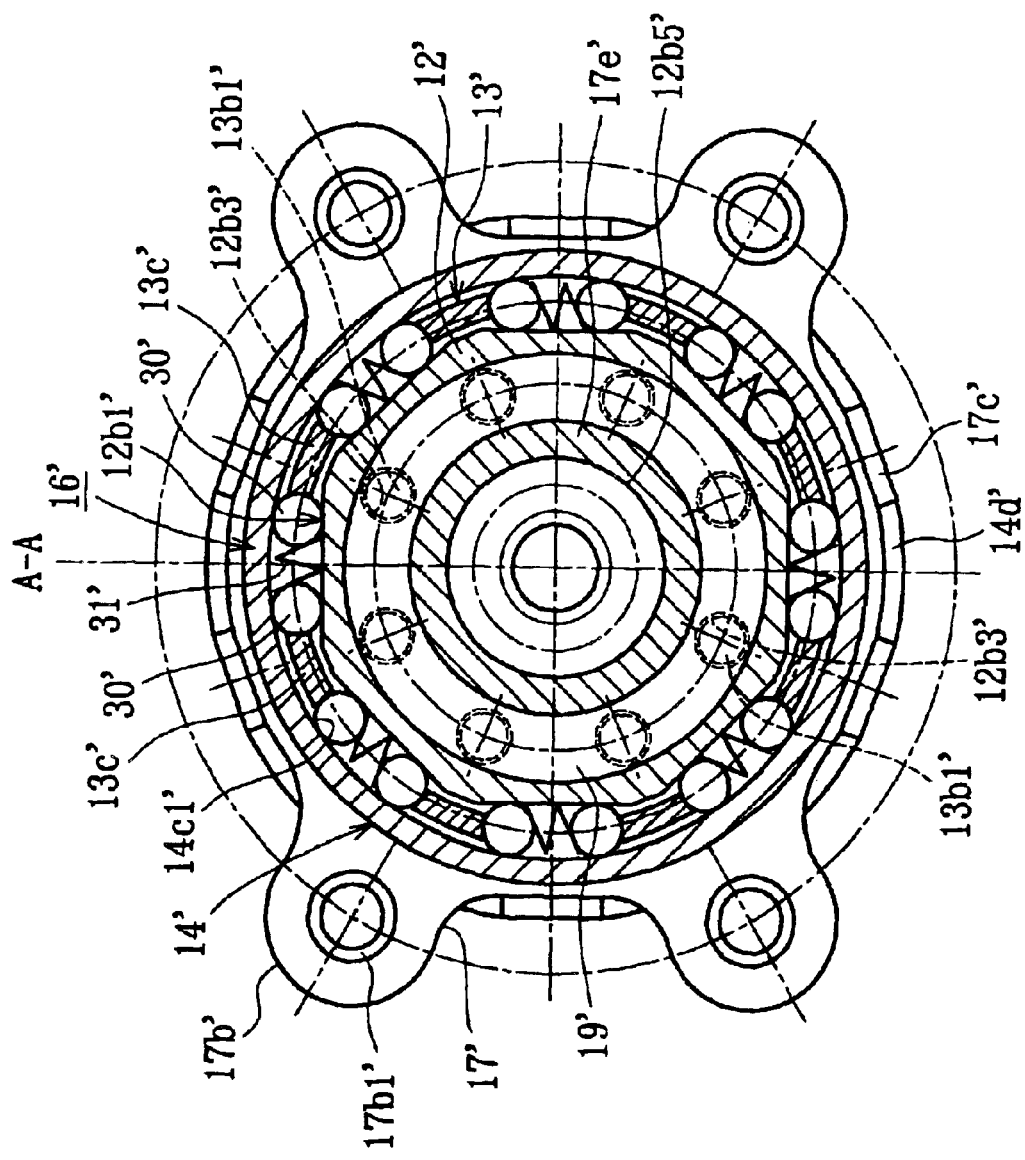
FIG. 61 is a cross-sectional view of the second clutch part.

FIG. 61 (A—A section of FIG. 54) shows the second clutch part 16'. The second clutch part 16' comprises the circumferential surface 14c1' provided to the outer ring 14', the plurality (eight, for example) of cam surfaces 12b1' provided to the output shaft 12', a pair (a total of eight pairs, for example) of rollers 30' as engaging members interposed between each cam surface 12b1' and the circumferential surface 14c1', an elastic member interposed between the pair of rollers 30', such as an N-sectioned plate spring 31', the column portions 13c' of the inner ring 13', the pins 13b1' of the inner ring 13', and the pin holes 12b3' of the output shaft 12'. The cam surfaces 12b1', the circumferential surface 14c1', the pair of rollers 30', and the plate spring 31' constitute locking means. The column portions 13c' of the inner ring 13' lying on both circumferential sides of the pair of rollers 30' constitute lock releasing means. The pins 13b1' of the inner ring 13' and the pin holes 12b3' of the output shaft 12' constitute torque transmitting means. Moreover, grease is filled into the space between the inner periphery of the outer ring 14 and the outer periphery of the output shaft 12 (large-diameter portion 12b), especially between the cam surfaces 12b1 and the circumferential surface 14c1 in particular. The operation of the second clutch part 16' is the same as in the embodiment described before. Description thereof will thus be omitted.

The outer ring 1', the output shaft 12', the inner ring 13', the outer ring 14', the first clutch part 15', the second clutch part 16', the fixing side plate 17', and the frictional member 19' described above are assembled as shown in FIG. 54 to complete the clutch unit of this embodiment. The outer ring 1' is connected to the operation lever 23' made of resin, for example. The output shaft 12' is connected to a rotating member of a not-shown output-side mechanism. Besides, the fixing side plate 17' is fixed to a fixing member such as a not-shown casing by caulking the caulking portions 17b1'. Incidentally, the outer ring 1' is restrained between a washer (or nut) 28' attached to outside the second thin member 1B' and the flange portion 14a' of the outer ring 14' so as not to come off from either of the axial sides.

In the first clutch part 15', the centering spring 5' is accommodated in the inner periphery of the stopper tabs 1Af' of the outer ring 1' (first thin member 1A'), and restrained between one end face of the outer ring 1' and the flange portion 14a' of the outer ring 14' so as not to come off from either of the axial sides. In addition, the retainer 4' and the rollers 20' are restrained between the inner flange portion 1Ac' of the outer ring 1' and the flange portion 14a' of the outer ring 14' so as not to come off from either of the axial sides. The retainer 4', the rollers 20', and the centering spring 5' of the first clutch part 15' are accommodated inside the outer ring 1' with no protrusion toward the input-side part.

Moreover, the retainer 4 is mounted on the circumferential surface 13a2' of the inner ring 13' so that the rotation of the retainer 4' is guided by the circumferential surface 13a2' of the inner ring 137. The retainer 4' can thus rotate without a tilt, allowing smooth clutch operation.

The second clutch part 16' is compactly accommodated in a space surrounded by the outer ring 14' and the fixing side plate 17' in radial and axial directions. Besides, the column portions 13c' serving as the lock releasing means and the pins 13b1' serving as the torque transmitting means are integrally provided to the inner ring 13', with smaller parts count and simple structure. Moreover, the pockets 13c1' between the column portions 13c' are shaped to open to one axial direction (toward the fixing side plate 17'). It is therefore possible to assemble the rollers 30' and the plate springs 31' into the pockets 13c1' through the axial openings of the pockets 13c1', after assembling the output shaft 12', the inner ring 13', the outer ring 14', and the like, for easy assembly.

Furthermore, because of the structure for supporting the output shaft 12' in a state of straddle with the radial bearing surface 13a1' of the inner ring 13' and the radial bearing surface 17e2' of the fixing side plate 17', the output shaft 12' stabilizes in rotation. Besides, the first clutch part 15' and the second clutch part 16' are less prone to partial load, allowing smooth clutch operation.

Furthermore, the outer ring 1' serving as the input-side member is fabricated by applying presswork to the two members, the first thin member 1A' and the second thin member 1B'. This facilitates the machining with a reduction in fabrication cost, and allows a reduction in the weight of the outer ring 1' and by extension the clutch unit.

While the first thin member 1A' and the second thin member 1B' differ in rigidity or hardness requirement, the application of surface hardening (heat treatment) to the first thin member 1A' alone allows the respective requirements to be met efficiently.

The clutch unit of this embodiment can be used in, for example, the seat-height-adjusting device 31 of the seat 30 shown in FIGS. 18 and 19, as the clutch unit of the above-described embodiment is.

Figure 62:
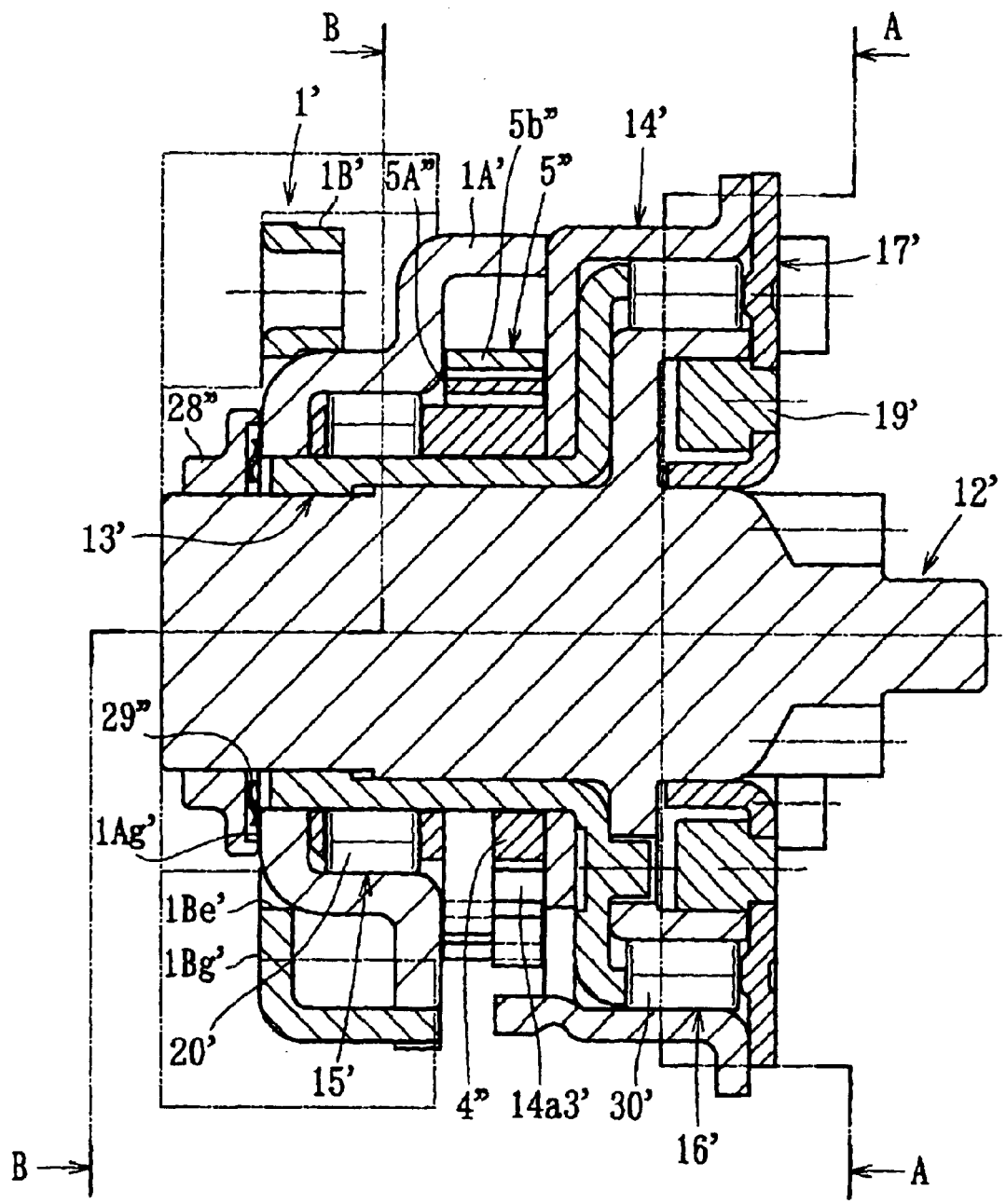
FIG. 62 is a longitudinal sectional view showing the entire structure of the clutch unit according to the second embodiment.

FIG. 62 shows a clutch unit according to a sixth embodiment of the present invention. As compared to the fifth embodiment shown in FIG. 54, the clutch unit of this embodiment differs in the following structure.

Figure 63:
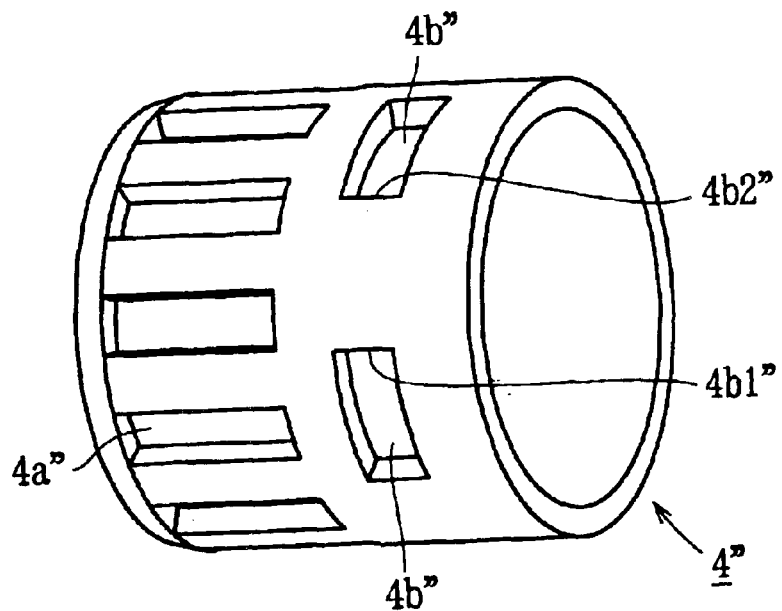
FIG. 63 is a perspective view of a retainer of the first clutch part.
Figure 66:
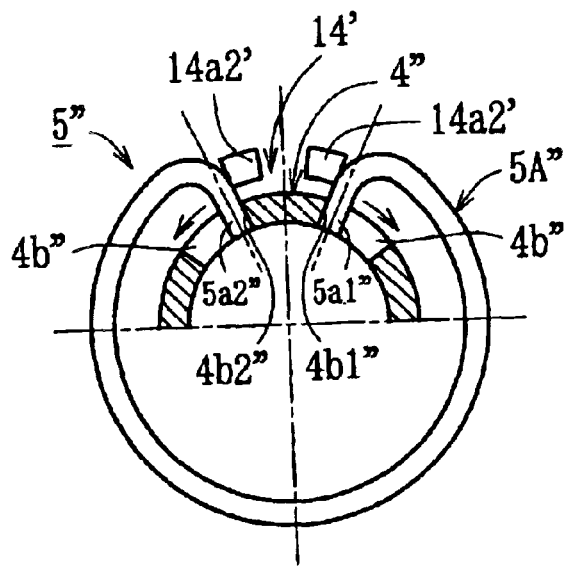
FIG. 66 is a front view for explaining the operation of the elastic member of the first clutch part, FIG. 66(a) showing a neutral state, FIG. 66(b) showing a state where input torque is input.
Figure 66:
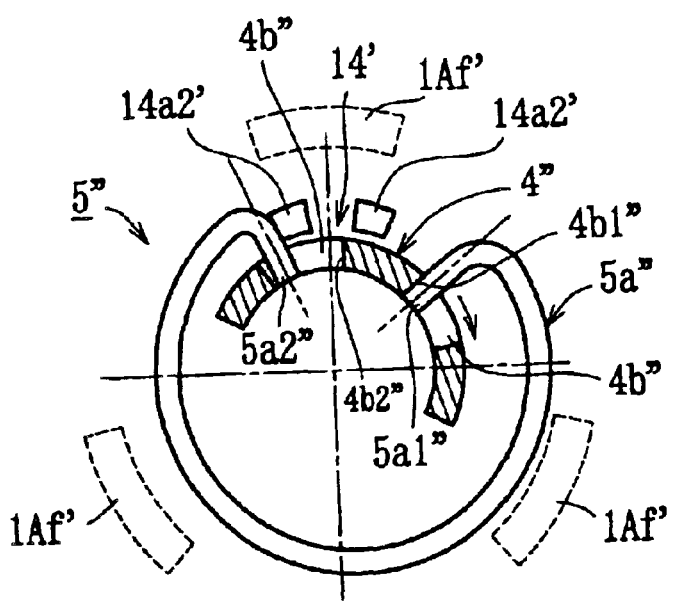

As shown in FIG. 63, a retainer 4" is cylindrical in shape, and comprises a plurality (ten, for example) of window-like pockets 4a" for accommodating rollers (3') and a pair of openings 4b" spaced circumferentially. The two openings 4b" have the shape of a window closed all around. Engaging portions 5a1" and 5a2" of an elastic member 5" to be described later are inserted in the openings 4b", respectively (see FIG. 66(a)).

Figure 64:
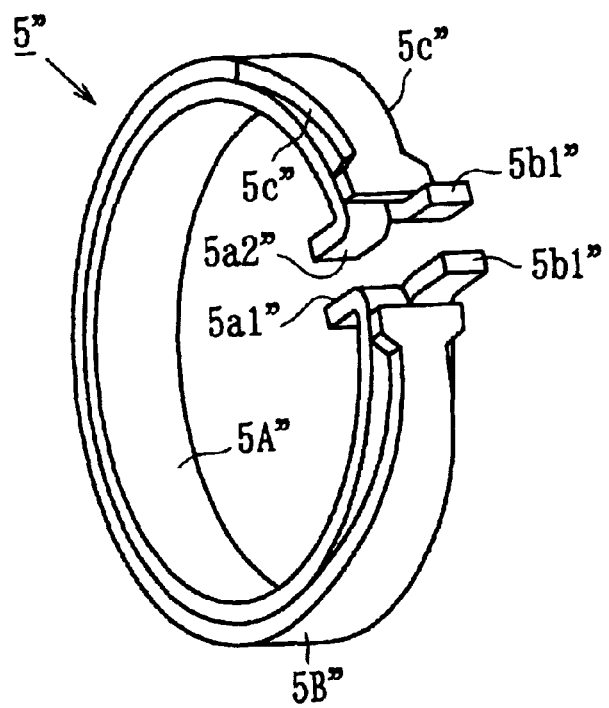
FIGS. 64 and 65 are perspective views of an elastic member of the first clutch part.
Figure 65:
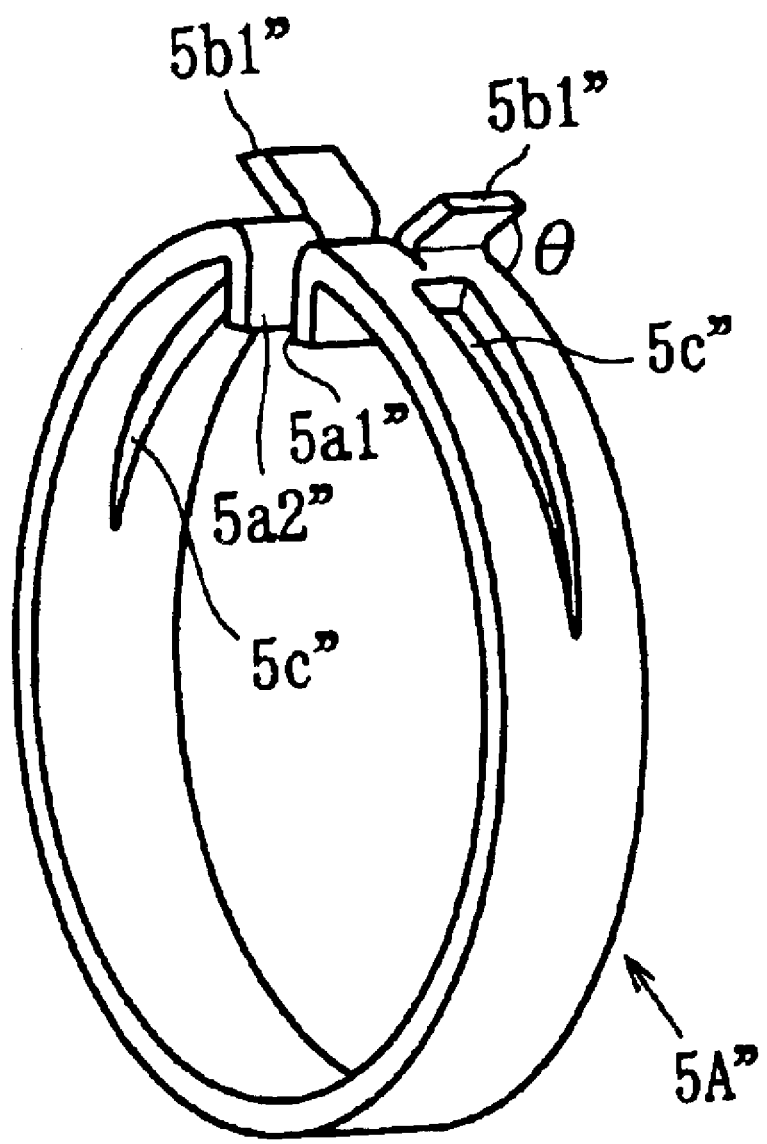

As shown in FIG. 64, the elastic member 5" is constituted by rolling metal strip material such as stainless steel into plate springs 5A" and 5B" of cut ring shape, and laminating these two plate springs 5A" and 5B". The engaging portions 5a1" and 5a2" are formed by bending inward the extremities of both ends of the inner plate spring 5A" at one axial side. The two engaging portions 5a1" and 5a2" are circumferentially opposed to each other at a predetermined distance, and are inserted to the openings 4b" of the retainer 4", respectively. In addition, engaged portions 5b1" are formed by bending outward the extremities of the ends of the plate spring 5A" at the other axial side. These engaged portions 5b1" have the function of engaging with both ends of the outer plate spring 5B", thereby restraining the plate spring 5B" from coming off or shifting in phase circumferentially. As shown in FIG. 65, the two engaged portions 5b1" can be further bent away from each other to make the tilt angle θ acute so that the restraining function is enhanced further.

To mount the elastic member 5", as shown in FIG. 66(a) {incidentally, the outer plate spring 5B" is omitted from FIGS. 66(a) and 66(b) for the sake of simplicity of the drawings}, the engaging portions 5a1" and 5a2" are inserted to the openings 4b" of the retainer 4", respectively, with the interval between the pair of engaging portions 5a1" and 5a2" widened circumferentially so that the engaging portions 5a1" and 5a2" engage with circumferential sides 4b1" and 4b2" of the openings 4b". The engaged portions 14a2' provided to the stationary-side member 14' lie outside both the sides 4b1" and 4b2". In the neutral position of the retainer 4" shown in FIG. 66(a), both the engaging portions 5a1" and 5a2" of the elastic member 5" are also engaged with the engaged portions 14a2'. By the foregoing mounting, the retainer 4" is coupled to the stationary-side member 14' through the elastic member 5" in the direction of rotation.

As shown in FIG. 66(d), when the retainer 4" is relatively rotated clockwise with respect to the stationary-side member from this state, the engaging portion 5a1" lying in the clockwise direction (forward in the direction of rotation) of the engaging portions 5a1" and 5a2" of the elastic member 5" is pressed by the side 4b1" of the retainer 4" to make clockwise elastic displacement. At this point, the engaging portion 5a2" of the elastic member 5", lying in the counterclockwise direction (backward in the direction of rotation), is engaged by the engaged portion 14a2' of the stationary-side member 14'. Consequently, the elastic member 5" bends to the direction in which the interval between the pair of engaging portions 5a1" and 5a2" is widened, so that the elastic member 5" accumulates elastic force corresponding to the amount of bending. Subsequently, when the rotating force acting on the retainer 4" is released, the retainer 4" returns to the neutral position shown in FIG. 66(a) by the elastic force of the elastic member 5".

Incidentally, when the retainer 4" is relatively rotated counterclockwise from the state shown in FIG. 66(a), the engaging portion 5a2" of the elastic member 5" in the counterclockwise direction is pressed by the side 4b2" of the retainer 4" for counterclockwise elastic displacement. The elastic member 5" accumulates elastic force by the action reverse to the foregoing.

Figure 67:
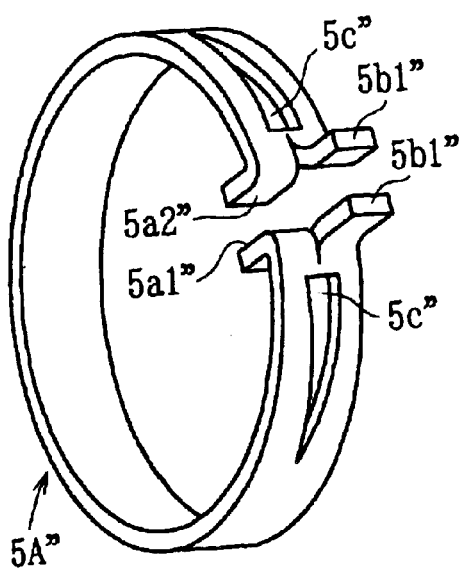
FIGS. 67(a), 67(b), 68(a) and 68(b) are perspective views of alternate embodiments of the elastic member of the first clutch part.
Figure 67:
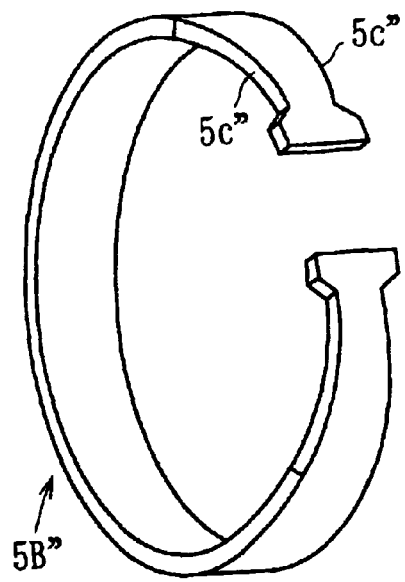

By the way, when the retainer 4" is rotated as shown in FIG. 66(b), stress distribution across the entire elastic member 5" may become uneven. Then, the elastic member 4" may bend irregularly with adverse effect. To avoid this, as shown in FIGS. 67(a) and 67(b), stress adjusting portions 5c" are desirably formed near both ends of the plate springs 5A" and 5B". The stress adjusting portions 5c" are intended to weaken the spring rigidity partially, and are constituted, for example, by forming holes in the plate spring 5A" as shown in FIG. 67(a) or by cutting off both axial sides of the plate spring 5B" as shown in FIG. 67(b). No matter which of the stress adjusting portions 5c" is adopted, the plate springs 5A", 5B" shall be reduced in axial sectional area toward the ends of the plate springs.

Figure 68:
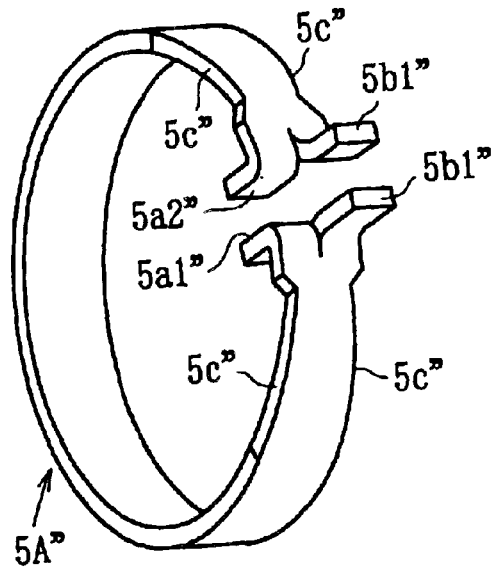
Figure 68:
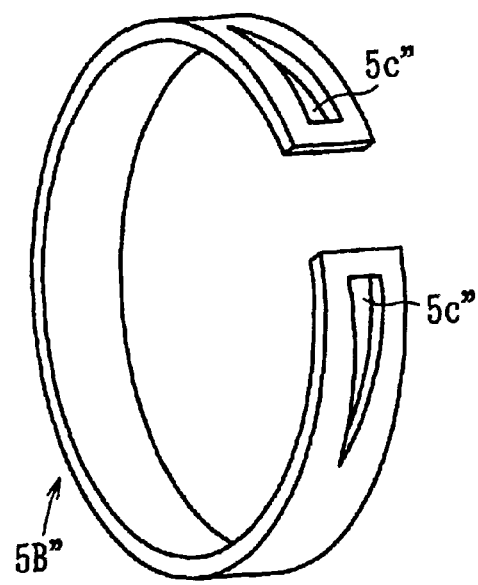
Figure 69A:
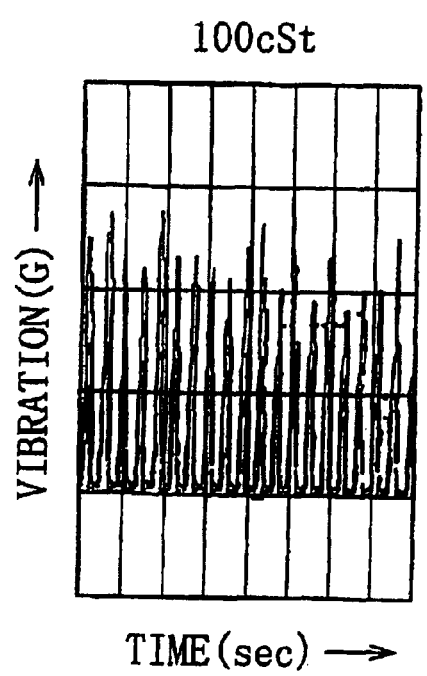
FIGS. 69(a), (b), (c), and (d) are diagrams showing the results of measurements on the occurrence of vibrations during the operation of clutch units wherein each diagram shows a vibration response for a clutch unit having lubricating greases with a particular viscosity.
Figure 69B:
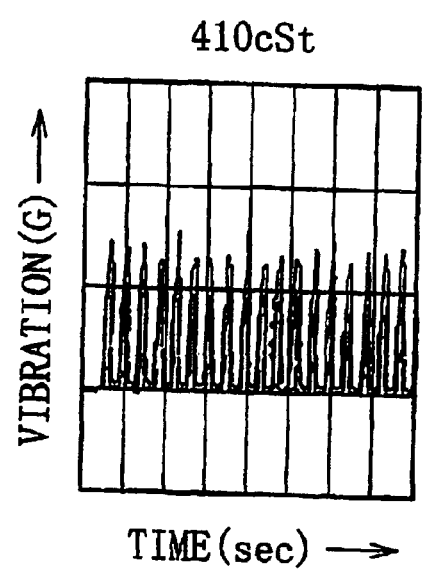
Figure 69C:
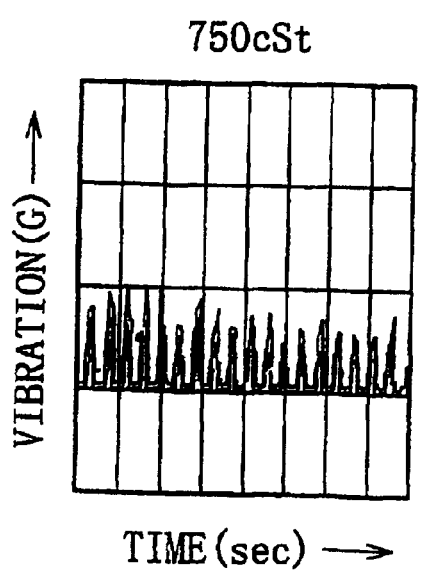
Figure 69D:
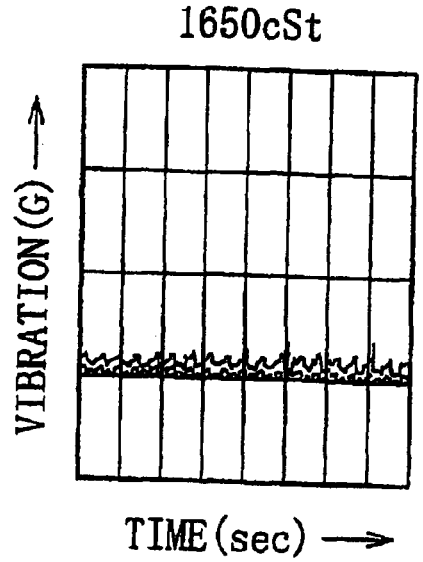

In FIGS. 67(a) and 67(b), the inner plate spring 5A" is provided with the holes, and the outer plate spring 5B" is provided with the cuts as the stress adjusting portions 5c". On the contrary, the inner plate spring 5A" may be provided with the cuts, and the outer plate spring 5B" may be provided with the holes [see FIGS. 68(a) and 68(b)]. In this case, both the plate springs 5A" and 5B" may be provided with the same type of stress adjusting portions 5c" (both are provided with the holes, or both are provide with the cuts). When the stress adjusting portions 5c" in both are holes, however, the inner side and the outer side of the elastic member 5" can communicate through these holes to cause a drop in sealability (such as a bite of foreign material into the inner side of the elastic member 5"). It is therefore desirable that cuts be adopted as the stress adjusting portions 5c" of at least either one (yet desirably the outer one) of the plate springs. Incidentally, the stress adjusting portions 5c" may be provided with both the plate springs 5A" and 5B" as described above, or in either one of the plate springs.

When the elastic member 5" uses the plate springs 5A" and 5B" of cut ring shape shown in FIGS. 64 to 68, it is possible to align the axial positions of the engaging portions 5a1" and 5a2". This precludes the retainer 4" from moment load and thus enhances the returning torque after rotative operations, so that the outer ring 1' and the operation lever can be surely restored to their neutral positions.

To verify the foregoing effect, the clutch unit shown in FIG. 62 and the clutch unit shown in FIG. 54 were individually measured for the torque generated by the elastic member 5', 5" alone and the returning force of the operation lever, followed by the calculation of the frictional loss. The latter showed a generated torque of 170 [N·cm] and a returning force of 60 [N·cm] with a frictional loss of 110 [N·cm], whereas the former showed a generated torque of 110 [N·cm] and a returning force of 80 [N·cm] with a frictional loss of 20 [N·cm]. This verified that the frictional loss of the returning torque could be reduced significantly.

Now, when the elastic member 5" uses the plate springs 5A" and 5B" of cut ring shape, the openings 4b" formed in the retainer 41" may be identical in dimensions. This eliminates extremely thin portions around the openings 4b", thereby allowing an improvement in the strength of the retainer 4".

Incidentally, the number of plate springs to be used as the elastic member 5" may be determined according to the returning torque required. It is therefore possible to use a single plate spring alone or a lamination of three or more springs, aside from the two springs as described above. The number of plate springs for use can be thus modified to adjust the returning torque easily.

Moreover, the outer ring 1' serving as the input-side member consists of a first thin member 1A' and a second thin member 1B' as in the embodiment shown in FIG. 54. In the embodiment shown in FIG. 54, the inner ends of the two members 1A' and 1B' are in close contact with each other axially. In this embodiment, as shown in FIG. 62, the inner periphery 1Be' of an end of the second thin member 1B' is arranged around the outer periphery of the first thin member 1A', or more particularly, around the outer periphery of the inner flange portion 1Ac' so that end faces 1Ag' and 1Bg' of the two members 1A' and 1B' fall on an identical plane radially. Besides, an elastic member 29" consisting of a wavy spring or a disc spring is interposed between the washer 28" and the end face of the first thin member 1A' to give an axial preload to the outer ring 1'. As a result, wobbling of the outer ring 1' resulting from an initial gap of the clutch unit 15' and the like can be resolved to improve the feel of operation.

Incidentally, though omitted of illustration, only the input-side part of the clutch unit according to the sixth embodiment may be configured as an independent clutch unit in such form as shown in FIG. 49.

By the way, in the neutral position of the second clutch part 6 shown in FIG. 34 (the second clutch part 6 of the clutch unit according to the fourth embodiment shown in FIG. 22), for example, one of the pair of rollers 20 comes into wedged engagement with both the cam surface 2b1 and the circumferential surface 4c1 by a relatively large engaging force in response to the reverse input torque input to the output shaft 2 from the side of the seat 30 (resulting from the empty weight of the seat 30 and the weight of the sitter). On that account, if the roller 20 shows a high frictional force in coming out from the wedge gap (see FIG. 35) by being pressed with the column portion 3c of the inner ring 3, a high operating force may be required or the engaging part of the roller 20 may cause vibrations or vibrating noise when the operation lever 31a (13) is operated in a direction for lowering the position of the seat 30 (hereinafter, the operation in this direction will be referred to as "down-operation"). In such cases, lubricating grease having a base oil viscosity of 750 cSt or above, such as "Multemp SH-Y" from Kyodo Yushi Co., Ltd. (composed of base oil: PAO, thickener: Li-Ohst, additives: PTFE+special solid lubricant), can be filled into the second clutch part 6 to solve the problem.

FIGS. 69(*a*), (*b*), (*c*), and (*d*) show the results of measurements on the occurrence of vibrations when the operation lever 31a (13) was subjected to the down-operation and a returning action repeatedly with four types of lubricating grease differing in base oil viscosity alone (base oil viscosities of 100 cSt, 410 cSt, 750 cSt, and 1650 cSt) filled into the second clutch part 6 of the clutch unit according to the fourth embodiment. The horizontal axes are graduated in units of 5 sec. The vertical axes show vibration acceleration. The vibration waveforms peak at instants when the rollers 20 come out from wedged engagement. From the results shown in the diagram, it was confirmed that the values of vibration levels decreased with the increasing base oil viscosity of the lubricating grease.

Figure 70:
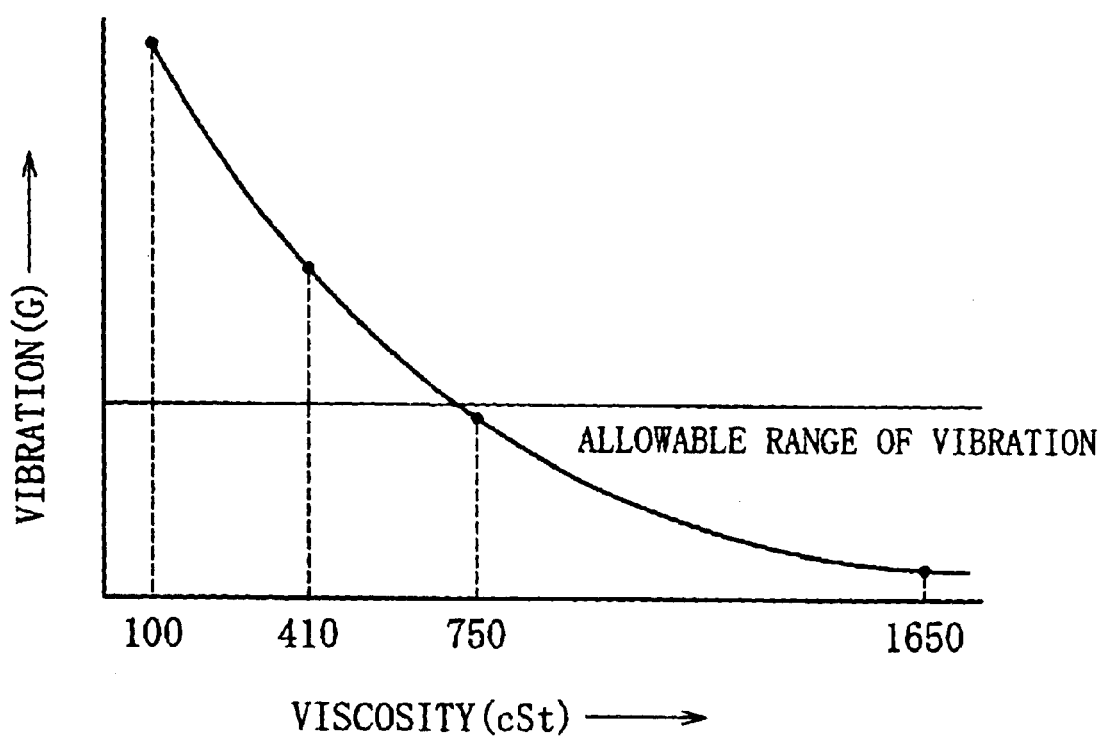
FIG. 70 is a diagram showing the relationship between the base oil viscosity of the lubricating grease and vibrations.

FIG. 70 is a diagrammatic representation of the correlation between the base oil viscosity and the vibration value (acceleration), on which averages of the vibration values at the respective base oil viscosities (FIGS. 69(*a*), (*b*), (*c*), and (*d*)) are plotted. Slight vibration or vibrating sound occurring in the down-operation of the operation lever does not necessarily mailer when it falls within the allowable range such that it is imperceptive to the sitter or not unpleasant. As shown in the diagram, it was confirmed that the clutch units filled with lubricating grease having base oil viscosities of 750 cSt and above decreased to within the allowable range of vibration values.

Incidentally, the foregoing effect becomes more significant when coating treatment for friction reduction, such as phosphate coating, manganese phosphate coating, and solid lubricant coating is applied to at least one contact surface of the rolling contact surface of the roller 20, the circumferential surface 4c1 of the outer ring 4, and the cam surface 2b1 of the output shaft 2. Moreover, the lubricating grease described above may be filled into not only the second clutch part 6 but also the first clutch part 5.

Figure 71:
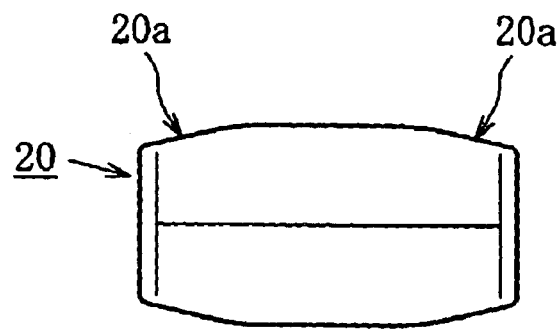
FIG. 71 is a side view showing a roller of the second clutch part.

As shown in FIG. 71, crowning 20a may be applied to the rolling contact surfaces of the rollers 20 of the second clutch part 6. This suppresses edge load at the contact portions with the rolling contact surfaces of the rollers 20, promoting the formation of oil films by the lubricating grease. Incidentally, the rolling contact surfaces of the rollers 10 of the first clutch part 5 may also be given the crowning.

Incidentally, the structure as to the lubricating grease and the surface treatment (including the formation of crowning)

described above may be applied to not only the fourth embodiment but all the foregoing embodiments as well.

What is claimed is:

1. A clutch unit comprising:
   an input-side member to which a torque is input;
   an output-side member from which a torque is output;
   a control member intervening in a torque transmission path between the input-side member and the output-side member;
   a stationary-side member constrained from rotation;
   a first clutch part arranged between the input-side member and the control member; and
   a second clutch part arranged between the stationary-side member and the output-side member,
   wherein an input torque from the input-side member is transmitted to the output-side member through the first clutch part and the control member, and a reverse input torque from the output-side member is locked with the stationary-side member through the second clutch part, and
   wherein the first clutch part comprises locking means for locking the input-side member and the control member with respect to the inpit torque from the input-side member, and returning means for returning the input-side member to a nuetral position at which the input torque is not input when the input-side member is released, and
   wherein the locking means comprises cam surfaces provided to the input-side member, a circumferential surface provided to the control member, and engaging members interposed between the cam surfaces and the circumferential surface, and the returning means comprises a rotatable retainer for retaining the engaging members and an elastic member for coupling the retainer with a non-rotating member in the direction of rotation.

2. The clutch unit according to claim 1, wherein the non-rotating member is the stationary-side member.

3. The clutch unit according to claim 1, wherein the stationary-side member has a stopper portion for restraining a range of rotation of the input-side member.

4. The clutch unit according to claim 1, wherein the engaging members, the retainer, and the elastic member are accommodated in the input-side member.

5. The clutch unit according to claim 1, wherein the control member has a radial bearing portion for supporting the output-side member radially.

6. The clutch unit according to claim 1, wherein the second clutch part comprises locking means for locking the output-side member and the stationary-side member with respect to the reverse input torque from the output-side member, lock releasing means for releasing a locked state due to the locking means with respect to the input torque from the input-side member, and torque transmitting means for transmitting the input torque between the control member and the output-side member when the locked state due to the locking means is released.

7. The clutch unit according to claim 6, wherein the locking means comprises a circumferential surface provided to the stationary-side member, cam surfaces provided to the output-side member for defining wedge gaps together with the circumferential surface in both normal and reverse directions of rotation, a pair of engaging members interposed between each of the cam surfaces and the circumferential surface, and elastic members each of which presses the pair of engaging members toward the respective wedge gaps, and wherein the lock releasing means comprises engaging elements for selectively engaging with either one of the pair of engaging members to press the engaging element toward the opposite direction of the wedge gap; and wherein the torque transmitting means comprises engaging elements in the direction of rotation provided to the control member and the output-side member.

8. The clutch unit according to claim 7, wherein the lock releasing means and the torque transmitting means in a neutral position have a relationship of $\delta1<\delta2$, where $\delta1$ is a rotational direction clearance between the engaging element of the lock releasing means and the engaging member, and $\delta2$ is a rotational direction clearance between the engaging elements of the torque transmitting means.

9. The clutch unit according to claim 7, wherein the lock releasing means is provided to the control member.

10. The clutch unit according to claim 7, wherein the torque transmitting means comprises projections provided to either one of the control member and the output-side member, and depressions provided to the other, the depressions conforming to the projections.

11. The clutch unit according to claim 10, wherein the projection is a pin provided to the control member, and the depression is a pin hole provided to the output-side member.

12. The clutch unit according to claim 11, wherein the pin and the pin hole are provided in the clutch-axis direction.

13. The clutch unit according to claim 7, wherein the elastic member of the second clutch part is formed of a plate spring having two bending portions.

14. The clutch unit according to claim 13, wherein the plate spring has a coupling portion for coupling the two bending portions at one end each, and side plate portions extending from the other ends of the bending portions.

15. The clutch unit according to claim 14, wherein the cam surface provided to the output-side member is a flat surface at a portion on which the plate spring is mounted.

16. The clutch unit according to claim 7, wherein the cam surface of the output-side member is formed convex with two tapered surfaces.

17. The clutch unit according to claim 16, wherein each of the tapered surfaces have a tilt angle of 1° to 5°.

18. The clutch unit according to claim 17, wherein the second clutch part has a strut angle of 3° to 4.5°.

19. The clutch unit according to claim 6 or 7, wherein a lubricating grease is applied to at least the interior of the second clutch part including the locking means, a base oil of the lubricating grease having a viscosity of 750 cSt or above.

20. The clutch unit according to claim 19, wherein a solid lubricant is added to the lubricating grease.

21. The clutch unit according to claim 20, wherein an extreme pressure lubricant is further added to the lubricating grease.

22. The clutch unit according to claim 1, further comprising a fixing side plate fixed to the stationary-side member.

23. The clutch unit according to claim 22, wherein the fixing side plate has a radial bearing portion for supporting the output-side member radially.

24. The clutch unit according to claim 22, wherein the fixing side plate is fixed to the stationary-side member by caulking.

25. The clutch unit according to claim 24, wherein a caulking portion provided to the fixing side plate is bent for being caulked to the stationary-side member.

26. The clutch unit according to claim 25, wherein the caulking portion is bent in the circumferential direction of the stationary-side member.

27. The clutch unit according to claim 26, wherein the stationary-side member has a notch at an outer periphery thereof, the caulking portion is engaged with the notch.

28. The clutch unit according to claim 27, wherein the caulking portion has a pair of tabs, the pair of tabs being bent in opposite directions.

29. The clutch unit according to claim 27, wherein the notch and the caulking portion are provided to the stationary-side member and the fixing side plate at a plurality of circumferential locations, respectively.

30. The clutch unit according to claim 24, wherein the stationary-side member is made of hardened steel, and the fixing side plate is made of unhardened steel.

31. The clutch unit according to claim 1, further comprising braking means for applying a braking force in the direction of rotation on the output-side member.

32. The clutch unit according to claim 31, wherein the braking means is interposed between the fixing side plate fixed to the stationary-side member, or the stationary-side member, and the output-side member.

33. The clutch unit according to claim 1, wherein the elastic member of the first clutch part is formed of a torsion coil spring having a plurality of turns, individual winding centers being, in a natural state, offset to an opposite direction from a direction in which the individual winding centers shift accompany with increase in amount of operation of the retainer in an assembled state.

34. The clutch unit according to claim 33, wherein the individual winding centers of the elastic member fall on the same axis when the retainer in the assembled state is not in operation.

35. The clutch unit according to claim 33, wherein the elastic member is of unwinding type.

36. The clutch unit according to claim 33, wherein the elastic member is shaped rectangular in section.

37. The clutch unit according to claim 33, wherein the elastic member is wound with spacing between the winding.

38. The clutch unit according to claim 1, wherein the elastic member of the first clutch part has a pair of engaging portions differing from each other in the axial position, and wherein the retainer has a pair of engaged portions with which the engaging portions of the elastic member engage, and pockets for retaining the engaging members, at least either one of the pair of engaged portions is axially thickened at a base part thereof.

39. The clutch unit according to claim 38, wherein the pair of engaged portions are formed of a notch respectively, a bottom of the notch making one of the engaged portions lies closer to an end face of the retainer than a bottom of the notch making the other engaged portion.

40. The clutch unit according to claim 39, wherein the one of the engaged portions is engaged with one of the pair of engaging portions of the elastic member lying closer to the end face of the retainer.

41. The clutch unit according to claim 39, wherein the pocket is omitted near the base part of the other engaged portion.

42. The clutch unit according to claim 39, wherein the pocket is reduced in axial dimension near the base part of the other engaged portion.

43. The clutch unit according to claim 41 or 42, wherein the other engaged portion is engaged with one of the pair of engaging portions of the elastic member lying closer to the center of the retainer.

44. The clutch unit according to claim 1, wherein the input-side member is formed by connecting a first member and a second member with each other so as to be incapable of relative rotation, the first member having the cam surfaces for the first clutch part, the second member being connected with an operating member for inputting a torque.

45. The clutch unit according to claim 44, wherein at least either one of the first member and the second member is of a press-formed product.

46. The clutch unit according to claim 44, wherein the first member and the second member are connected by a depression-projection fitting structure.

47. The clutch unit according to claim 46, wherein either one of the first member and the second member has a fitting tab, and the other has a groove portion with which the fitting tab is fit.

48. The clutch unit according to claim 44, wherein at least the cam surfaces of the first member is applied with surface hardening.

49. The clutch unit according to claim 1, wherein the elastic member of the first clutch part is formed of a plate spring of cut ring shape.

50. The clutch unit according to claim 49, wherein engaging portions capable of engagement with the retainer and the stationary-side member, respectively, are formed at both ends of the elastic member.

51. The clutch unit according to claim 50, wherein the engaging portions formed at both ends of the elastic member are arranged at circumferentially opposite positions with each other.

52. The clutch unit according to claim 50, wherein the retainer has openings capable of engagement with the engaging portions of the elastic member, the openings being closed all around.

53. The clutch unit according to claim 50, wherein stress adjusting portions are arranged near both ends of the elastic member.

54. The clutch unit according to claim 49, wherein the elastic member is a lamination of two or more plate springs.

55. The clutch unit according to claim 54, wherein both ends of the inner side plate spring are bent acute to form engaged portions, and both ends of the outer side plate spring are engaged with the engaged portions.

56. The clutch unit according to claim 1, wherein the clutch unit is used in a seat-adjusting device of a motor vehicle.

57. The clutch unit according to claim 56, wherein the input-side member is connected to an operation lever, and the output-side member is connected to a rotating member of the seat-adjusting device.

58. The clutch unit according to claim 57, wherein the seat-adjusting device is a seat-height-adjusting device of a sitting seat.

59. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein at least one member of the input-side member, the control member, the stationary-side and the output-side member is a press-formed product.

60. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein at least one member of the input-side member, the control member, the stationary-side and the output-side member is subjected to carburizing and tempering so that a surface layer thereof has a surface hardness of HRC57 to 62.

61. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein at least one of the first clutch part and the second clutch part is filled with a lubricating grease, a base oil of which has viscosity of 10 to 1000 cSt (at 37.8° C.).

62. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein at least one of the first clutch part and the second clutch part is filled with a lubricating grease, a base oil of which has viscosity of 750 cSt (at 250° C.) or above.

63. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein a strut angle of the second clutch part is 3 to 4.5°.

64. The clutch unit according to claim 1, wherein the first clutch part comprises engaging members coming into and out from wedging engagements with the input-side member and the control member, and the second clutch part comprises engaging members coming into and out from wedging engagements with the stationary-side and the output-side member, and wherein a coating treatment for reducing friction is applied to a contact surface of at least one of the engaging members, the stationary-side member and the output-side member in the second clutch part.

65. The clutch unit according to claim 1, wherein an operation lever made of resin is connected to the input-side member.

66. The clutch unit according to claim 1, wherein the input-side member is symmetric with respect to a reference axis.

67. The clutch unit according to claim 1, wherein the output-side member is supported by a radial bearing surface provided on the control member and a radial bearing surface provided on a fixing side plate.

68. The clutch unit according to claim 1, wherein the second clutch part is accommodated in a space surrounded by the stationary-side member and a fixing side plate.

* * * * *